June 24, 1930.  E. G. WESSMAN ET AL  1,766,420
PAPER CUP MAKING MACHINE
Filed April 4, 1923  32 Sheets-Sheet 1
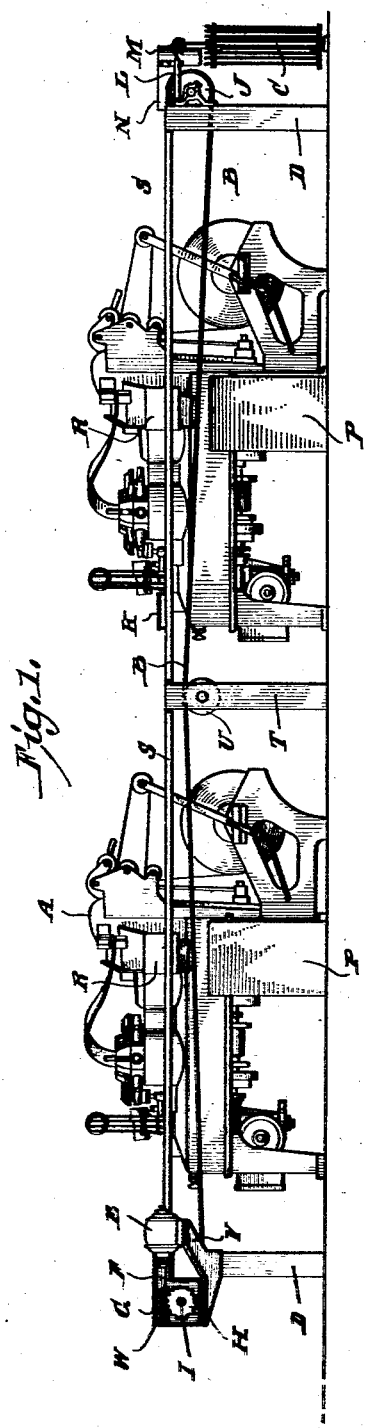
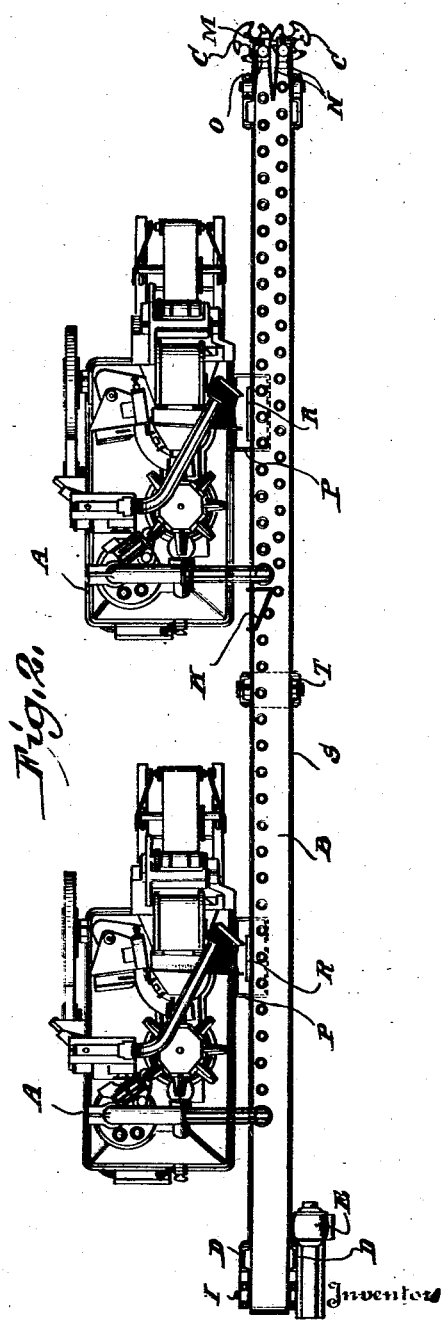
Inventors
Edwin G. Wessman and
Henry A. Stone
By
Milans & Milans
Attorneys

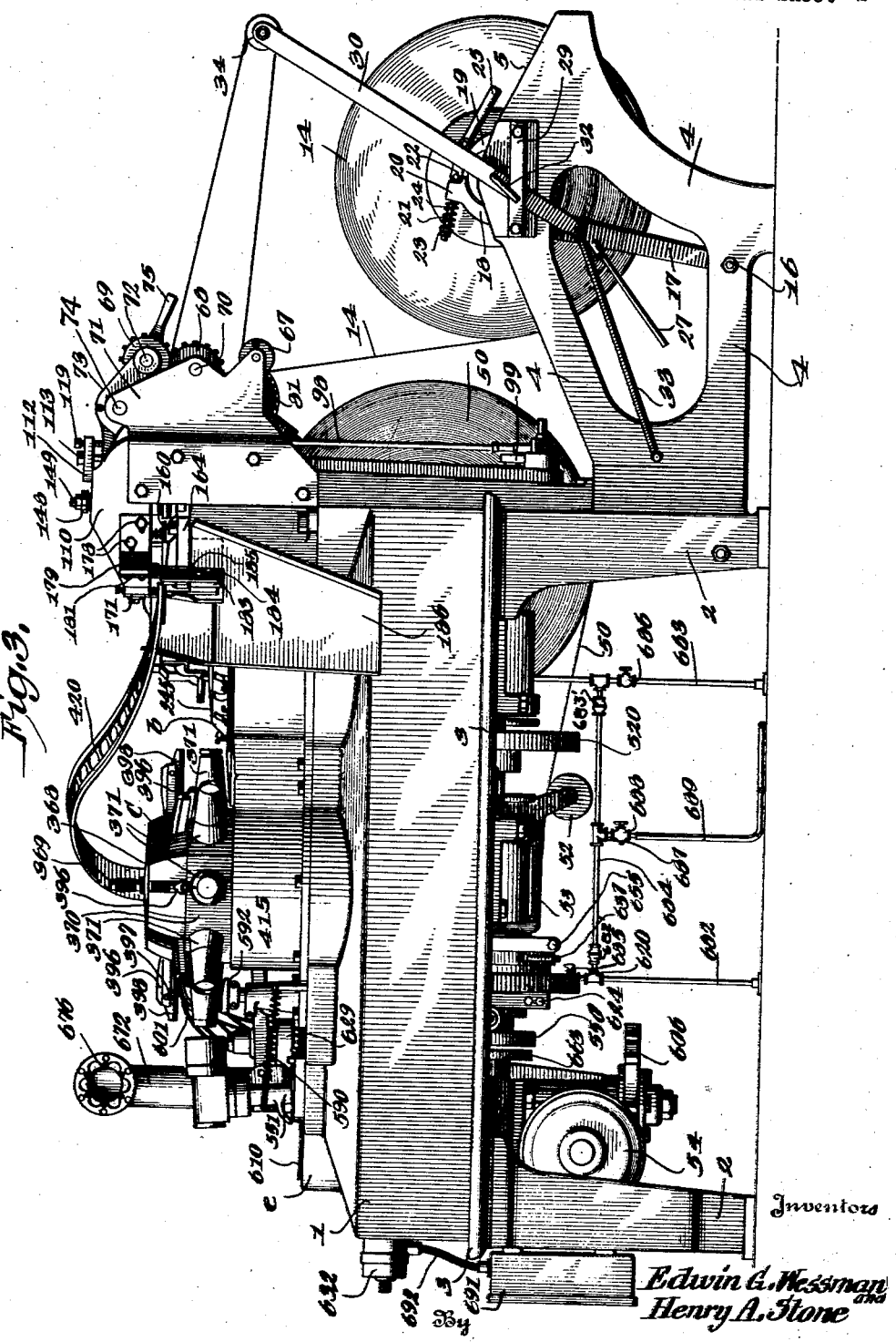

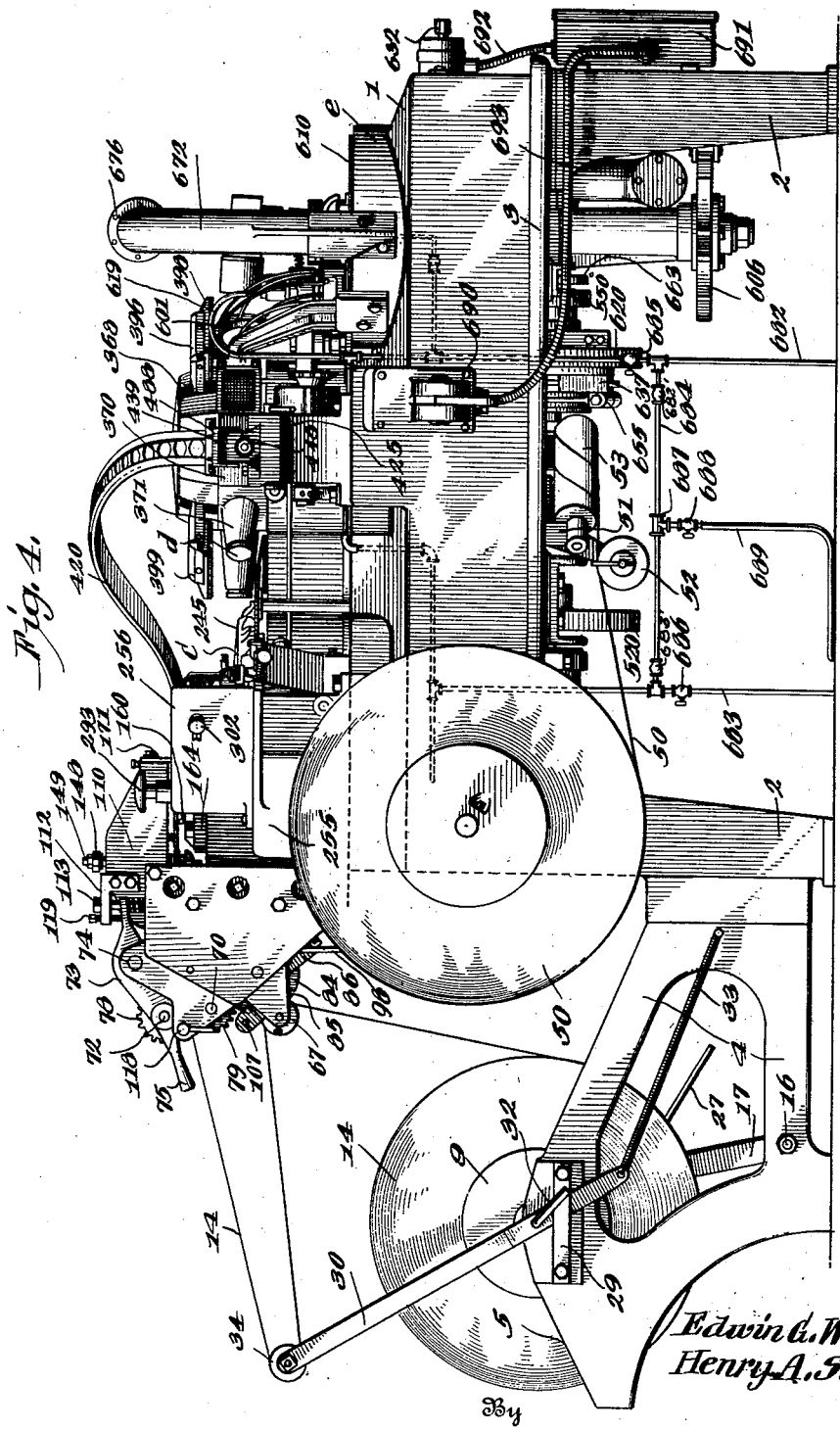

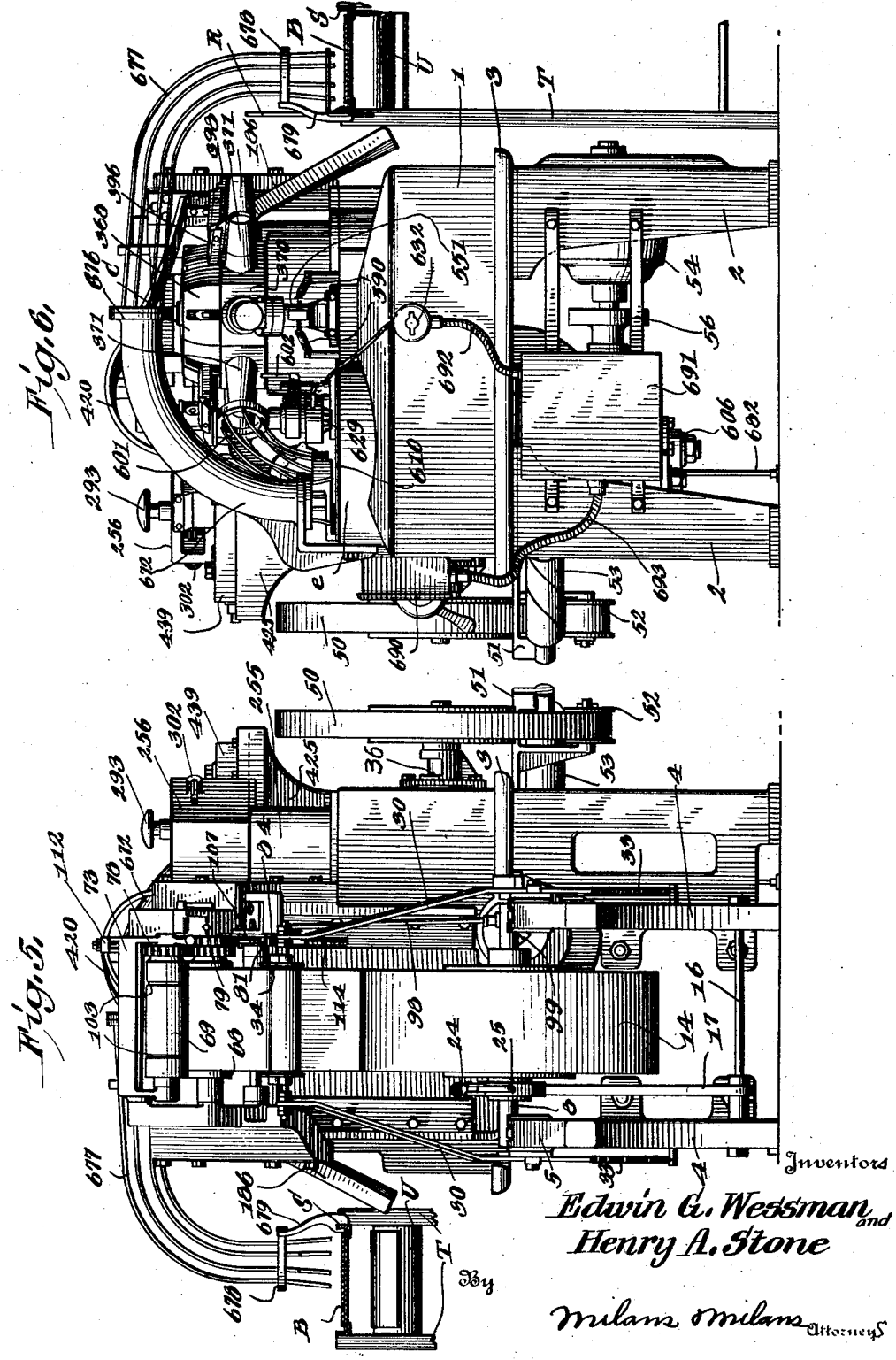

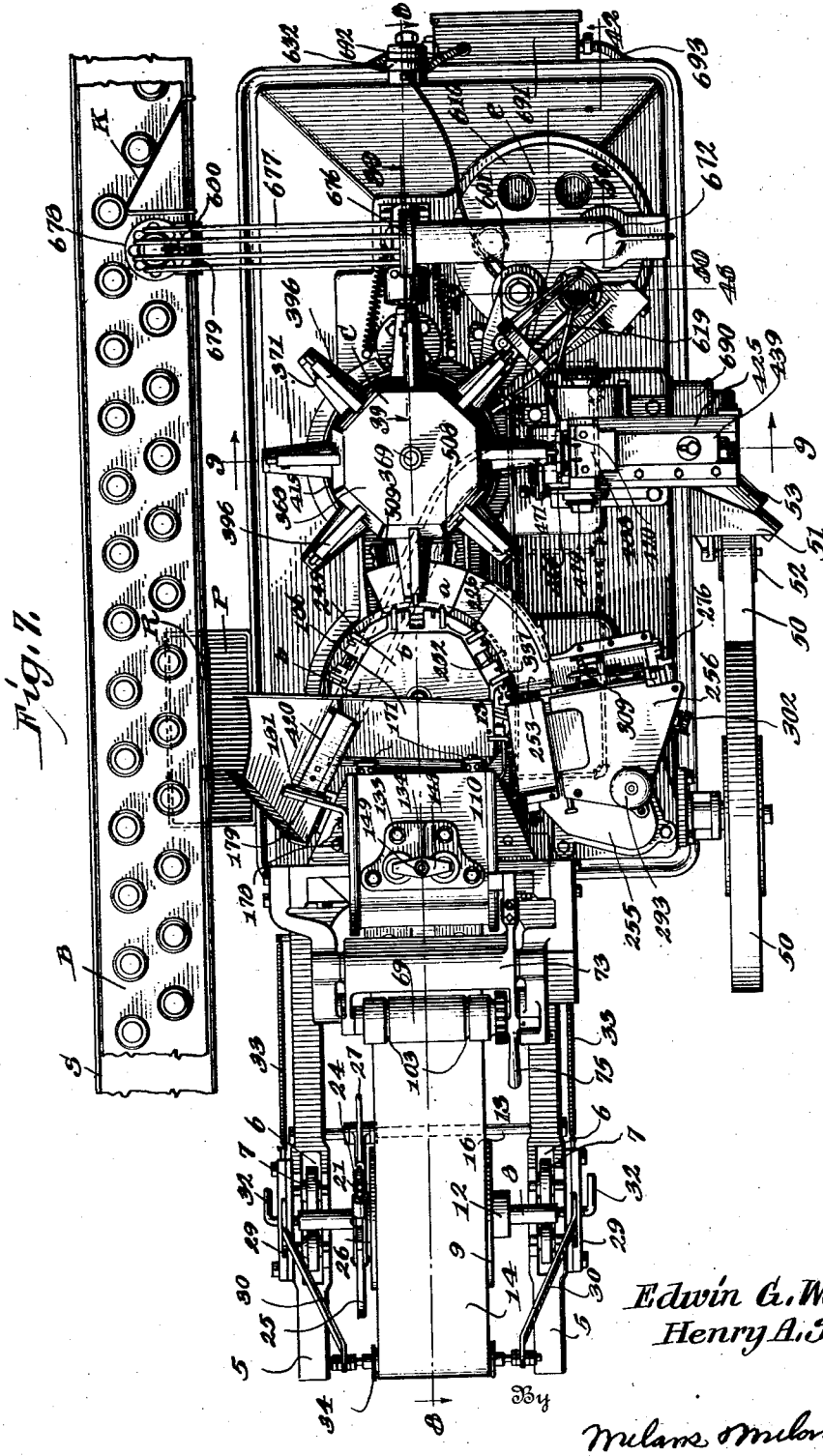

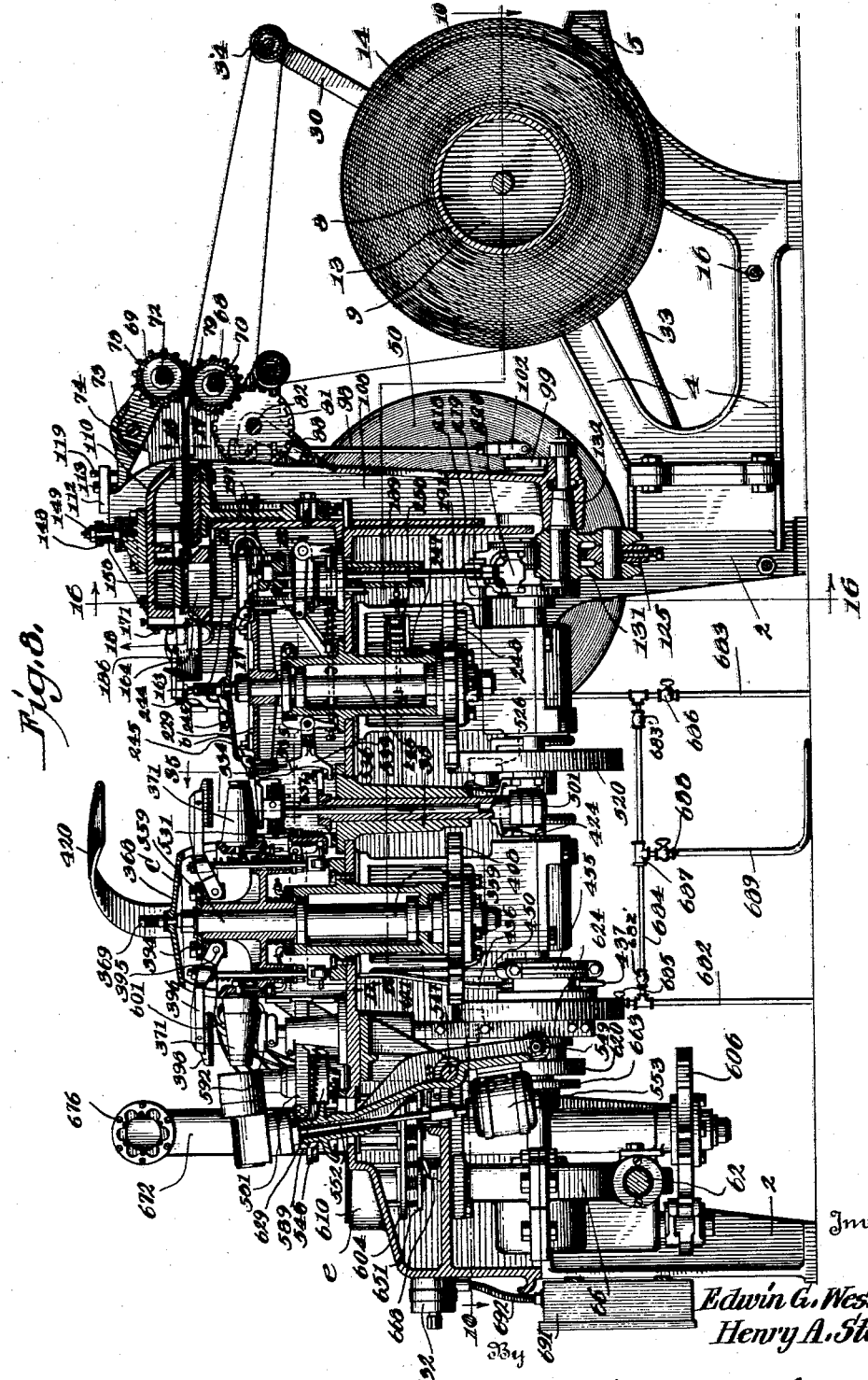

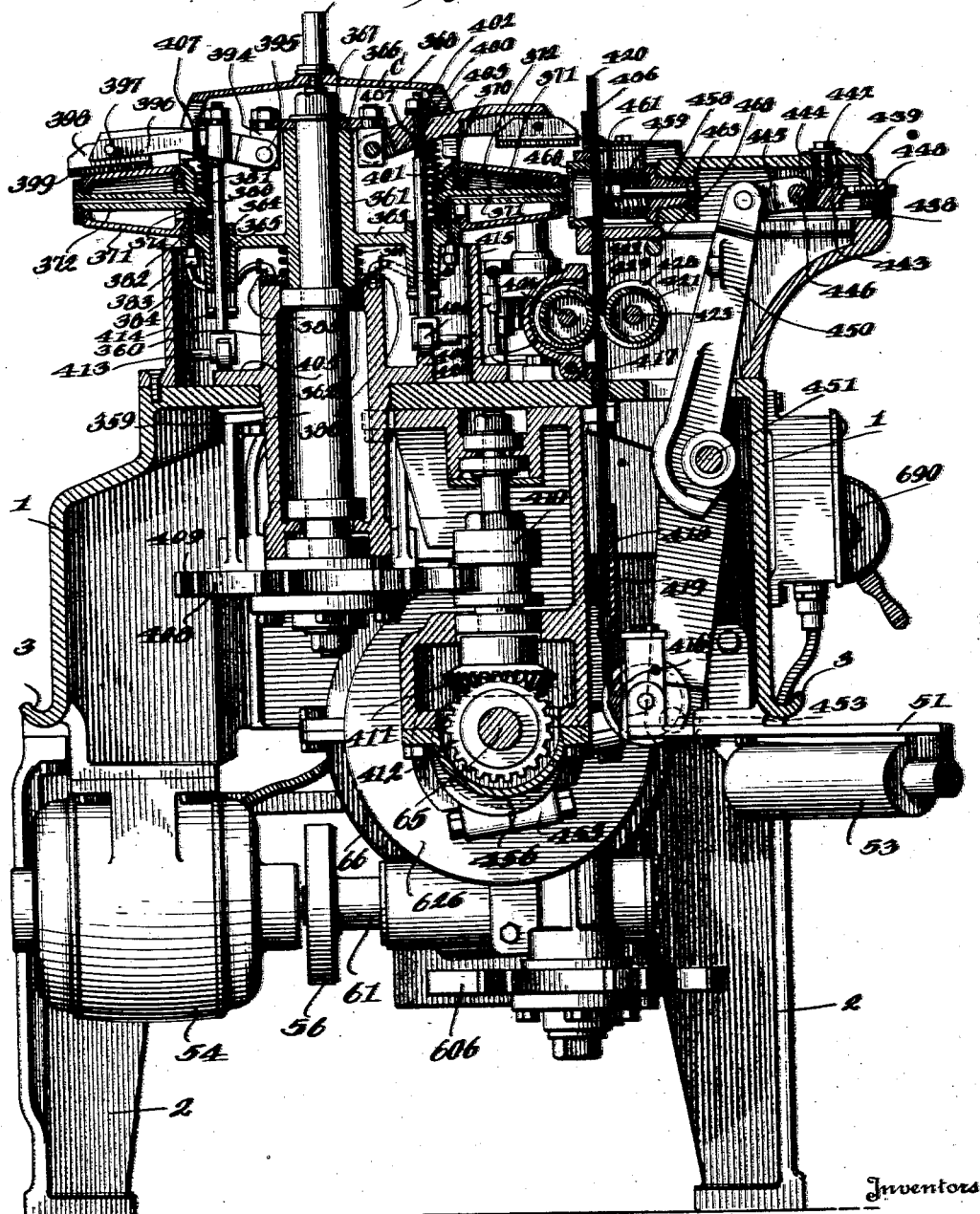

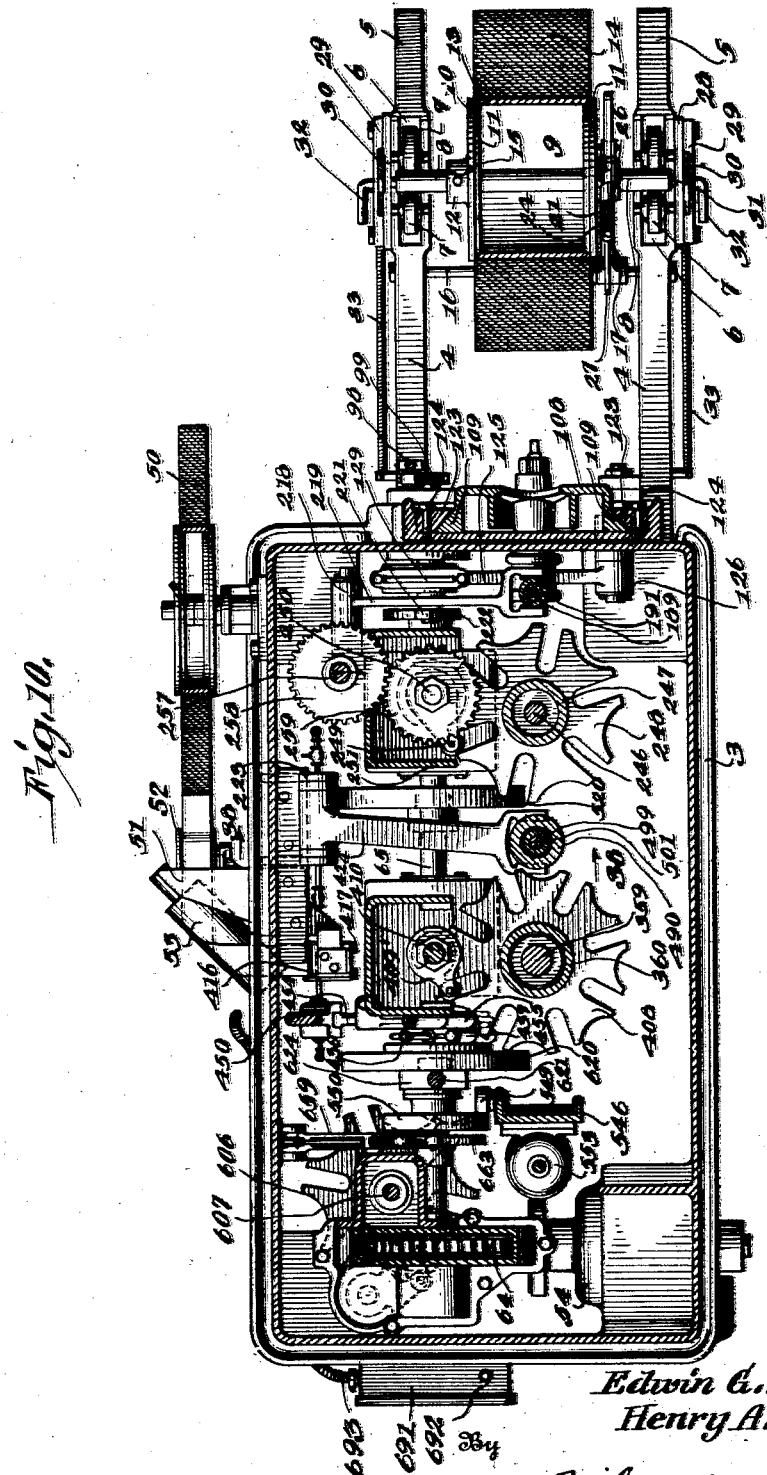

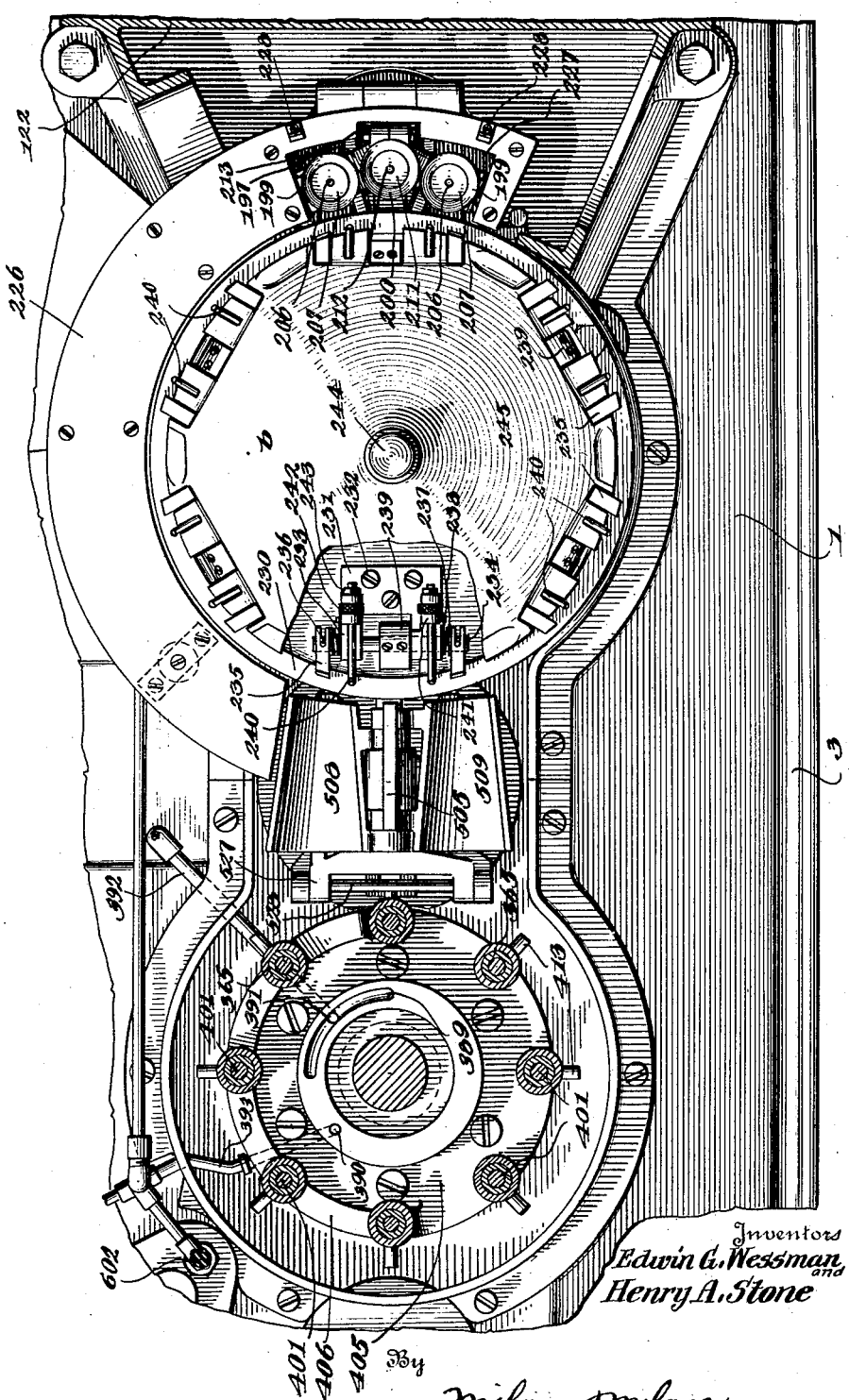

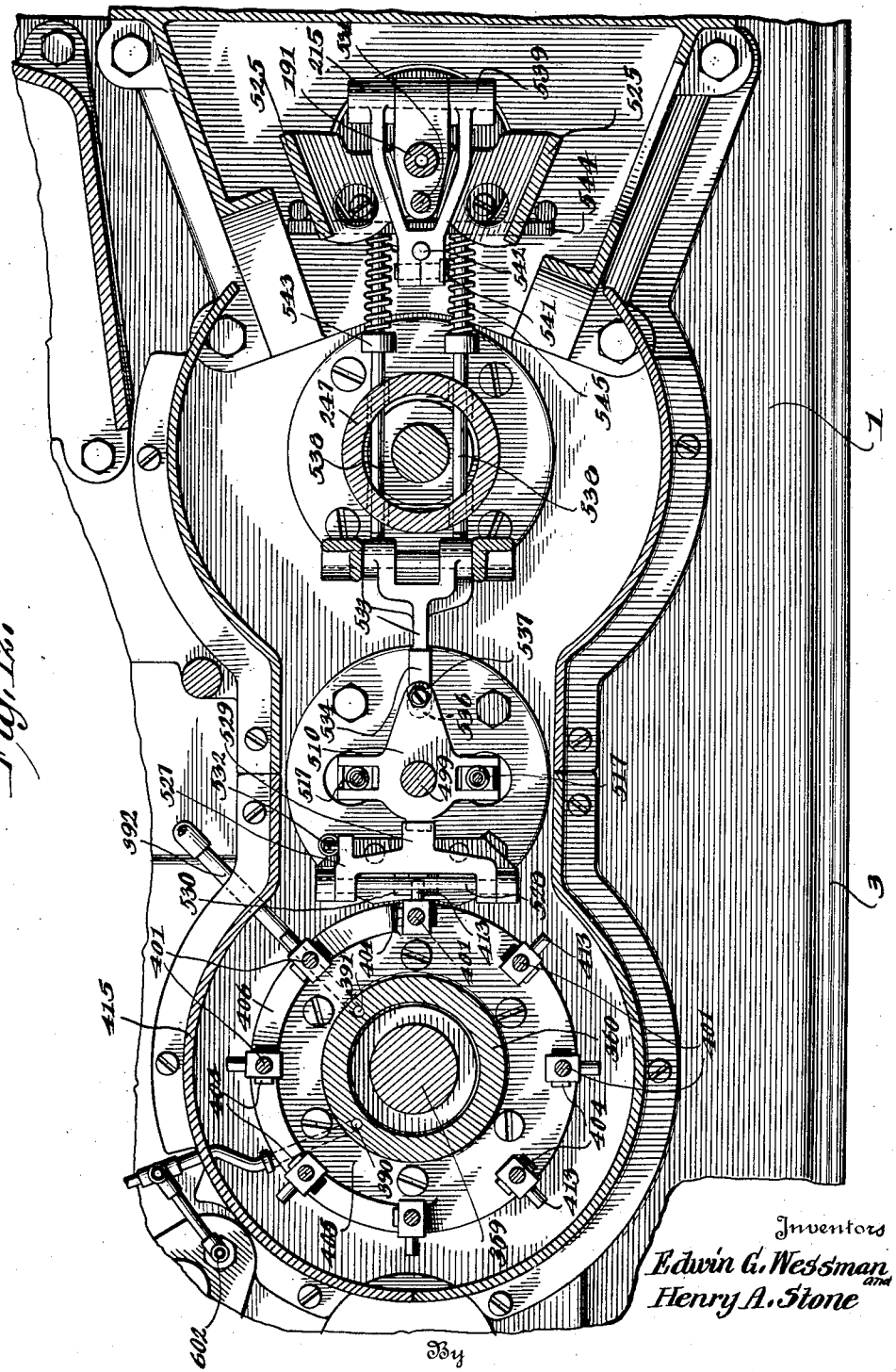

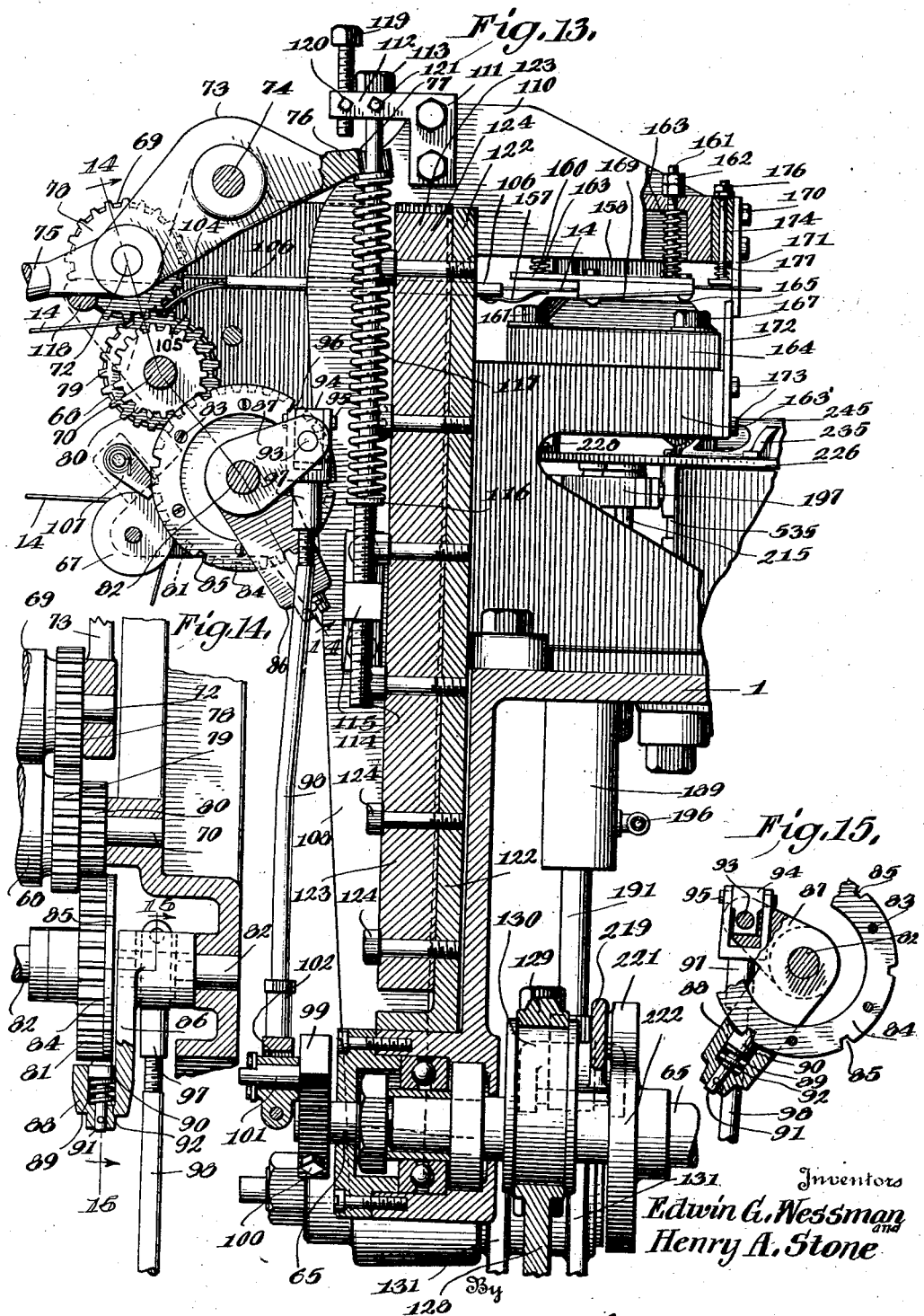

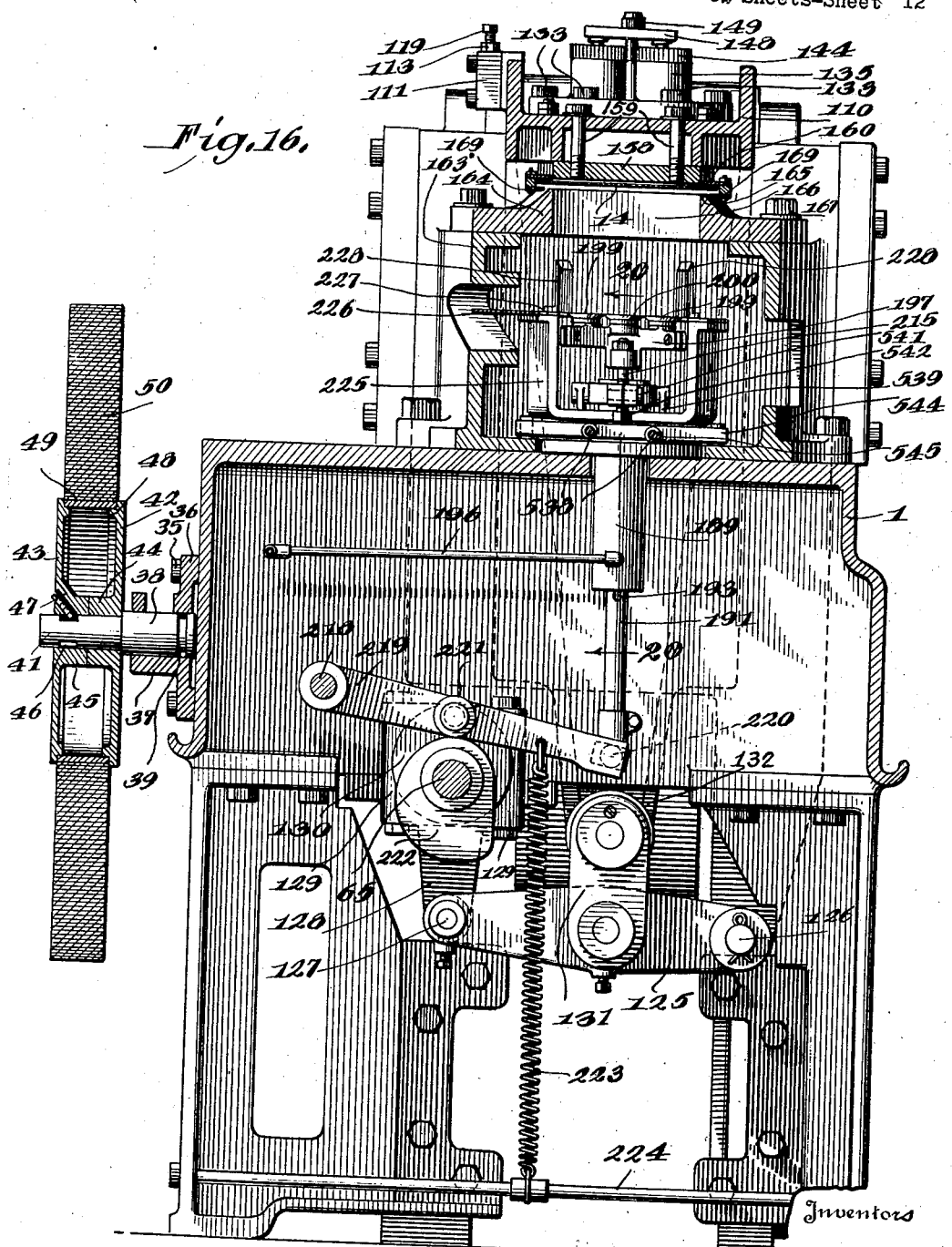

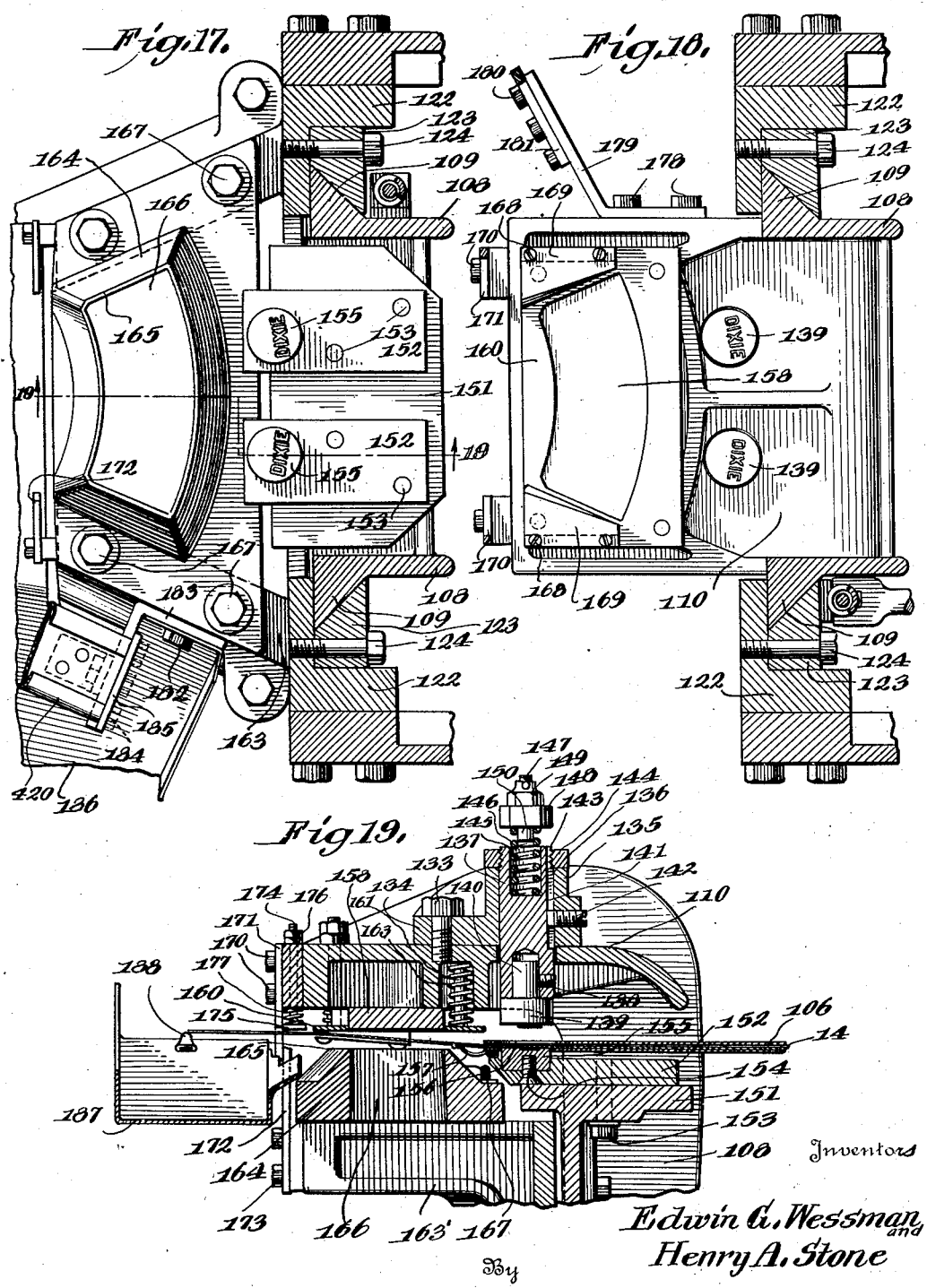

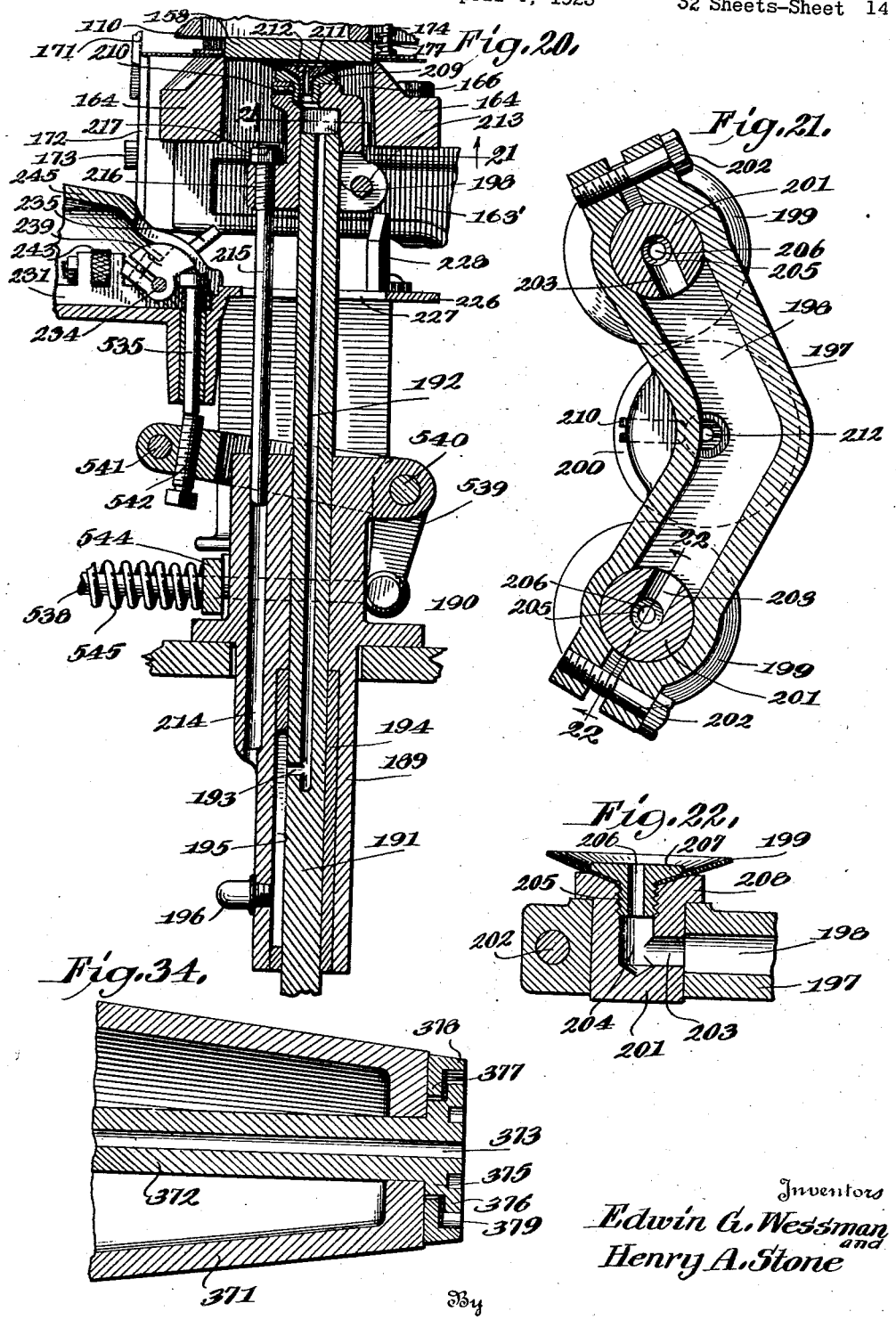

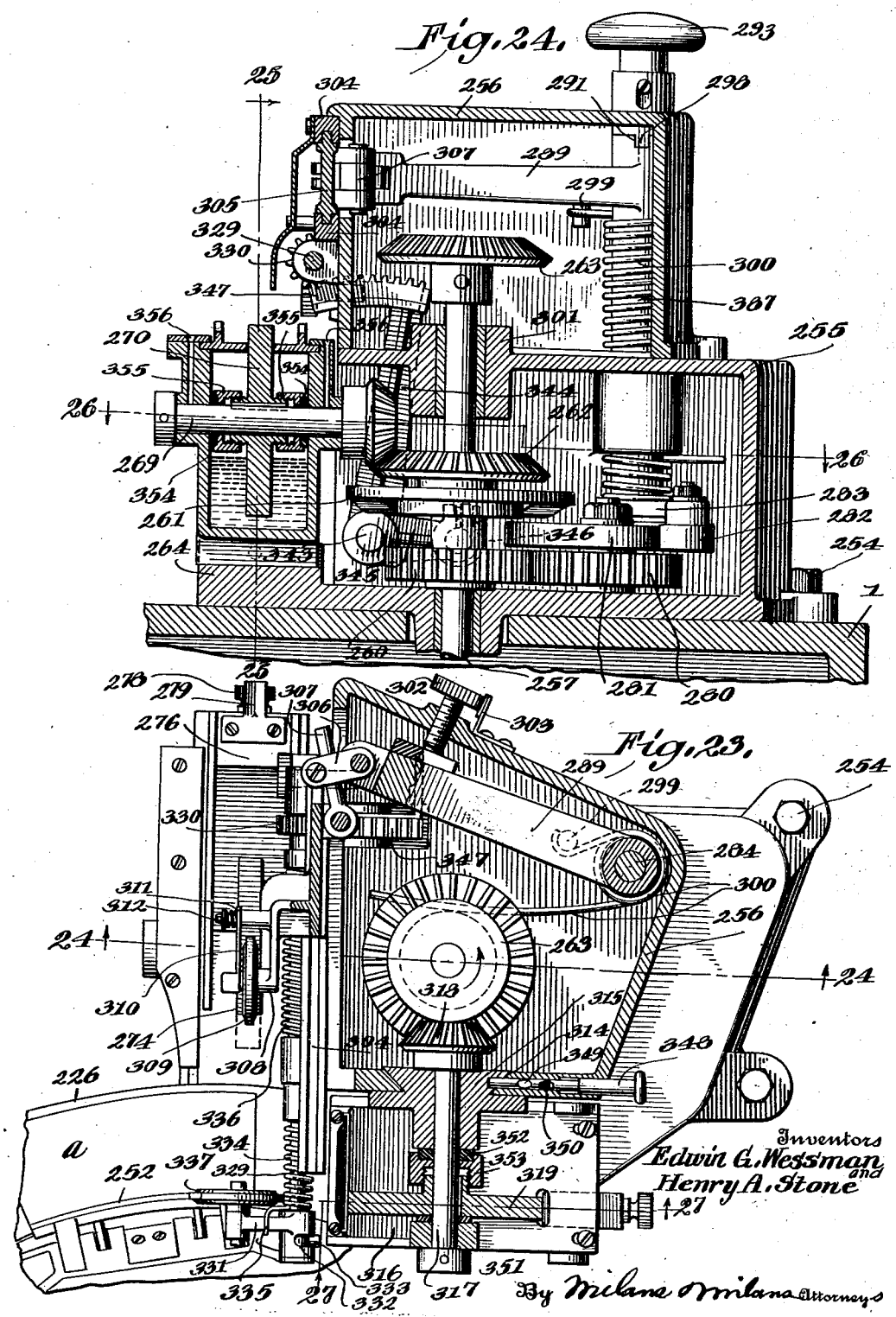

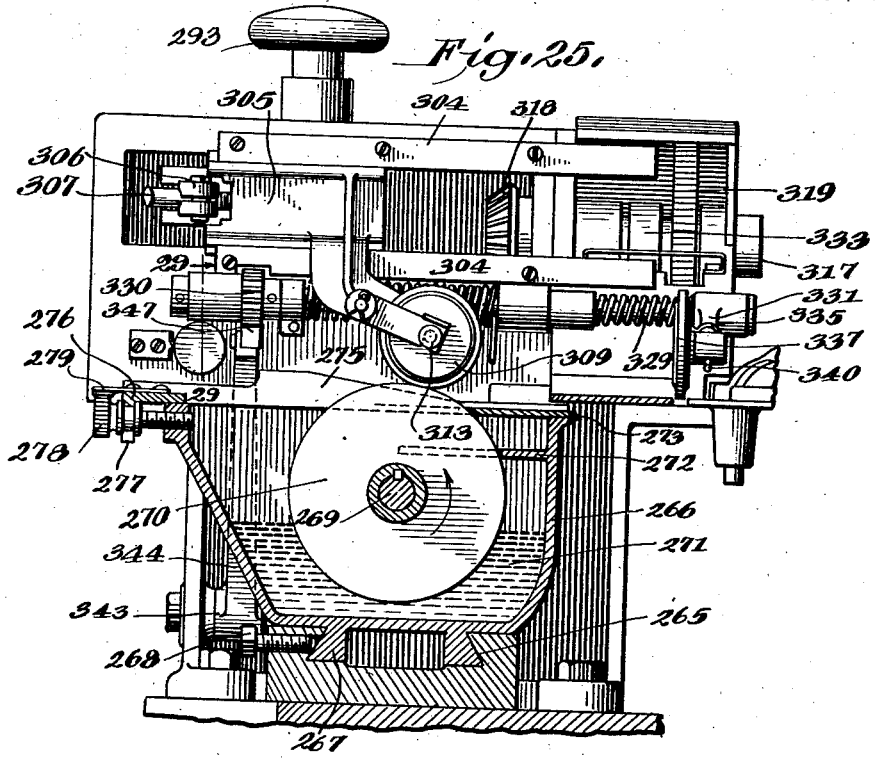
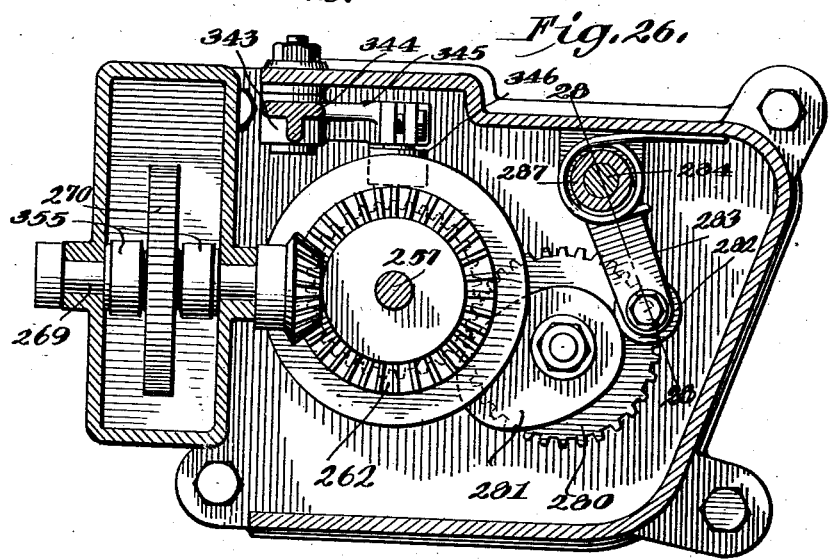

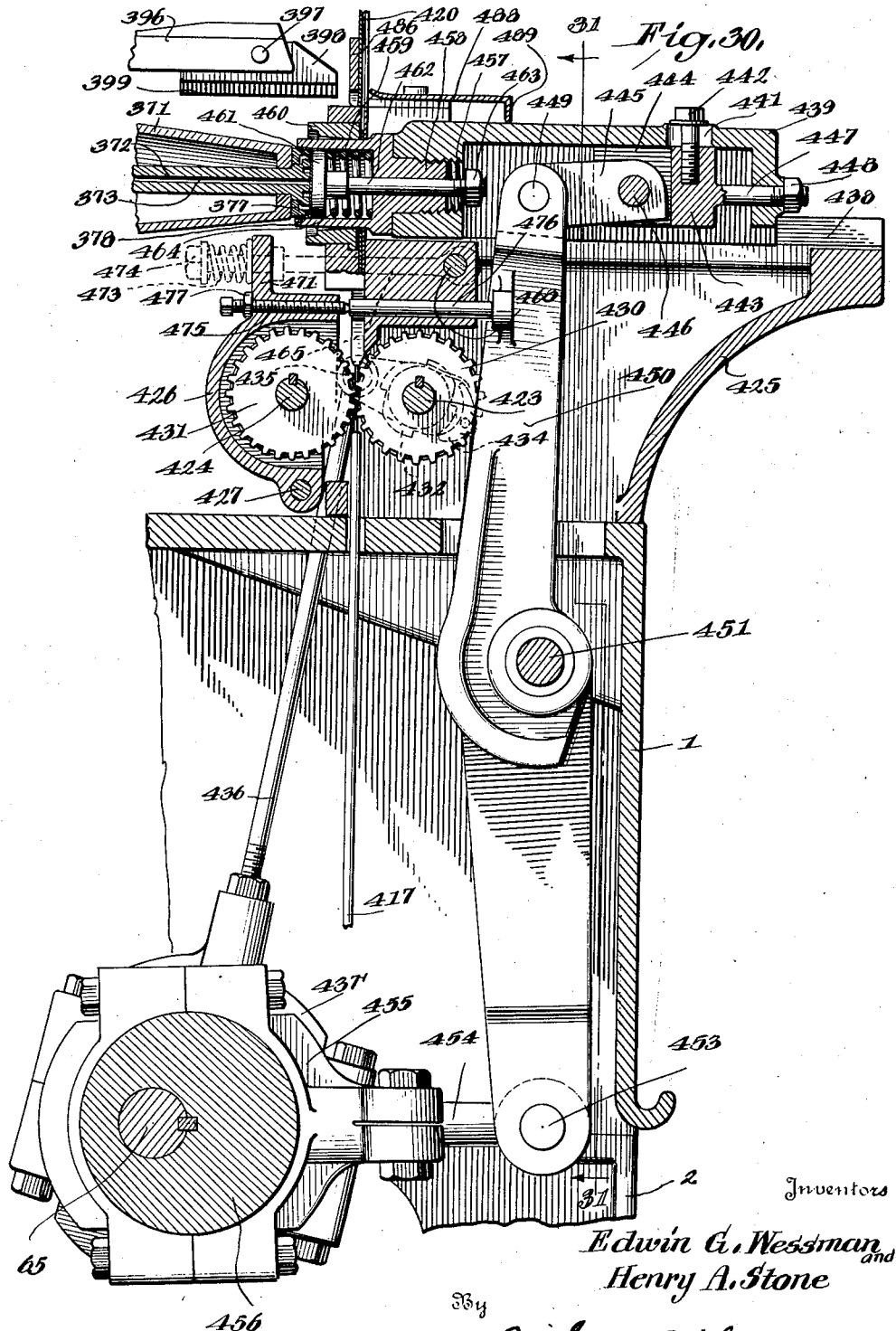

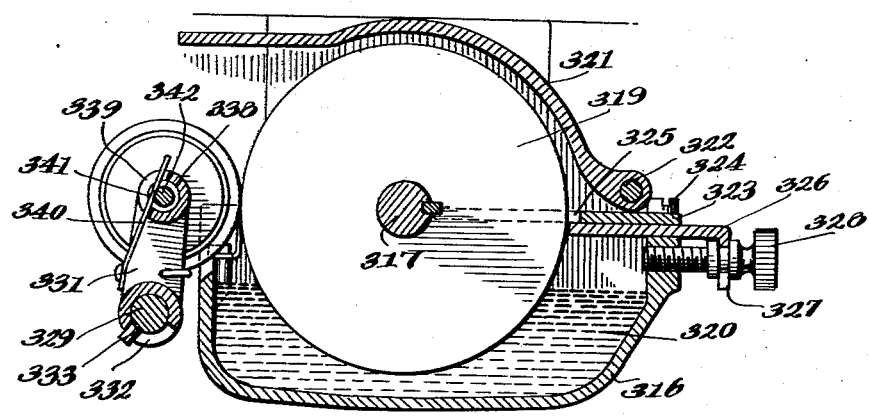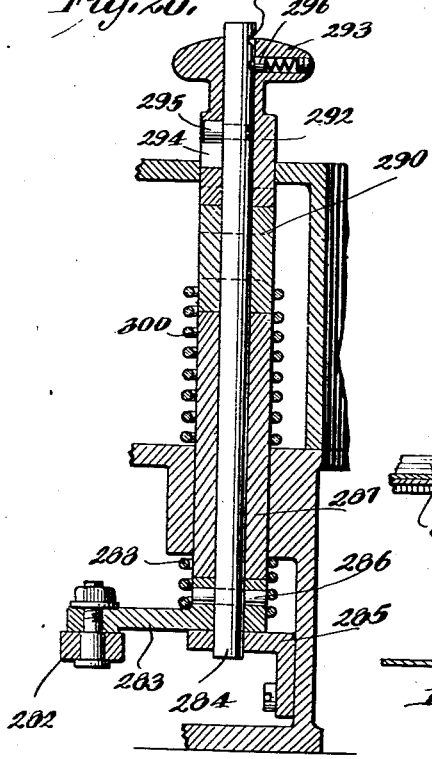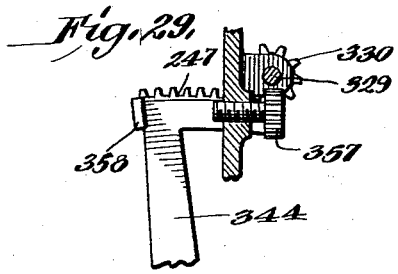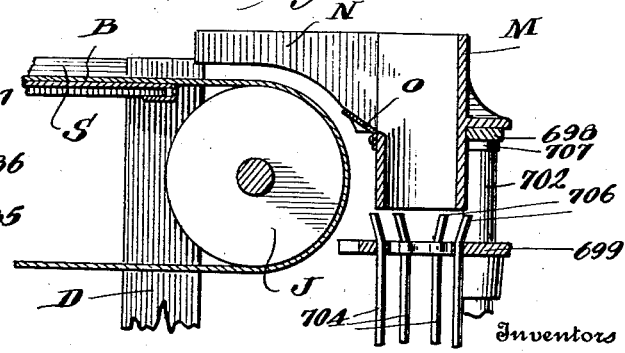

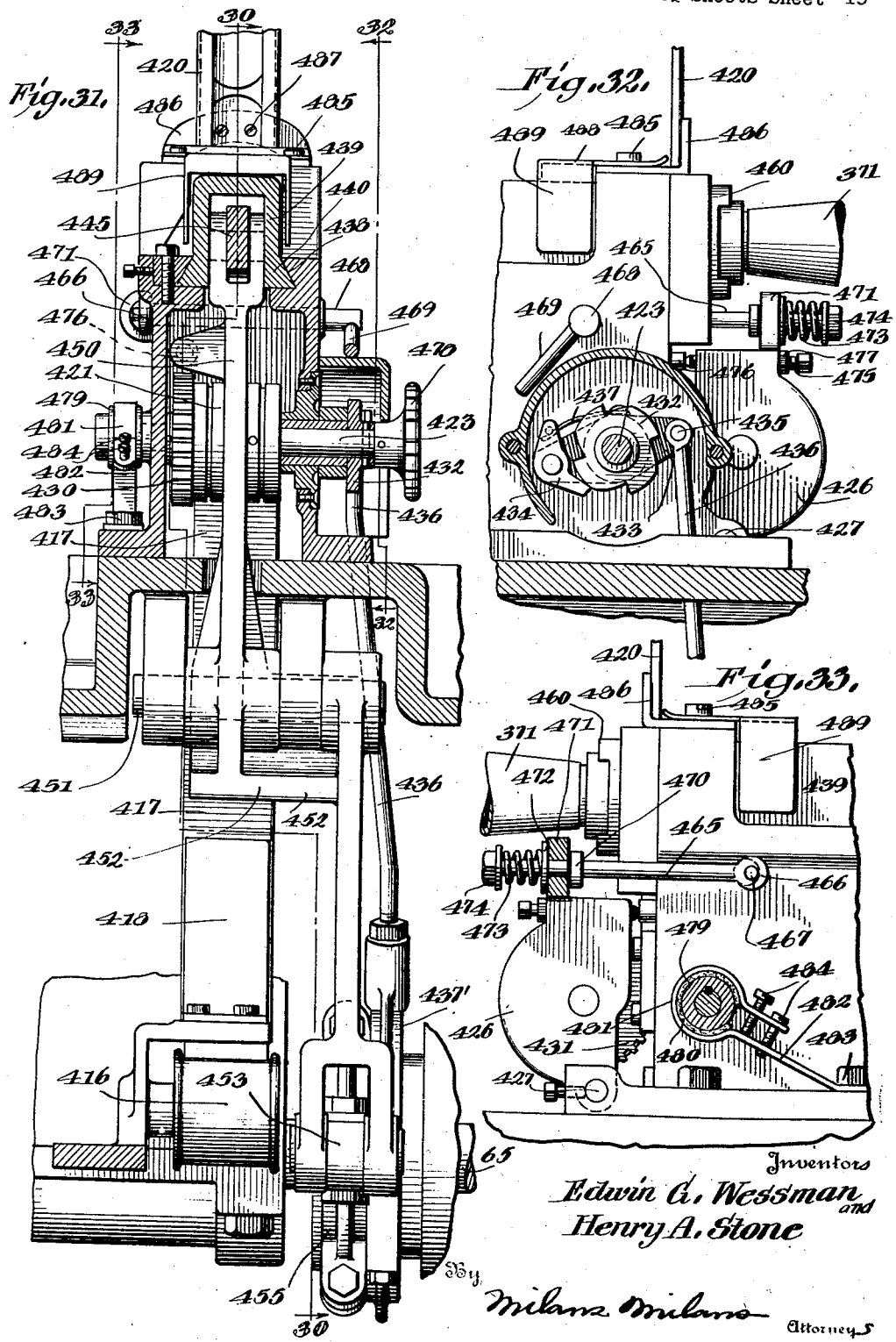

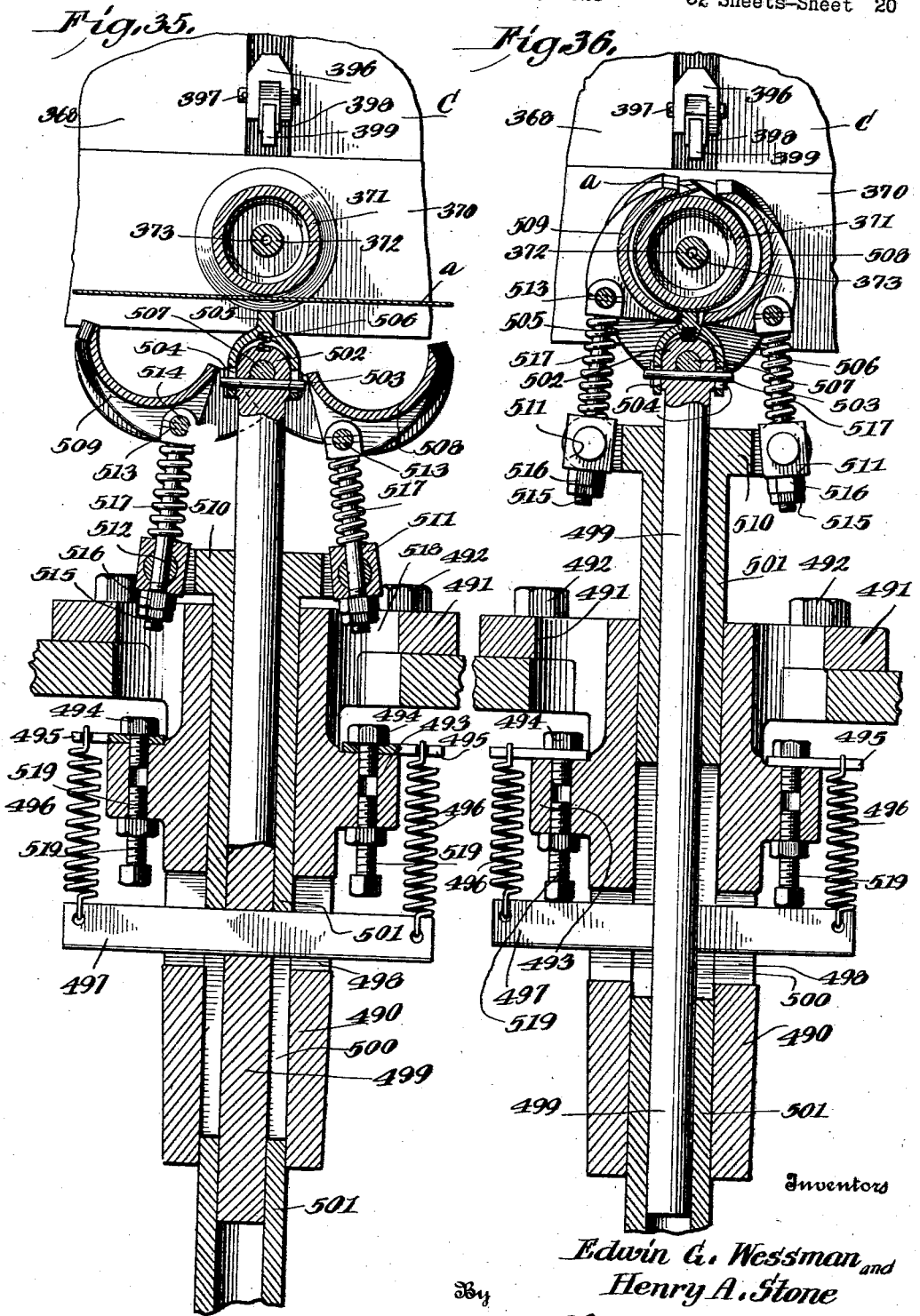

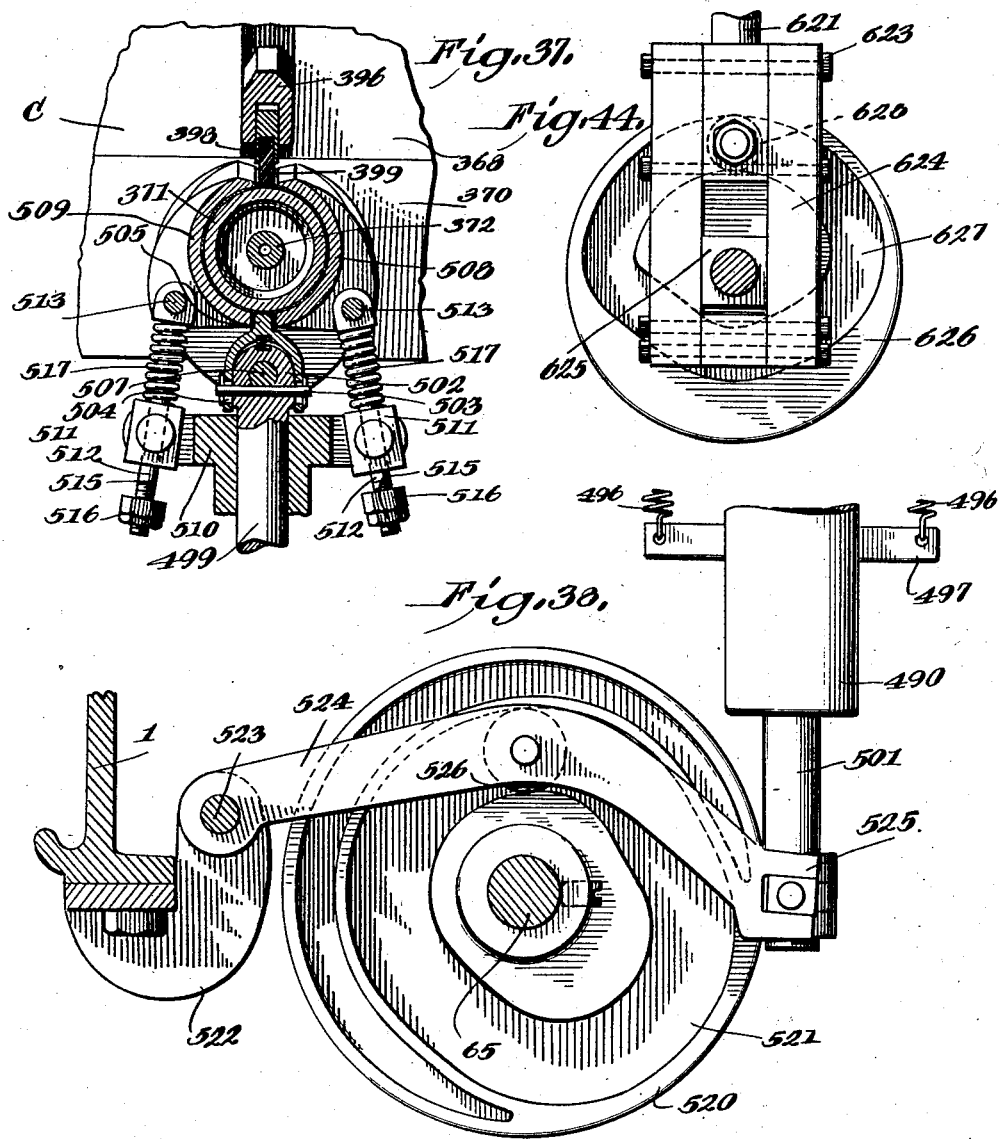

June 24, 1930.   E. G. WESSMAN ET AL   1,766,420
PAPER CUP MAKING MACHINE
Filed April 4, 1923   32 Sheets-Sheet 22
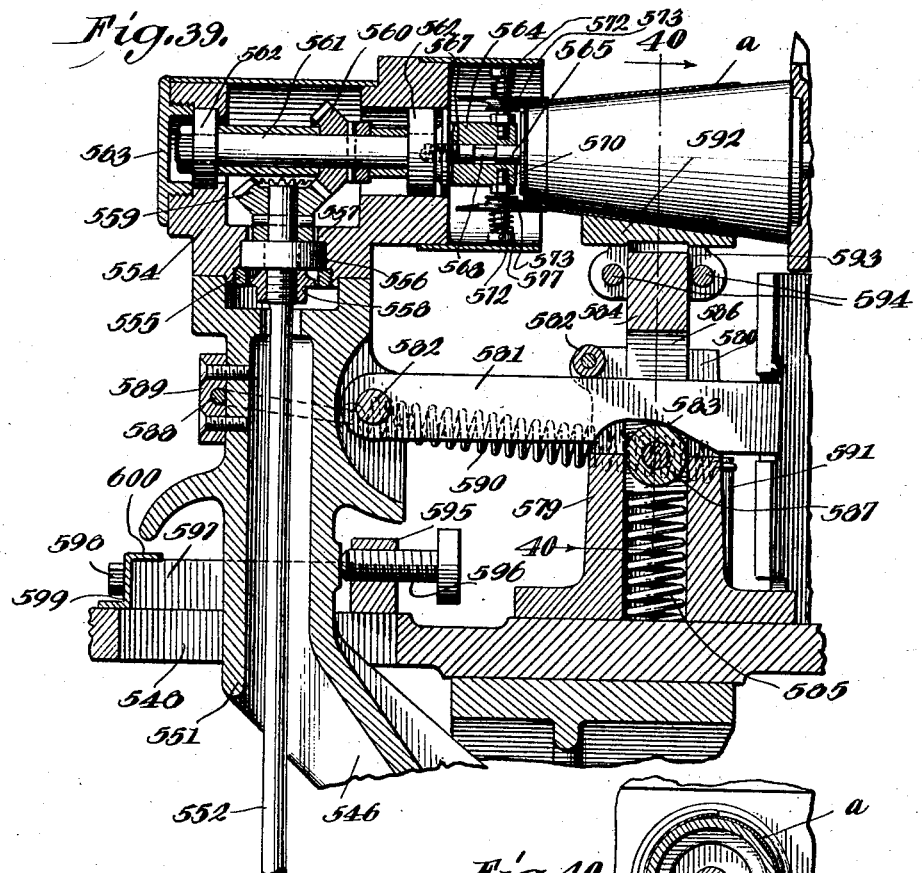
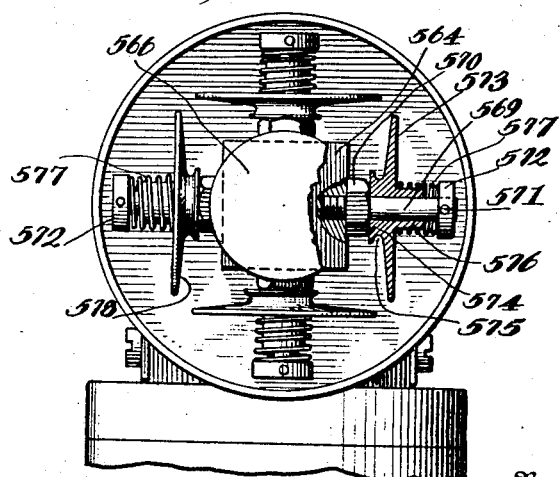
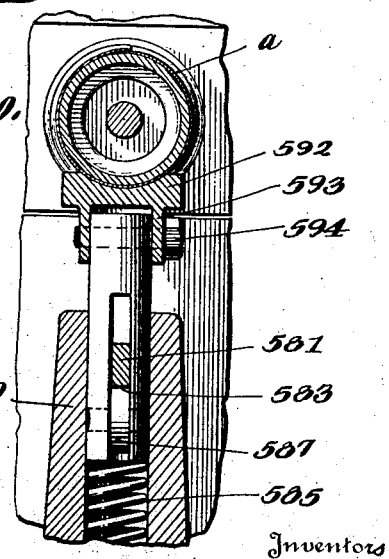
Inventors
Edwin G. Wessman and
Henry A. Stone
By Milans & Milans, Attorneys

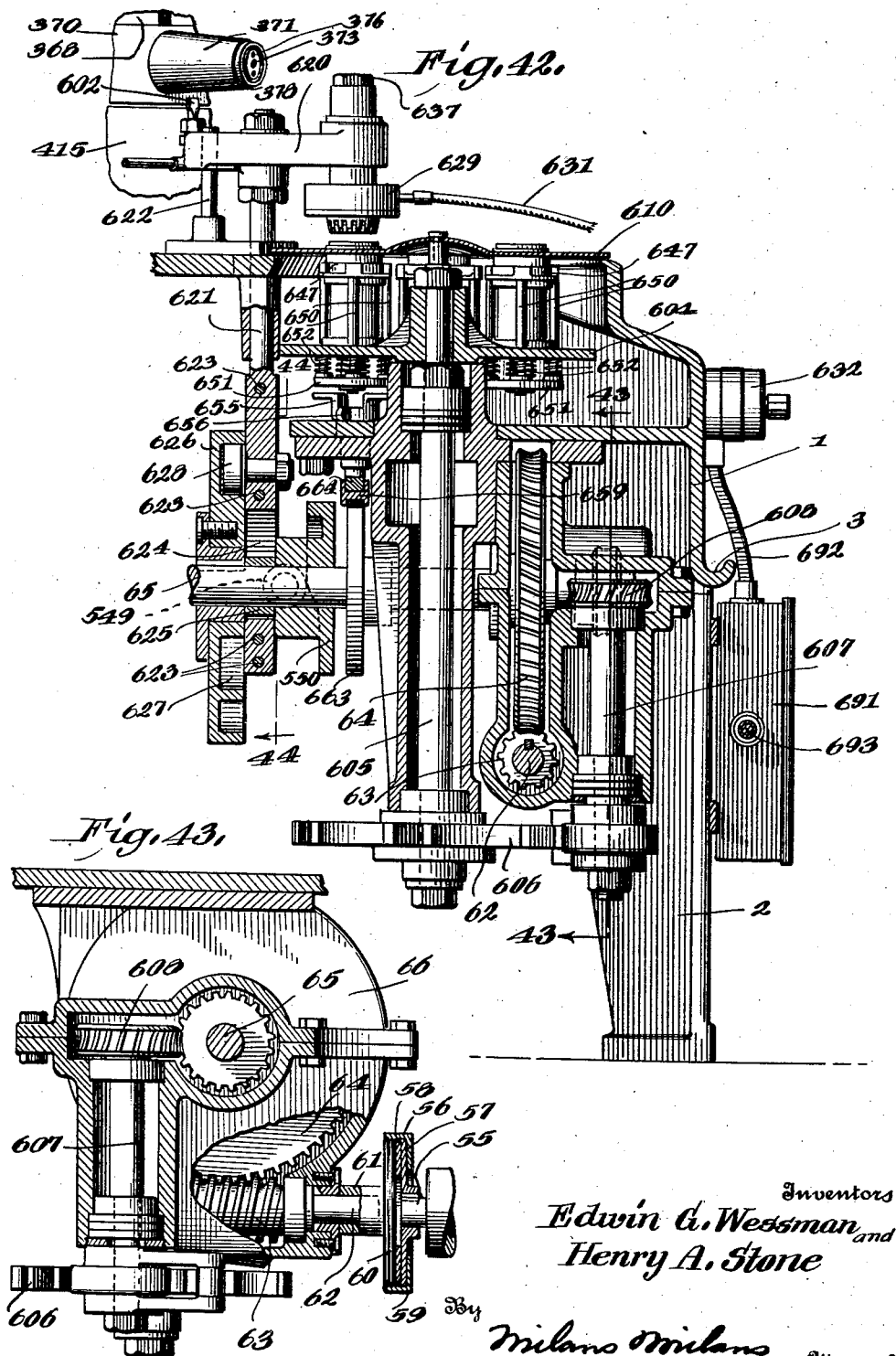

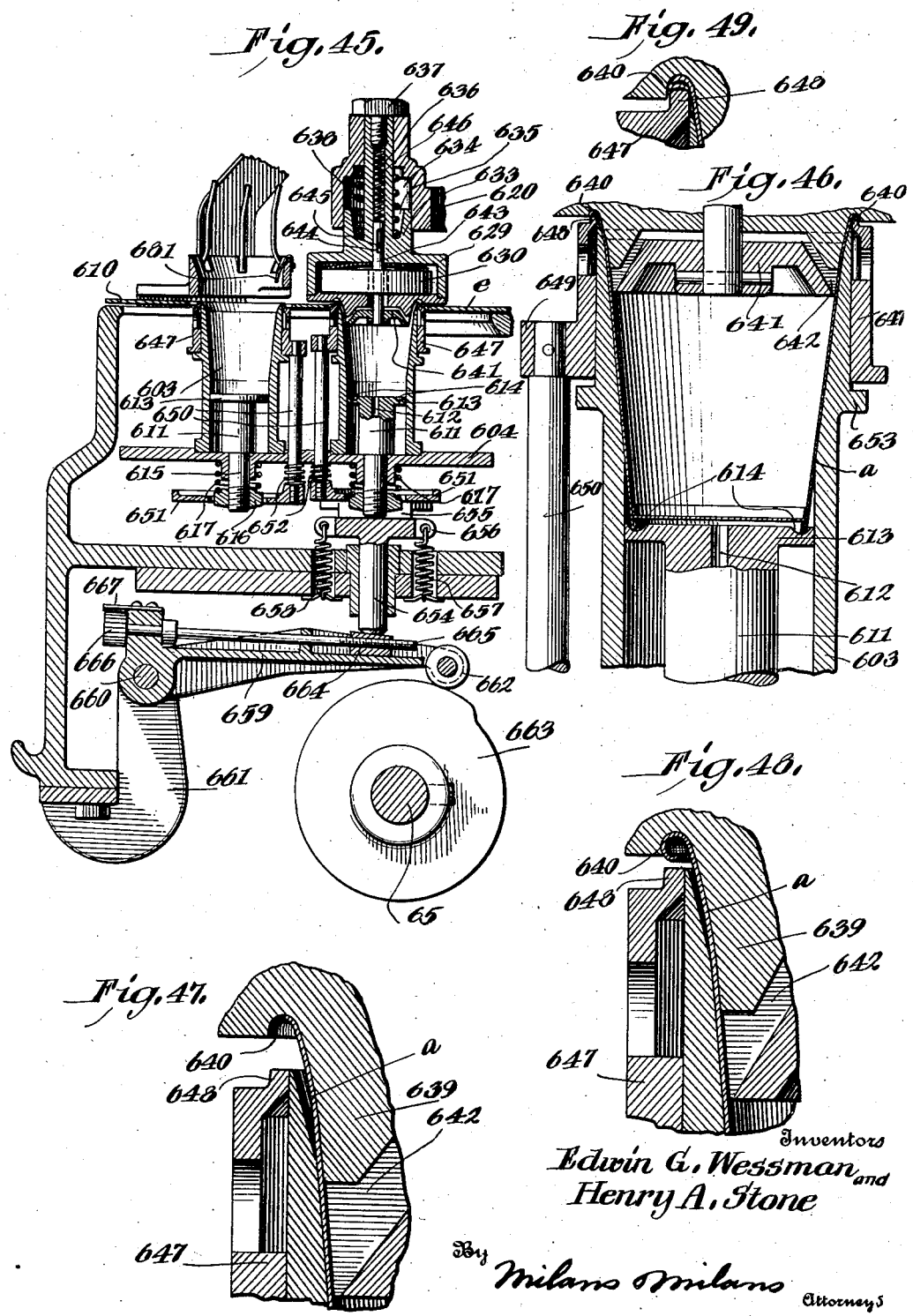

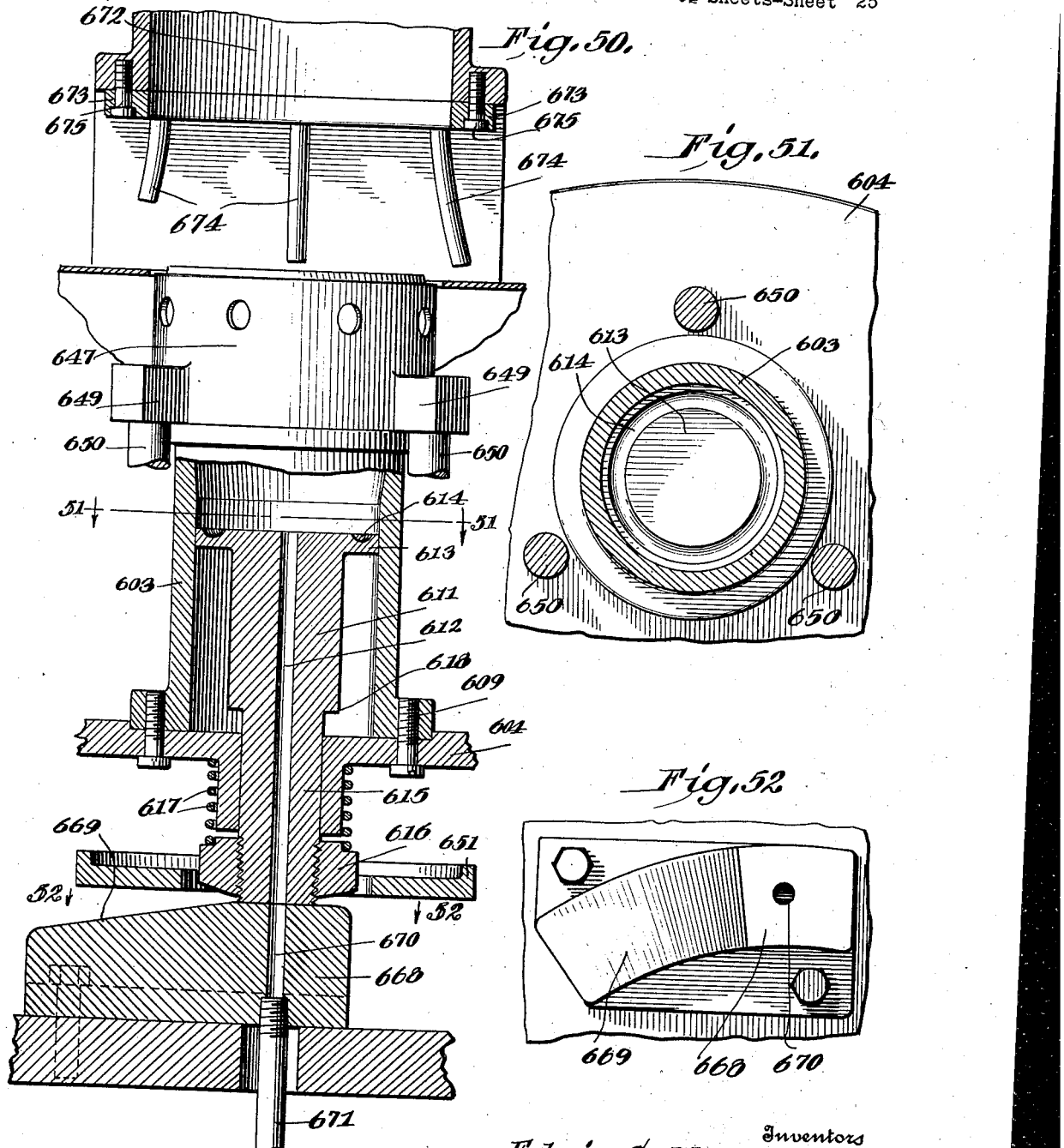

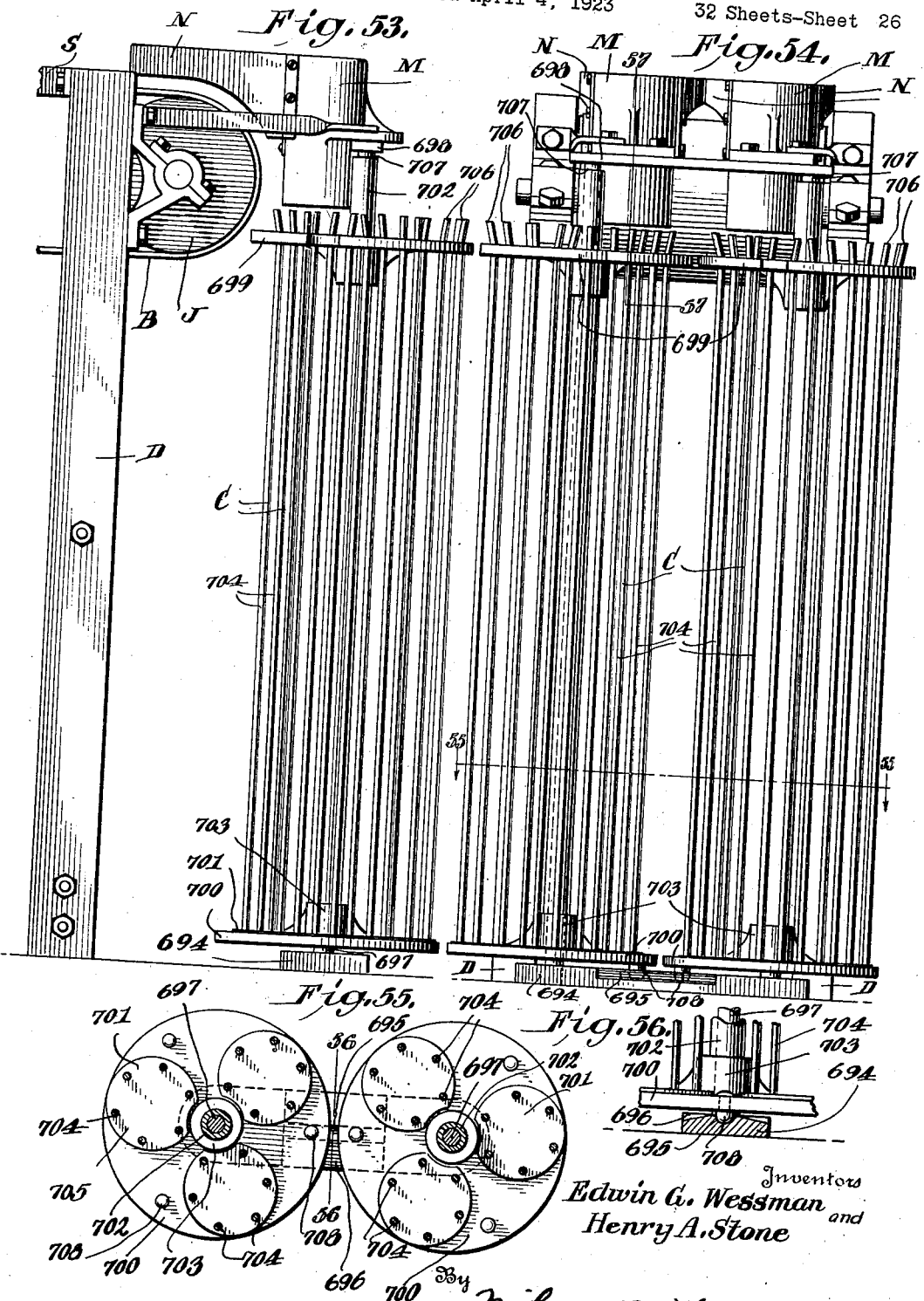

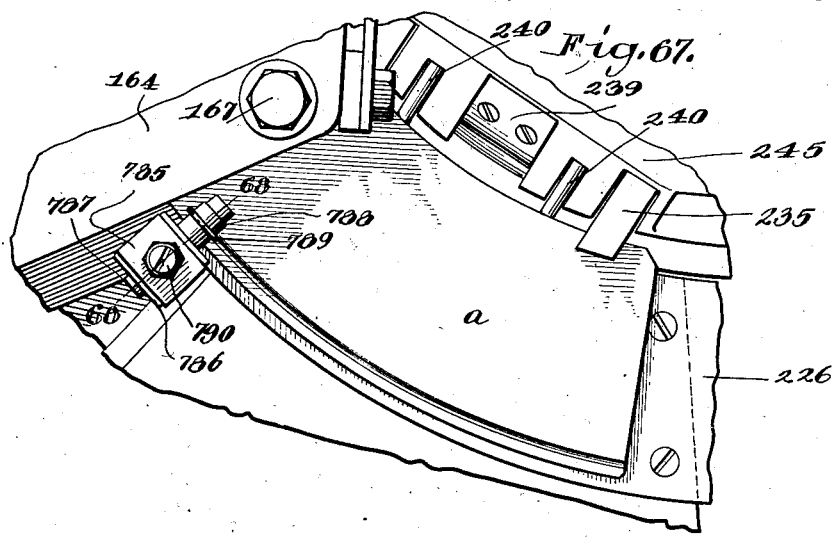
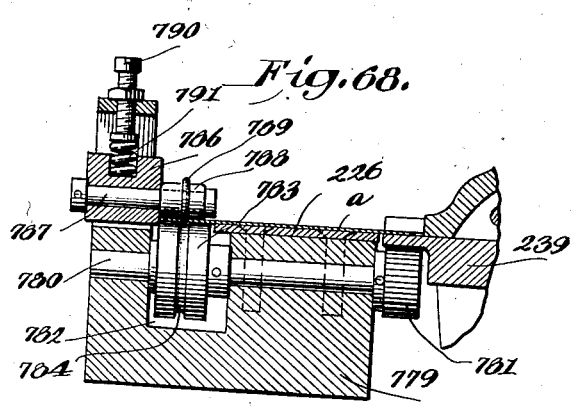
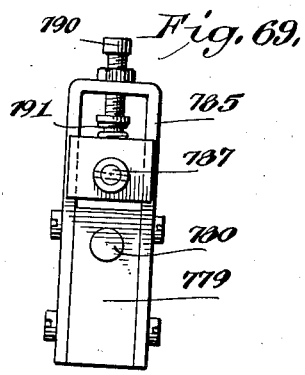
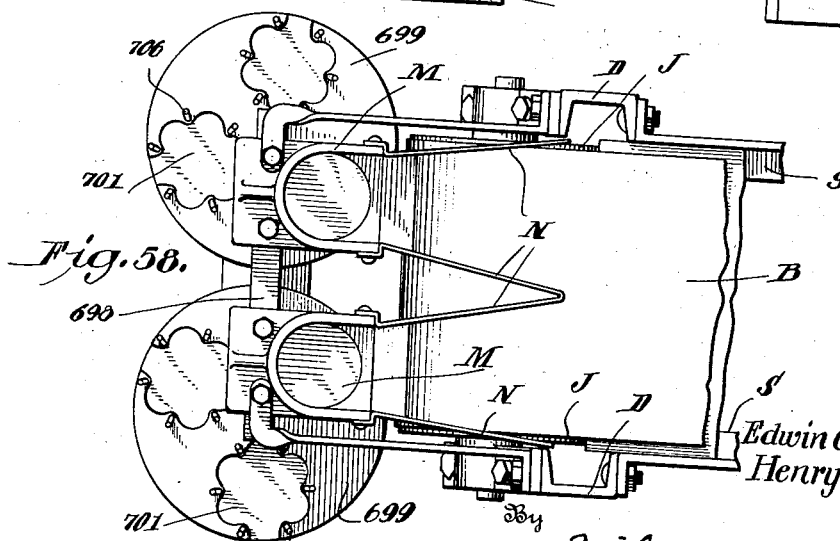

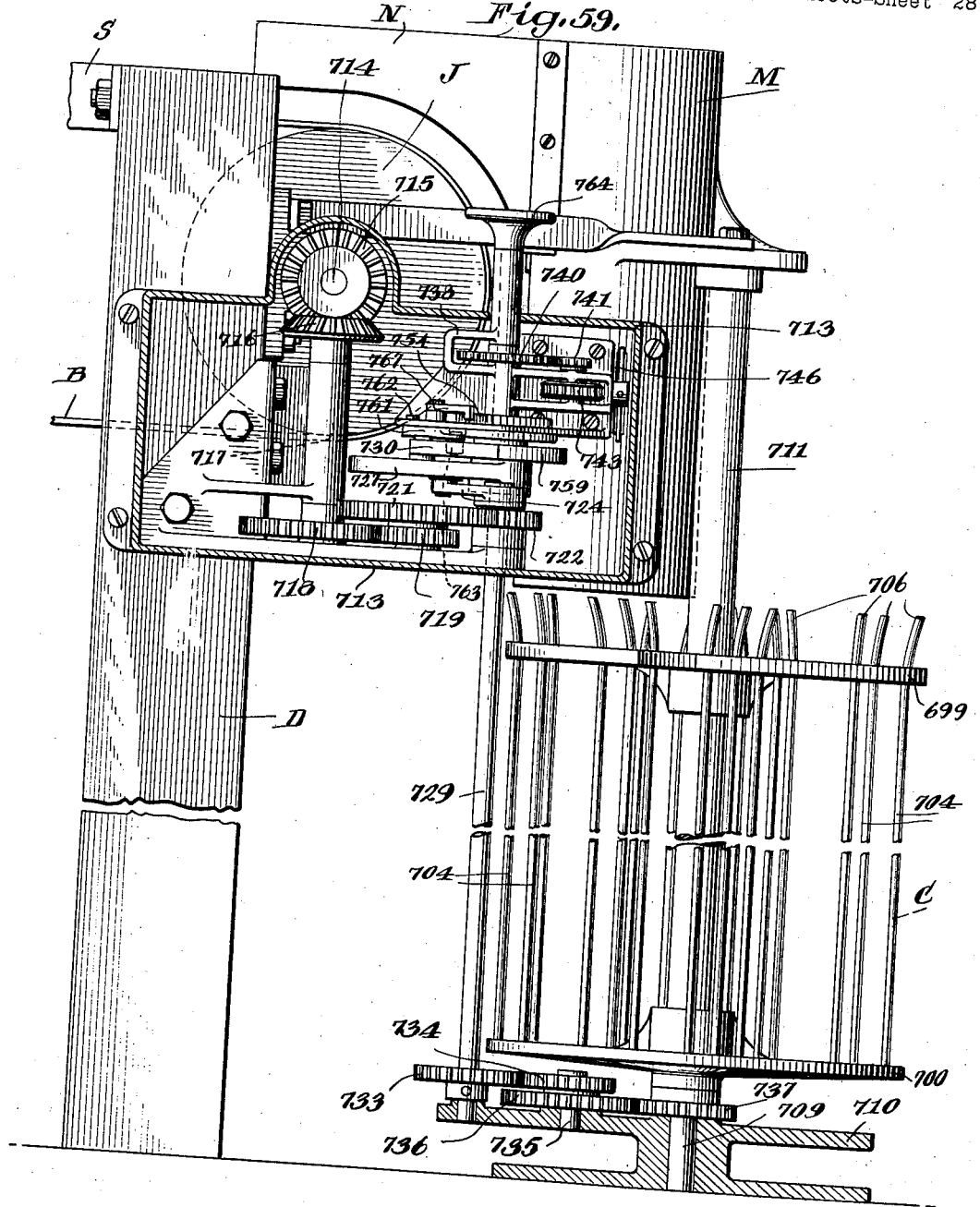

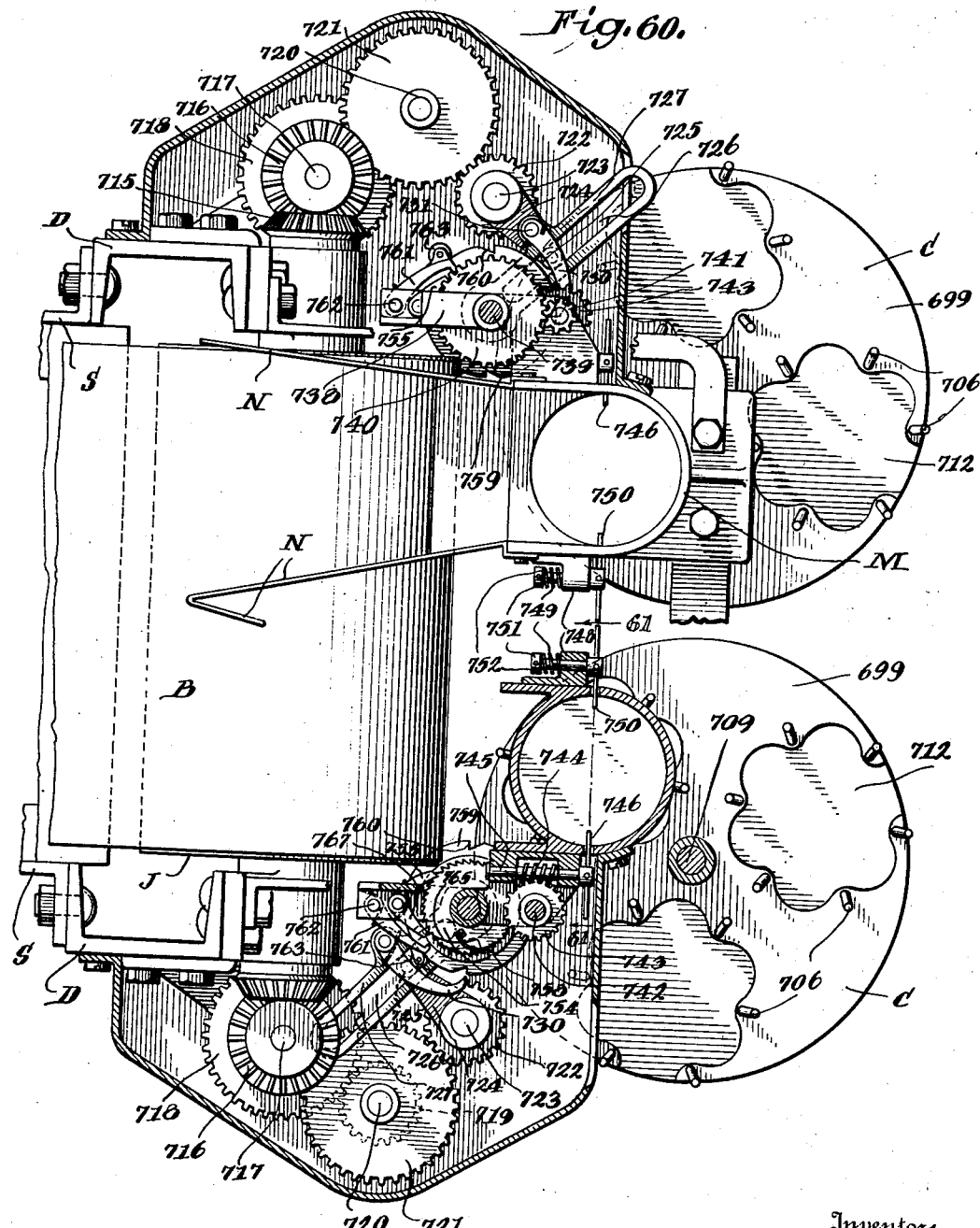

June 24, 1930.  E. G. WESSMAN ET AL  1,766,420
PAPER CUP MAKING MACHINE
Filed April 4, 1923    32 Sheets-Sheet 30
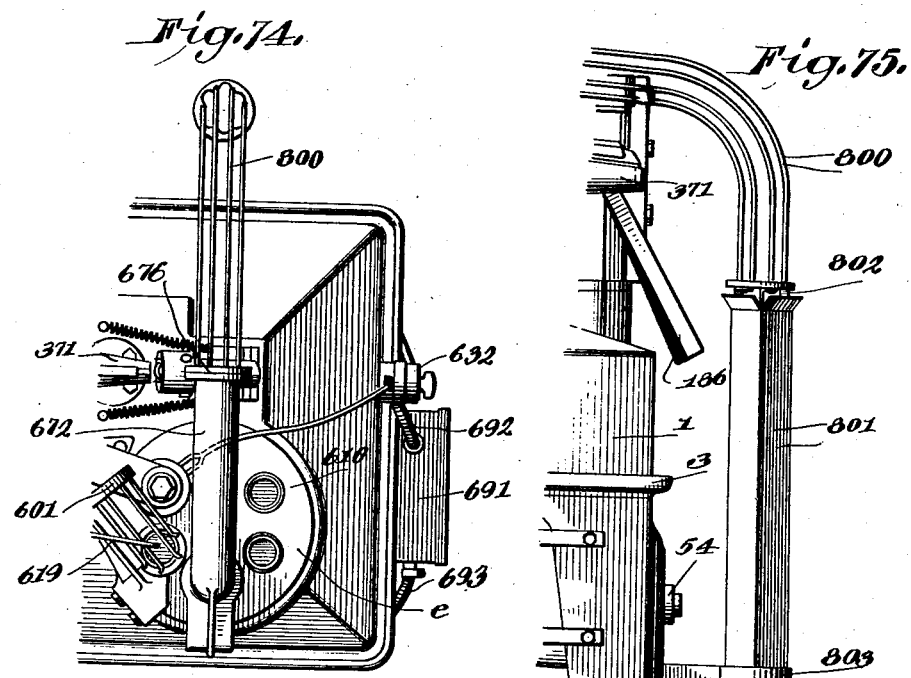
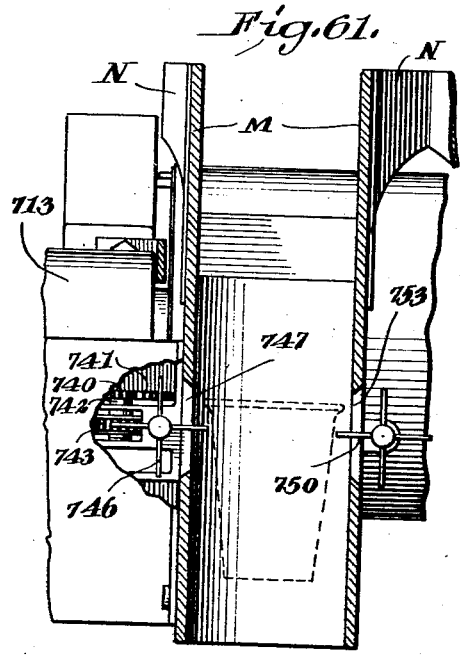
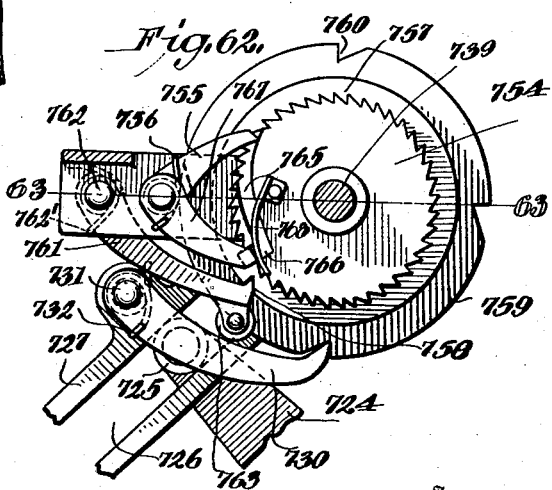
Inventors
Edwin G. Wessman and
Henry A. Stone
By Milans Milans
Attorneys June 24, 1930.  E. G. WESSMAN ET AL  1,766,420
PAPER CUP MAKING MACHINE
Filed April 4, 1923   32 Sheets-Sheet 31

Inventors
Edwin G. Wessman and
Henry A. Stone
By Milans Milans
Attorneys

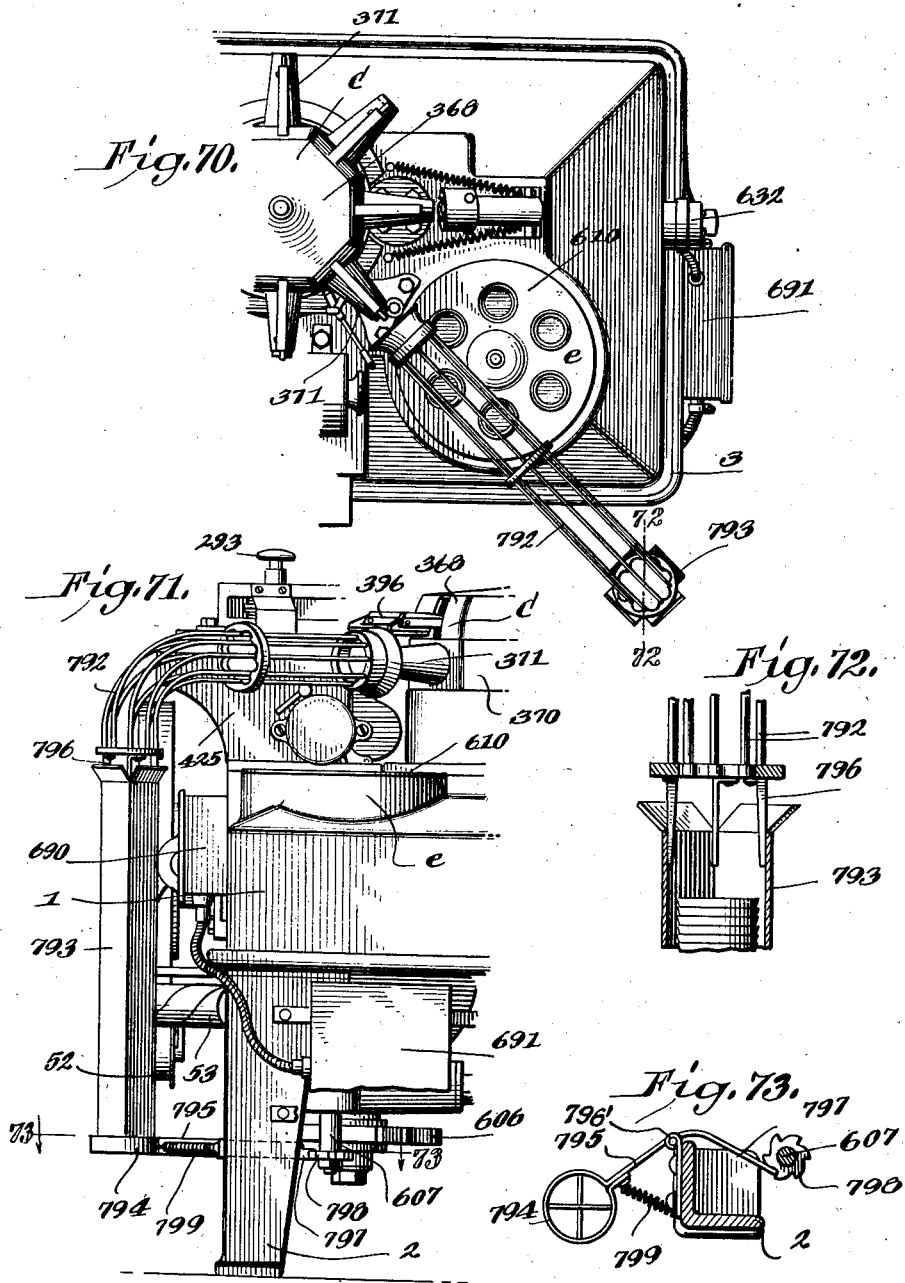

Patented June 24, 1930

1,766,420

UNITED STATES PATENT OFFICE

EDWIN G. WESSMAN, OF EASTON, PENNSYLVANIA, AND HENRY A. STONE, OF BOGOTA, NEW JERSEY, ASSIGNORS TO INDIVIDUAL DRINKING CUP COMPANY INC., OF EASTON, PENNSYLVANIA, A CORPORATION OF PENNSYLVANIA

PAPER-CUP-MAKING MACHINE

REISSUED

Application filed April 4, 1923. Serial No. 629,783.

Our invention relates to new and useful improvements in machines for making paper receptacles and more particularly to a machine for making paper drinking cups primarily intended for but a single use. In recent years, for sanitary reasons, paper drinking cups have come into extensive use and in view of the fact that, as above stated, they are intended for but a single use it is necessary that they be made in large quantities and at such a cost that they may be sold at a cheap rate in order that the expense of use may be reduced to a minimum. A number of different forms of such paper cups have been in use, such as the flat "envelope" type and the relatively rigid cylindrical form of cup, but it has been found that the latter cup has many advantages over the other forms in that it is normally of a shape adapting it for instant use and can be readily held in the hand so that one may drink therefrom without danger of the cup collapsing. At the same time these cylindrical form of cups must be formed of relatively thin and cheap material so that a single use will practically destroy the same and, if desired, they may be readily crushed in the hand and thrown away. These cylindrical cups have a further advantage in that they may be easily nested for packaging and shipment and for placing in dispensing apparatus usually employed for holding a plurality of the nested cups, the dispensing apparatus holding and retaining the cups in sanitary condition until they are used. The cylindrical paper cups as previously made usually comprise a body or wall portion and a bottom adapted to be secured therein, and it has been the usual custom, in making these cups, to first cut a plurality of blanks for both the body or wall and the bottom and then place them in a machine in which they are fed to forming and assembling members to complete the cup. It is the primary object of our invention to provide a machine which will form a complete cup without previously cutting the blanks therefor or in other words a machine which will take the rolls of paper, from which the cups are to be formed, and by a continuous operation form a complete cup having a cylindrical body or wall portion and a bottom secured therein.

It is a further object of our invention to provide a machine which not only forms the complete cups but sterilizes them to make them perfectly sanitary and then delivers them either directly into packages for shipment or delivers them upon an endless conveyor which carries them to suitable receptacles from which they may be removed and placed in the packages.

Broadly speaking our machine comprises means for supporting two rolls of paper, the paper from one roll being adapted to be cut for forming the body or wall portion of the cup and the paper from the other roll being adapted to be cut to form the bottom of the cup, the paper from each of the rolls being fed through suitable mechanisms to cutting dies by which they are cut into the desired shapes. Three revolving turrets are provided and the cut blanks for the body or wall portions of the cup are delivered to the first revolving turret which carries them around into position beneath tapered forming mandrels carried by the second revolving turret. Previous to positioning the body or wall blank beneath the forming mandrel one of the blanks to form the bottom has been drawn or formed over the end of the forming mandrel and is held thereon by suction. When the forming mandrels of the second turret reach a position over one of the body blanks then mechanism is operated to position the body blank around the forming mandrel thereover and the body blank will be secured to the bottom by adhesive, which has been applied to the body blank during the rotation of the first turret, and the longitudinal edges of the body blank will be connected together by a line of adhesive also applied during the rotation of the first turret. The turret number 2 also carries, over each of its forming mandrels, a member which is adapted to strike the cup formed on the mandrel a sharp blow over the longitudinal line of adhesive so as to embed the adhesive into the fibres of the paper to form a secure seal. The continued operation of the second revolving turret brings the cup into line with a mechanism for curling the bottom edge of the body beneath the bottom and then as the second turret further revolves it brings the forming mandrel containing the cup adjacent the upper end of a chute which extends over cups or female dies carried by the third revolving turret. When the mandrels have been so brought in line with the chute the cup contained thereon is blown from the mandrel and delivered to one of the cups or female forming dies of the third turret and the third turret revolves and brings the cup in position beneath an iron or male die member which is lowered to flange or curl the upper edge of the cup, said ironing device, being heated, causes the curl or flange to set and at the same time transferring heat through the paper cup and the female die members of the third revolving turret so as to thoroughly sterilize the paper cup throughout its entire surface. After the flange has been formed on the top of the cup the flange forming iron is raised and the continued rotation of the third turret brings the cup in line beneath a chute and the cup is adapted to be blown from the female die of this turret number 3 and discharged through the chute into a package or carton or on to a conveyor which carries them to a receptacle from which they may be removed for placing in the packages or cartons. We also provide novel means for tensioning the paper as it is drawn from the two rolls and also provide means for cutting the waste paper, after both the body and bottom blanks have been cut, and delivering said cut waste paper into suitable receptacles.

From the above general description it will be seen that we have provided a machine for making a complete cup and while we have illustrated and described the preferred embodiments of the invention, as they now appear to us, it will be understood that such changes may be made as will fall within the scope of the appended claims.

In the drawings:

Fig. 1 is a side elevation showing two aligned machines with a single conveying belt adapted to receive the cups from the machines and to deposit them into a receptacle at the end of the conveyor.

Fig. 2 is a top plan of the arrangement of machines as shown in Fig. 1.

Fig. 3 is a side elevation of one side of one of the machines.

Fig. 4 is a side elevation of the opposite side of the machine.

Fig. 5 is an end elevation of that end of the machine from which the paper is fed.

Fig. 6 is an end elevation of the opposite end of the machine.

Fig. 7 is a top plan of the machine and a portion of the conveying belt.

Fig. 8 is a longitudinal vertical section on the line 8—8 of Fig. 7 looking in the direction of the arrows.

Fig. 9 is a transverse vertical section on the line 9—9 of Fig. 7 looking in the direction of the arrows.

Fig. 10 is a horizontal section on the line 10—10 of Fig. 8 looking in the direction of the arrows.

Fig. 11 is a horizontal section on the line 11—11 of Fig. 8 looking in the direction of the arrows.

Fig. 12 is a horizontal section on the line 12—12 of Fig. 8 looking in the direction of the arrows.

Fig. 13 is a fragmental longitudinal vertical section on the line 13—13 of Fig. 7 showing the mechanism for feeding the paper for forming the body blank and the ram carrying the movable cutting die for the body forming blank.

Fig. 14 is a fragmental section on the line 14—14 of Fig. 13 looking in the direction of the arrows.

Fig. 15 is a fragmental section on the line 15—15 of Fig. 14 looking in the direction of the arrows.

Fig. 16 is a transverse vertical section on the line 16—16 of Fig. 8 looking in the direction of the arrows.

Fig. 17 is a horizontal section on the line 17—17 of Fig. 8 looking in the direction of the arrows.

Fig. 18 is a horizontal section on the line 18—18 of Fig. 8 looking in the direction of the arrows.

Fig. 19 is a section on the line 19—19 of Fig. 17 looking in the direction of the arrows.

Fig. 20 is a vertical section on the line 20—20 of Fig. 16 looking in the direction of the arrows.

Fig. 21 is a horizontal section on the line 21—21 of Fig. 20 looking in the direction of the arrows.

Fig. 22 is a section on the line 22—22 of Fig. 21 looking in the direction of the arrows.

Fig. 23 is a horizontal section through the glue boxes.

Fig. 24 is a vertical section on the line 24—24 of Fig. 23 looking in the direction of the arrows.

Fig. 25 is a vertical section on the line 25—25 of Fig. 24 looking in the direction of the arrows.

Fig. 26 is a horizontal section on the line 26—26 of Fig. 24 looking in the direction of the arrows.

Fig. 27 is a section on the line 27—27 of Fig. 23 looking in the direction of the arrows.

Fig. 28 is a vertical section on the line 28—28 of Fig. 26.

Fig. 29 is a section on the line 29—29 of Fig. 25 looking in the direction of the arrows.

Fig. 30 is a vertical section on the line 30—30 of Fig. 31 looking in the direction of the arrows and showing the mechanism for feeding the paper from which the blank for forming the bottom is cut, the mechanism for cutting the bottom blank, and the mechanism for forming the bottom.

Fig. 31 is a transverse vertical section on the line 31—31 of Fig. 30 looking in the direction of the arrows.

Fig. 32 is a section on the line 32—32 of Fig. 31 looking in the direction of the arrows.

Fig. 33 is a section on the line 33—33 of Fig. 31 looking in the direction of the arrows.

Fig. 34 is a fragmental longitudinal vertical section through one of the forming mandrels.

Fig. 35 is a transverse vertical section on the line 35—35 of Fig. 8 looking in the direction of the arrows, the body forming arms being shown in lowered or open position.

Fig. 36 is a view similar to Fig. 35 with the body forming arms in raised or closed position.

Fig. 37 is a fragmental section through the raised or closed body forming arms, illustrated in Fig. 36, with the seam hammer or contact clamp in lowered or engaging position.

Fig. 38 is a section on the line 38—38 of Fig. 10 looking in the direction of the arrows.

Fig. 39 is a longitudinal vertical section on the line 39—39 of Fig. 7 looking in the direction of the arrows.

Fig. 40 is a transverse vertical section on the line 40—40 of Fig. 39 looking in the direction of the arrows.

Fig. 41 is an end view of the bottom curling member with parts broken away.

Fig. 42 is a section on the line 42—42 of Fig. 7 looking in the direction of the arrows.

Fig. 43 is a vertical section on the line 43—43 of Fig. 42 looking in the direction of the arrows.

Fig. 44 is a section on the line 44—44 of Fig. 42 looking in the direction of the arrows.

Fig. 45 is a transverse vertical section on the line 45—45 of Fig. 7.

Fig. 46 is a fragmental transverse vertical section through the top flange forming dies showing one of the paper cups in position.

Fig. 47 is a fragmental detail showing the initial engaged position of the flange forming dies in the step of forming the flange on the upper edge of the paper cup.

Fig. 48 is a fragmental detail showing the upper edge of the paper cup in rolled position.

Fig. 49 is a fragmental detail showing the last position of the forming dies in forming the flange on the upper edge of the paper cup.

Fig. 50 is a section on the line 50—50 of Fig. 7.

Fig. 51 is a horizontal section on the line 51—51 of Fig. 50 looking in the direction of the arrows.

Fig. 52 is a section on the line 52—52 of Fig. 50 looking in the direction of the arrows.

Fig. 53 is a detail side elevation of the receptacles for receiving the cups from the conveyor.

Fig. 54 is an end view of Fig. 53.

Fig. 55 is a horizontal section on the line 55—55 of Fig. 54 looking in the direction of the arrows.

Fig. 56 is a fragmental detail on the line 56—56 of Fig. 55.

Fig. 57 is a fragmental section on the line 57—57 of Fig. 54.

Fig. 58 is a top plan of Fig. 53.

Fig 59 is a side elevation with parts in longitudinal vertical section showing a slightly modified form of receptacle for receiving cups from the conveyor and means for operating the same.

Fig. 60 is a top plan, with parts in horizontal section, of the construction shown in Fig. 59.

Fig. 61 is a section on the line 61—61 of Fig. 60 looking in the direction of the arrows.

Fig. 62 is a detail showing a plan of a portion of the operating mechanism for the modified form of the receptacle shown in Figs. 59 and 61.

Fig. 67 is a plan of a further modification showing mechanism for embossing a bead adjacent the top of the body or side of the cup.

Fig. 68 is a section on the line 68—68 of Fig. 67.

Fig. 69 is an end view of Fig. 68.

Fig. 70 is a fragmental top plan of a further modified form of the invention wherein the cups are blown directly from turret number 2 through a chute into a package or container.

Fig. 71 is a fragmental end view of the construction shown in Fig. 70.

Fig. 72 is a section on the line 72—72 of Fig. 70.

Fig. 73 is a horizontal section on the line 73—73 of Fig. 71.

Fig. 74 is a fragmental top plan of a further modified form of the invention in which the cups are conveyed directly from the receptacles of turret number 3 into a package or carton, and Fig. 75 is a fragmental end view of the construction shown in Fig. 74.

Figure 63:
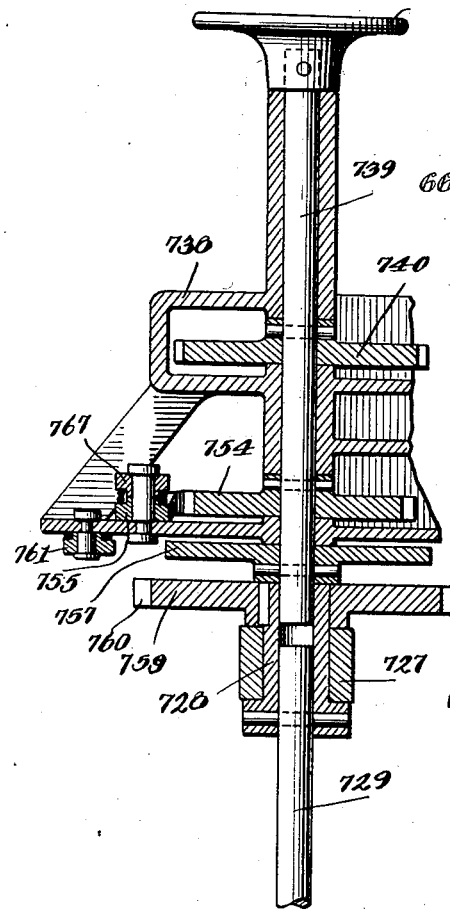
Fig. 63 is a section on the line 63—63 of Fig. 62.

In the drawings A represents the machine for making the complete paper cups, B the conveyor for receiving the cups from the machines and carrying them to the receptacles C from which they may be removed and placed in packages or cartons. The conveyor is supported by the standards D and is driven by the motor E which has the shaft F provided with the worm G which meshes with a gear H on the shaft I. A roller, not shown, is also carried by the shaft I and the belt forming the conveyor passes around said roller and also around the roller J supported on the standards D at the opposite end of the conveyor. The conveyor will receive the cups from a plurality of machines, as quite clearly illustrated in Figs. 1 and 2 of the drawings, and the cups from each of the machines will be positioned upon the conveyor in a line. The cups from that machine, furthest from the receiving receptacle C, are initially placed upon the conveyor adjacent that edge nearest the machine but prior to reaching the point of the other machine they are directed towards the opposite longitudinal edge of the conveyor by means of the inclined guide K, more particularly illustrated in Fig. 2 of the drawings, so that the cups from the second machine may then be deposited in a line adjacent that edge of the conveyor nearest the machine. The cups are placed upon the conveyor, in a manner to be later described, with the open end down and are so spaced that they may be readily inspected to see if they are perfect. Supported at the discharge end of the conveyor, by means of the brackets L are the vertically extending tubes or chutes M each of said chutes being in alignment with one of the compartments of the receptacles C. An arm N extends inwardly over the discharge end of the conveyor, and longitudinally thereof, as is quite clearly shown in Figs. 1 and 2 of the drawings, and this arm N guides the cups from the rows in which they are deposited on the conveyor to the proper tube or chute M to be dropped into the receptacle C. A transversely extending bar O is also positioned at the discharge end of the conveyor and will be engaged by the edge of the cups in such a manner as to turn or reverse the cups, from their original position upon the conveyor, and discharge them through the chutes or tubes M with the closed or bottom end lowermost. It will thus be seen that as the cups are dropped, from the conveyor, into the receptacles C that they will readily nest so that a number of the cups may be received in each compartment of the receptacle and may be removed therefrom to be placed in packages or cartons for shipment. The detail construction of the receptacle C, the manner of mounting the same, and the manner of rotating, will be described in detail later. A receptacle P is placed beside each of the machines, on the conveyor side, to receive waste paper in a manner to be later described, and a depending guard plate R is secured to the side of the conveyor, to extend over the receptacle P to guide the waste paper into the receptacle and to prevent it from being discharged on to the conveyor or in such a position as to prevent the proper operation of the conveyor. Extending beneath the upper flight of the conveyor is a plate or tray S having the upstanding side flanges which extend longitudinally of the side edges of the conveyor and prevent lateral movement of the same. This plate or tray is secured to the standards D and is also supported intermediate its ends by means of the standards T and mounted between the standards T is a roller U over which the lower flight of the conveyor passes. The motor E is supported upon the arm or bracket V which is connected to one of the standards D and a housing W is also supported upon this arm or bracket and encloses the shaft F and the gears G and H.

The machine A comprises a combined table or housing 1 which is supported from the floor by means of the legs 2 and the lower edge of this table or housing is formed with the reinforcing bead or flange 3 which extends entirely therearound as more particularly illustrated in Fig. 7 of the drawings. This bead or flange 3 as shown is trough shape and should any grease or moisture accumulate on the table or housing receives the same. Secured to and extending from one end of the machine are the transversely spaced arms 4 the upper edges of which are upwardly inclined at the outer ends as shown at 5 for a purpose which will be later described. Formed in the upper edge of each of the arms 4 is an elongated recess or pocket 6 in which are rotatably mounted the bearing rollers 7 upon which the shaft 8. Adapted to be secured upon the shaft 8, in spaced relation, are the plates 9 and 10, which are provided with the flanges 11 and the outer extending collars 12 as more particularly shown in Fig. 10 of the drawings, and the plates 9 and 10 are adapted for supporting and positioning the sleeve 13, preferably of metal, upon which is wound the paper 14 from which are cut the blanks to form the body portion of the cup. The plates 9 and 10 may be secured to the shaft 8 by screws 15 or other suitable fastening means. When a roll of the paper 14 is to be placed upon the shaft 8 the shaft, of course, will be removed from its position upon the rollers 7 carried by the arms 5 and the plate 10 will be removed. The shaft 8 will then be passed through the sleeve 13 carrying the paper and the edge of the sleeve 13 will be positioned against the flange 11 of the plate 9. The plate 10 will then be slid upon the shaft 8 so that its flange 11 will engage the opposite end of the sleeve. The plate 10, as previously described, will then be secured in its proper position by means of the screw or other suitable fastening member 15. With the roll of paper thus upon the shaft the ends of the shaft are engaged with the inclined edges 5 of the arms 4 and by further movement of the roll of paper the ends of the shaft 8 will ride up over the inclined portions 5 of the arms until the ends of the shaft engage upon the roller bearings 7. It will thus be seen that the inclined portions 5 act as means for raising the roll of paper and positioning the same upon the roller bearings. Supported between the arms 4 is a rod 16 and pivotally supported upon this rod is an arm 17 to the upper end of which are connected the sections 18 and 19 of a brake band which is adapted to encircle the hub 12 upon the plate 9. The sections 18 has an extension 20 through which passes a rod 21 having a link 22 secured to one end and a nut 23 threaded upon the opposite end. Surrounding the rod 21 between the extension or projection 20 and the nut 23 is a coiled spring 24. Pivotally connected to the outer end of the link 22 is a lever 25 and when the brake band sections 18 and 19 are positioned around the hub of the plate the link will engage over an extension or projection 26 on the brake band section 19 and the end of the lever 25 will engage the outer face of said extension or projection. It will be seen that the spring 24 will allow the rod 21 to slide sufficiently to position the link 22 over the projection 26. The brake band will frictionally engage the hub and prevent too rapid rotation of the roll of paper. When a new roll of paper is to be placed in position upon the shaft 8 the brake band will be disengaged from around the hub of the plate and the arm 17 may be swung towards the end of the machine. A rod 27 extends at an angle from the arm 17 and when the said arm 17 is swung towards the machine the end of the rod 27 will engage the floor and prevent the arm 17 with its associated brake band from contacting with the machine. Secured to the outer face of each of the arms 4 is a plate 28 and secured to the outer face of each of the plates 28 is a guide 29. An arm 30 is received between each of the plates 28 and guide 29 and a screw rod 31 extends through each of the plates 30 and engages the end of the shaft 8 to properly adjust the shaft and prevent transverse movement thereof but allowing free rotation. The ends of the screw rods 31 are bent at right angles to form the handles 32. Secured to the lower end of each of the arms 30 and to the arm 4 is a coiled spring 33 and mounted between the upper ends of the two arms 30 is a roller 34 around which the paper 14 will be wound as quite clearly shown in Figs. 3 and 4 of the drawings. The pivoted arms 30 with the roller 34 act as a tensioning device for the paper, the springs 33 normally drawing the lower ends of the arms 30 towards the end of the machine and thereby forcing the upper ends of the arms with the roller 34 away from the end of the machine to place the paper under tension. The paper 14 is used for making the blanks for the body of the cup.

Secured to one side of the table or housing 1, by means of the bolts 35 is a plate 36 having the outwardly extending bearing arm 37. Rotatably carried by the plate 36 and the bearing arm 37 is a shaft 38 which is provided adjacent its inner end with a circumferentially extending groove 39 in which may extend a screw or pin not shown for preventing longitudinal movement of the rod. The outer end of the rod 38 is reduced as shown at 41 and mounted upon this reduced portion are the plates 42 and 43, the plate 42 having the inwardly extending collar 44 and the plate 43 having the inwardly extending collar 45 the said collars 44 and 45 when the plates are in proper position, engaging as shown more particularly in Fig. 16 to space the plates. Recesses 46 are formed in the reduced portion 41 and a screw 47 is carried by the plate 43 and is adapted to engage in one of the recesses 46 for securing the plates upon the end of the shaft. Adjacent their outer circumferential edges each of the plates 42 and 43 is formed with an inwardly extending flange 48 to form a support for the sleeve 49 upon which is wound the paper 50 which is used in forming the bottoms of the cups. The sleeve 49 is positioned upon the flanges 48 between the plates 42 and 43 so that it may rotate as the paper 50 is unwound. Extending from the same side of the machine that supports the paper 50 is a bracket 51 in which are mounted a roller 52 and a bearing block 53. As the paper 50 is unwound it is brought over the roller 52 and the bearing block 53 in the manner quite clearly shown in Figs. 4 and 6 of the drawings.

Suspended beneath the table or housing 1, at that end of the machine opposite to the end carrying the paper roll is an electric motor 54 the shaft 55 of which is connected to a friction clutch 56, said clutch comprising a plate 57 secured to the end of the shaft 55, a disc or plate 58 of felt or other suitable material, an interiorly threaded sleeve or casing 59 and an externally threaded head or plate 60. The degree of friction may be adjusted by the sleeve 59 which draws the plate 57 against the plate or disc 58. A sleeve 61 extends from the outer face of the disc or plate 60 and connected to this sleeve, and adapted to rotate therewith, is a rod 62 having its outer end formed as a worm gear 63. The worm gear 63 meshes with a gear 64 which is keyed to a shaft 65 extending longitudinally of the entire machine. This shaft 65 may be broadly termed the main drive shaft of the machine for most of the operating parts are operated therefrom. The construction of the clutch and its associated driving mechanism is more clearly illustrated in Fig. 43 of the drawings. The worm gear 63 and the gear 64 are enclosed in the housing 66. The shaft 65 will be rotatably supported in suitable bearings as shown.

The paper 14, on the roll supported at the end of the machine when it is taken from the roll is carried around a roller 67, then around the roll 34 to be fed to the cutting dies to be later described. The roller 68 is connected to the rotatable shaft 70 mounted between the side plates 71 and the roller 69 is secured to the rotatable shaft 72 carried by the frame 73 pivotally mounted upon a shaft 74 which is supported between the side plates 71. At one end the frame 73 is provided with the forwardly extending handle 75 and the rearwardly extending lug 76 having the vertically extending eye 77. Secured to the shaft 72 carrying the roller 69 is a gear wheel 78 which is adapted to normally mesh with the gear wheel 79 secured to the shaft 70. A second gear wheel 80 is secured to the shaft 70 and is adapted to normally mesh with the gear wheel 81 which is secured to the shaft 82 supported between the sides plates 71. Secured to the gear wheel 81, by means of the screws 83 or other suitable fastening means is a ring or band 84 having the circumferentially spaced notches 85 in its outer edge. Mounted upon the shaft 82, for free swinging movement, is a bell crank lever including the arms 86 and 87. The arm 86 has its lower end formed with an offset 88 which extends beneath the gear wheel 81 and the plate 83, as more particularly shown in Fig. 14 of the drawings, and is provided with a socket 89 in which is slidably mounted the pawl 90 having its shaft 91 extending through the bottom of the offset. The pawl 90 is adapted to normally engage in one of the teeth 85 of the plate 84 and is held in its raised position by means of a coiled spring 92 which is received in the socket 89, beneath the pawl 90, and surrounds the pawl shaft 91. A pin 93 is carried by the arm 87 of the bell crank lever and supports a block 94 for swinging movement. Connected to the block 94, by the bolt 95, for swinging movement, is the yoke 96 having the downwardly extending interiorly threaded sleeve 97 which receives the upper threaded end of the vertically extending rod 98. The lower end of the rod 98 is connected to the crank arm 99 which is secured upon the end of the shaft 65 by means of the screw or bolt 100 as more clearly illustrated in Fig. 13 of the drawings. The crank arm 99 has the horizontally extending pin 101 which passes through the eye 102 at the lower end of the rod. Each of the rollers 68 and 69 is formed with transversely spaced circumferentially extending grooves 103 to which extend the fingers 104 and 105 at the end of a guide tube 106 which receives the paper 14 after it has been drawn through the rollers. The fingers 104 and 105, extending into the grooves 103, will take the paper from the rolls and properly guide the same into the guide tube. The arrangement of the fingers with respect to the rollers and the guide tube is more clearly illustrated in Fig. 13 of the drawings. It will be seen that as the drive shaft 65 rotates it in turn, through means of the crank arm 99, raises and lowers the rod 98 to swing the bell crank lever upon the shaft 82. The pawl 90, engaging in one of the notches 85, of the ring 84, will rotate the gear wheel 81, as the bell crank lever is swung, and this gear wheel 81 in turn will rotate the roller 68 and the roller 68 in turn will rotate the roller 69 to feed the paper 14 therebetween. The feeding movement is effected when the rod 98 is forced upwardly and when the rod 98 goes downwardly the pawl will move freely around the edge of the ring or band 84 until it reaches the next notch 85. Reverse movement of the gear wheel 81 is prevented by the spring held pawl 107. The rollers 68 and 69 will draw the paper 14 from its roll and direct the same into the guide tube 106 from which it passes to embossing and cutting dies to be later described.

A vertically movable ram is mounted for operation at the end of the machine where the paper is fed and this ram comprises the side plates 108 having the outwardly extending beveled vertical flanges 109 and the horizontally extending head 110 at the upper end of the sides. Secured to one side of the head 110 is a plate 111 which has the horizontally extending arm 112. A rod or bolt 113 passes through the arm 112, through the lug or projection 76 of the frame 73, and its lower end is threaded as shown at 114 to engage in the member 115 secured to the side 108 of the ram. A collar or flange 116 is formed on the rod 113, intermediate its ends, and a coiled spring 117 surrounds the rod between the collar or flange 116 and the lower face of the lug or projection 76 on the frame 73. This coiled spring normally holds the roller 69 in engagement with the roller 68 but by engaging the handle 75 the frame may be swung upon the rod 74 to raise the roller 69 against the action of the spring 117. The roller 69 may be held in its raised position, when desired, such as when initially feeding the paper, by means of a cam lever 118 more particularly illustrated in Fig. 4 of the drawings. The roller 69 is also adapted to be intermittently raised from the roller 68 by the action of the ram and to accomplish this a screw 119 is carried by and extends through the arm 112 of the plate 111 secured to the head of the ram. As the ram is lowered the end of the screw will engage the lug or projection 76 and raise the roller 69 from the roller 68. As the ram again rises the roller 69 will be returned to its initial position by the coiled spring 117. The screw 119 may be adjusted as will be readily appreciated and will be held in its adjusted positions by means of the screw 120. A screw 121 is also carried by the arm 112 and is adapted to engage the rod 113. The tension of the spring 117 may be adjusted by the rod 113. The ram is slidable in a guide-way comprising the oppositely disposed L-shaped members 122 and the bars 123 having the inner beveled faces adapted to engage the beveled faces of the flanges 109 of the ram. The bars 123 are connected to the L-shaped members 122 by means of the bolts 124.

The means for raising and lowering the ram is more particularly illustrated in Fig. 16 of the drawings. A link 125 is pivotally connected to the frame of the machine at 126 and the opposite end is pivotally connected at 127 to the depending arm 128 of the yoke or collar 129 which surrounds the eccentric 130 secured to the drive shaft 65. The link 125 has pivotally connected thereto, intermediate its ends, a vertically extending link 131 the opposite end of which is pivotally connected to the depending arm 132 of the ram. It will thus be seen that as the drive shaft 65 revolves it carries with it the eccentric 130 which raises and lowers the yoke or collar 129 to swing the link 125 on its pivot 126. As the link 125 is raised and lowered it in turn, through means of the link 131, raises and lowers the ram in its guide-way. Secured to the top of the horizontally extending head 110 of the ram, by means of the bolts 133, is a plate 134 which has the transversely spaced vertically extending flanges 135 and the vertically extending transversely spaced openings 136. Slidably mounted in each of the openings 136 is a rod 137 which has secured to its lower end by means of a screw 138 a male embossing die 139. This embossing die has the upwardly extending projection 140 which is received in a socket formed in the end of the rod. The rod 137 has the vertically extending elongated slot 141 to receive the end of a screw 142 carried by the plate 134. The end of the screw 142 entering the slot 141 prevents the rod 137 from turning but allows it to have a free sliding movement. The upper end of the rod 137 is threaded as shown at 143 and secured upon this threaded end is a washer 144 which is adapted to engage the top of the flange 135 and limit the downward movement of the rod. At the upper end the rod 137 has a socket 145 in which is received a coiled spring 146. Extending upwardly from the plate 134 is a rod 147 which carries a bar 148 which extends over and engages the upper ends of the transversely spaced coiled spring 146 This bar 148 is secured upon the rod 147 by the nut 149. Adjacent each end the bar 148 is provided with a downwardly extending pin or projection 150 which is received within the coil of the spring 146 as more particularly illustrated in Fig. 19 of the drawings. It will be seen that the coiled springs 146 normally hold the embossing dies 139 in their lowermost position but in operation the die may yield upwardly under tension of the spring. Secured upon the top of the table or housing 1 is a supporting member 151 on the top of which are secured the transversely spaced plates 152 by means of the bolts 153. Secured to each of the plates 152, by means of the screws 154 are the female embossing dies 155, these female embossing dies being in line with the male embossing dies 139. As is quite clearly shown in Fig. 19 of the drawings the upper surfaces of the female dies 155 extend above the top of the plates 152. As the paper 14 is fed through the guide 106 it passes over the female embossing die and as the male embossing die comes down through an opening 156 in the guide it embosses the paper. Secured to the end of the plates 152 are the springs 157 which engage the under surfaces of the paper 14 and direct the same upwardly at an angle as is shown in Fig. 19 of the drawings to be positioned between the blank cutting members which will be described.

After the paper has passed from the embossing dies it is desired to cut the blanks for forming the body portion or side of the cup. In order to do this the male cutting die 158 is secured to the under side of the horizontally extending head 110 by means of the screws or bolts 159. A metal ring or band 160 surrounds the male cutting die 158, this metal ring or band being supported by the bolts 161 which extend through the head 110 as more clearly illustrated in Fig. 13 of the drawings. Nuts 162 are received on the bolts 161, engage the upper face of the head 110 and are used for vertically adjusting the bolts. A coiled spring 163 surrounds each of the bolts 161 between the under face of the head and the top of the ring or band 160 and these coiled springs normally hold the ring or band 160 in such a position that the lower face of said ring or band is slightly below the lower face of the die 158. It will thus be seen that the ring or band 160 may be moved relative to the die 158. Secured upon the arms 163' which extend inwardly from the support 151 is the female cutting die 164 having the cutting edge 165 and the vertically extending opening 166 which is of just a slightly greater diameter than that of the male die 158. The female die is secured to the arms 163 by the bolts 167. Secured to the under side of the ring or band 160, at each end, by means of the screws 168, is a guide plate 169 which receives the paper 14 as it is fed between the cutting dies as is clearly shown in Figs. 13, 18 and 19 of the drawings. The male and female cutting dies are of the shape shown in Figs. 17 and 18 of the drawings so as to cut a blank $a$ having the curved longitudinal edges and the inclined ends, one longitudinal edge being convexed longitudinally and the other longitudinal edge being concaved longitudinally, the concaved edge being of less length than the convex edge.

The blank is of the shape shown in Figs. 7 and 67 of the drawings. Secured to the inner edge of the horizontal head 110 by means of the bolts 170 is a knife blade 171 which, as is quite clearly shown in Figs. 13 and 19 of the drawings, extends below the lower face of the head and is adapted to cooperate with a knife blade 172 secured to the inner ends of the arms 163' by means of the bolts 173. Supported by the bolts 174, which pass through the head 110, is a plate 175 which is slidable just behind the blade 171. The bolt 174 is held in position and is adjustable through means of the nuts 176. A coiled spring 177 surrounds each of the bolts 174 between the lower face of the head and the top face of the plate. The springs normally hold the plate in position just a little below the cutting edge of the blade. Secured to one side of the ram head 110 by means of the bolts 178 is a bracket 179 having secured thereto by means of the bolts 180 a cutting blade 181. Secured to the end of the arm 163' supporting the female cutting die, by means of the bolts 182 is a bracket 183 which has secured thereto by means of the bolts 184 a cutting blade 185 which is adapted to cooperate with the cutting blade 181 for a purpose which will be later described. A chute 186 is secured in position adjacent the end of the female cutting die and has an apron 187 which extends in front of the said female cutting die. The chute and its apron are so positioned as to receive waste paper cut by the blades 160 and 172 and 181 and 185 in a manner to be later described. The chute extends downwardly at an angle so as to deposit the cut waste into the receptacle P positioned adjacent the side of the machine. It will be seen that the paper 14 is fed between the male and female cutting dies 158 and 164 with the edge of the paper engaging the guide plates 169. As the ram is lowered the ring or band 160 surrounding the male cutting die 158 first engages the upper surface of the paper and as the ram continues down the ring or band is forced upwardly against the tension of the springs 163 so that the male cutting die engages the paper and passes into the female cutting die 164 to cut the blanks, of the shape previously described, for forming the body or side of the cup. The movement of the paper is continued and after the blank is cut therefrom the waste paper will be cut into small pieces by the cutting blades 171 and 172 and will drop on to the apron 187 and be discharged down the chute 186 into the receptacle P. An air nozzle 188 discharges a blast of air over the apron 187 so as to carry the pieces of waste paper over the apron and down the chute. This air blast prevents the paper from accumulating and carries the same over the apron and chute. As the paper 14 is fed in position between the cutting dies the spring finger 157, as has been previously described, directs the paper upwardly into position to be engaged by the guide plates 169.

After the blank for forming the body or side is cut some means is necessary to receive the same and position it for continued operations. We have provided, for receiving the blank, suction cups which draw and hold the blanks, after being cut, and transfer them to suitable position to be engaged by fingers carried by a revolving turret to be later described. Supported by and extending through the top of the table or housing 1 is a sleeve 189 which has the flange 190, intermediate its ends, and adapted to rest upon the top of the table or housing. A rod 191 is slidably mounted in the sleeve and is provided, from its upper end, with a longitudinally extending bore 192, said bore terminating above the lower end of the rod and an opening 193 extends from the side of the rod and communicates with the bore 192 as more clearly shown in Fig. 20 of the drawings. At the lower end the bore of the sleeve 189 is of greater diameter than at the upper end, the upper bore being of a diameter to receive the rod 191 but the lower bore being of greater diameter than the rod to form a space therearound. A bushing 194 is insertible in the lower bore and is provided with a longitudinally extending opening 195, this bushing closing the lower end of the lower bore around the rod. Leading to the elongated opening 195 is a suction air pipe 196 for creating a suction through the opening 193 and the bore 192. Supported upon the upper end of the rod 191 is the head 197, of the shape quite clearly shown in Fig. 21 of the drawings, said head having the elongated chamber 198. Three suction cups are shown connected to the head 197 the end suction cups being shown at 199 and the intermediate suction cup at 200. The end cups 199 are secured to the head 197 in the manner illustrated in Fig. 22 of the drawings. The connection is made by the plugs 201 which are clamped in the head by the screws or bolts 202. Each of the plugs has a horizontal opening 203 communicating with the chamber 198 and a vertically extending opening 204 the upper end of which is interiorly threaded to receive the screw 205 which has the central bore 206 and the outwardly extending flange 207. The plug 201 has an outwardly extending flange 208 which overlies the top of the head as shown and the suction cup 199 will be clamped between the top of the plug and the flange 207 of the screw 205. The central suction cup 200 is secured to the head in the manner more particularly shown in Fig. 20 of the drawings. This connection comprises a plug 209 which is threaded into an opening in the top of the head 197 and held by means of the screw 210. A screw 211 having the vertically extending central bore 212 is threaded into the plug and the cup 200 is clamped between the top of the plug and the screw. The head 197 is secured to the upper end of the rod 191 by the clamping bolt 213. The sleeve 189 is also provided with the vertically extending opening 214 which receives the rod 215 carried by the head 197. The rod 215 is threaded adjacent its upper end as shown at 216 to receive the securing nut 217. The rod 215, sliding in the opening 214, acts as a guide and prevents the head 197 from rotating with respect to the sleeve 189 but allowing the rod 191, with its associated head 197, to have free sliding movement within the sleeve. Pivotally mounted under the table or housing 1, at 218, is a lever 219 the opposite end of which is connected to the rod 191 at 220. Extending from one side of this lever 219 is a roller 221 which is adapted to be engaged by the cam 222 which is secured upon the drive shaft 65. Secured to the lever 219, between the roller 221 and the end connected to the rod 191 is one end of a coiled spring 223 the opposite end of this spring being connected to a rod 224 which extends transversely of the machine as more clearly illustrated in Fig. 16 of the drawings. As the shaft 65 rotates it carries with it the cam 222 which engaging the roller 121 will raise the lever 219 against the action of the spring 223. As the lever is raised it in turn will slide the rod 191 upwardly so that the suction cups 199 and 200 will engage the cut blank. The suction cups are adapted to engage the blanks just at the time when they have been cut and as there is suction through the longitudinally extending bore 191 of the rod the blank will be drawn against the cups and as the rod is lowered will be drawn downwardly, it being understood that the continued rotation of the cam 222 allows the coiled spring 223 to return the lever to its original position. As long as the opening 193 is within the sleeve 189 suction will be on to hold the blank against the cups. However, when this opening 193 passes below the end of the sleeve, as is shown in Fig. 16, the suction is broken to release the blank from the cups. Supported upon upwardly extending arms 225 is a semi-circular extending plate 226 this plate being provided with an opening 227 through which the suction cups are adapted to pass as is more clearly illustrated in Fig. 11 of the drawings. The paper blank, when drawn down by the suction cups is adapted to be placed upon this plate in position to be engaged by fingers carried by a revolving turret b the detail construction of which will be later described. The positions of the blank upon the semi-circular plate are illustrated in Fig. 7 of the drawings. In order to properly position the blanks to be engaged by the fingers on the turret circumferentially spaced gauges 228 are secured upon the plate adjacent the opening 227, these gauges engaging the convex longitudinal edge of the blank.

The turret b which we will hereinafter refer to as turret No. 1 receives the blanks a and carries them around beneath mandrels carried by revolving turret c which we will hereinafter refer to as turret No. 2, said blanks during their movement by turret No. 1 having a band or line of glue applied adjacent one longitudinal edge and a band or line of glue applied adjacent one end, in a manner which will be later described. Turret b comprises a plate 229 which has an upwardly extending marginal flange 230 as more clearly illustrated in Figs. 8, 11 and 20 of the drawings. Secured to the top of the plate 229 are circumferentially spaced pairs of gripping fingers which engage over the top of the blank a and clamp the same so that they will revolve with the turret. A description of one pair of these gripping fingers will suffice for all.

As more particularly illustrated in Fig. 11 of the drawings a plate 231 is secured upon the top of the plate 229 by means of the screws 232 or other suitable fastening means said plate having the forwardly extending circumferentially spaced perforated lugs 233 in which is mounted a shaft 234. The ends of this shaft extend beyond the outer faces of the perforated lugs and on each extended end is secured a gripping finger 235 which is of such a length as to overlie the upper surface of the flange 230. The fingers 235 are provided with the transversely extending openings to receive the shaft and are held upon the said shaft and rotated therewith by means of the pins 236 which pass vertically through the shaft. The fingers are normally held with their outer ends upon the top of the flange 230 by means of the coiled springs 237 which surround the shaft and are positioned between the inner faces of the fingers and the outer faces of the perforated lugs supporting the shaft. One end of the spring will engage the top of the plate 229 whereas the opposite end of the spring will engage a pin or projection 238 secured to the inner face of the finger adjacent the inner end thereof. Secured upon the shaft 234, between the perforated lugs 233, is an arm or lever 239 by means of which, when engaged by suitable mechanism to be later described, the shaft is rotated to raise the fingers off of the flange 230 so that the blank may be positioned thereunder. In order to position the blank upon the turret we provide the gauge rods 240 which extend through vertically extending eyes or lugs 241 on the top of the plate 231 these rods being adjustable by the knurled nuts 242 and held in their adjusted positions by the lock nuts 243. When the blank is drawn down by the suction cups it will be positioned between the gauges 228, on the semi-circular plate 226 and the ends of the gauge rods 240 just described. Secured over the top of the plate 229, and held in position by the knurled nut 244 is a cover 245 which has the circumferentially spaced notches through which the fingers and gauges 235 and 240 respectively may extend as more clearly illustrated in Fig. 11 of the drawings. The plate 229 is keyed upon a vertically extending shaft 246 which is rotatably supported in the vertically extending sleeve 247 which extends through the top of the table or housing 1 and is supported thereby. Secured to the lower end of the shaft 246, which extends beyond the lower end of the supporting sleeve, is a notched plate or disc 248 forming part of a Geneva movement, the arm 249 forming the other part of said movement, and adapted to engage in the notches, being carried by a vertically extending shaft 250 which is rotated by means of a beveled gear connection, not shown, to the drive shaft 65, said beveled gear connection being similar to that disclosed in Fig. 9 of the drawings for rotating turret number 2, and which will be presently described. It will thus be seen that the drive shaft 65, through means of the beveled gear connection, will rotate the shaft 250 and carry with it the arm 249 the outer end of which carries a roller 251 which enters the slots of the disc or plate 248 and rotates the same. The rotation of the plate 248 in turn rotates the shaft 246 to which the turret is connected, the turret revolving, as has been previously stated, to carry the cut blank a with it to a position beneath a forming mandrel carried by the turret number 2 and during the rotation of turret number 1 lines or bands of glue are applied, as has been previously stated, adjacent the concaved longitudinal edge of the blank as shown at 252 and a transversely extending line or band of glue 253 is applied adjacent one end of the blank.

The bands or lines of glue are applied to the blank by wheels or rollers which receive a supply of glue from suitably mounted glue tanks. Secured upon the top of the table or housing 1, by means of the bolts 254 or other suitable fastening means is a housing comprising a lower compartment 255 and an upper compartment 256 in which is mounted the operating mechanism for the glue applying wheels or rollers. A vertically extending shaft 257 extends through the top of the table or housing 1 and up through the compartment 255 and into the compartment 256. Secured to the shaft 257, adjacent its lower end, is a gear wheel 258 which meshes with a gear wheel 259 carried upon and rotatable with the shaft 250. Therefore as the shaft 250 revolves it in turn revolves the gear wheel 258 and the shaft 257. Secured upon the shaft 257, within the compartment 255, are a gear wheel 260, a cam disc 261 and a beveled gear 262 and secured upon the upper end of the shaft, within the compartment 256 is a beveled gear 263. An extension 264 is formed at the bottom of the compartment 255, as more clearly illustrated in Fig. 24 of the drawings, and is provided with a dove-tailed groove 265 as more particularly illustrated in Fig. 25. Supported upon this extension is a glue box 266 which has a dove-tailed projection 267 formed on its base to be received in the dove-tailed groove 265. The glue box is detachably mounted as is shown and is placed in position by sliding the dove-tailed projection 267 into the groove 265. The projection is secured in the groove by means of a set screw 268 this set screw, as shown in Fig. 25, extending from the side of the extension 264 and engaging the projection 267. Rotatably mounted in the glue box 266 upon a transversely extending shaft 269 is a wheel or roller 270 the top of which will extend above the top of the glue box as shown and the lower part of which will extend into the glue indicated at 271. Extending inwardly from one end of the glue box to engage the edge of the wheel or roller, and to extend to the sides thereof, is a ledge or projection 272, this ledge or projection being adapted to scrape or remove surplus glue from the wheel or roller. Slidably mounted upon the top of the glue box is a plate 273 which has the notch 274 cut in its inner edge to receive the top of the wheel or roller 270 the end of said notch acting to scrape surplus glue from the said wheel or roller. Extending forwardly from the plate are the side arms 275 which are connected by the transversely extending plate 276 said plate having a downwardly extending projection 277 which has rotatably mounted therein the knurled screw 278 which engages in a threaded opening in the glue box as more clearly shown in Fig. 25 of the drawings. A spring finger 279 is secured to the connecting plate 276 and is adapted to engage the knurls of the screw 278. By adjusting the screw 278 the plate 273 may be adjusted over the top of the glue box and the spring finger 279, engaging the knurls of the screw will hold the same in its adjusted positions. Mounted in the compartment 255, and meshing with the gear 260, is a gear wheel 280 to the upper surface of which is secured the cam 281. The cam 281 will rotate with the said gear wheel 280 and is adapted to engage a roller 282 carried at the outer end of an arm 283 which is in turn secured to the lower end of a vertically extending shaft 284 which extends through both of the compartments 255 and 256. A bracket 285 extends inwardly from the side of the compartment 255 and forms a positioning member for the end of the shaft 284, as more clearly shown in Fig. 28, the arm 283 engaging the upper surface of the said bracket and being secured to the shaft 284 by means of the cross pin 286. A sleeve 287 surrounds the shaft 284 and the lower end thereof engages the top of the arm as shown. A coiled spring 288 surrounds the lower end of the sleeve 287 and bears against the top of the arm 283 to normally hold it against the top of the bracket, it being understood that the rod 284 is freely rotatable within the sleeve. A horizontally extending arm 289 is received in the compartment 256 and on one end is provided with the vertically extending eye portion 290 through which the rod 284 passes, this eye portion being provided at the top with a transversely extending groove 291. Slidably mounted upon the rod 284 for vertical movement, is a sleeve 292 having an enlargement 293 at the top to form a hand hold or knob. An elongated opening 294 is formed in the side of the sleeve to receive the pin 295 carried by the rod. A spring controlled pawl 296 is carried in the knob or hand hold 293 and is adapted to be engaged in one or the other of the vertically spaced notches 297 formed adjacent the upper end of the rod. A transversely extending projection 298 is formed on the lower end of the sleeve 292 and is adapted to normally be received in the transversely extending groove 291 to act as a clutch for connecting the arm 289 to the rod 284 so that when the sleeve 292 is in its normal position when the rod 284 rotates it in turn will swing the arm 289. When in its normal position the pawl 296 will be engaged in the lowermost of the notches 297 but when it is desired to disengage the arm 289 from the shaft 284 the knob or hand hold 293 is engaged and pulled upwardly so that the pawl 296 will engage the uppermost of the notches 297 and hold the sleeve raised. This movement will disengage the projection 298 from the groove 291 so that the arm 289 will be disconnected from the rod and will not swing upon rotation of the said rod. The purpose of this will be presently pointed out. Formed on the arm 289 is a downwardly extending projection 299 and surrounding the upper end of the sleeve 287 is a coiled spring 300 the lower end of which will engage the bearing 301 through which the shaft 257 passes and the upper end of which will engage the projection 299, this spring, as can be seen by reference to Fig. 23 of the drawings, normally holding the arm swung towards the side of the compartment 256. The swinging movement towards the side of the compartment is limited by a knurled set screw 302 the inner end of which will engage the edge of the arm or a rubber pad secured thereto. A spring finger 303 is secured to the outer surface of the compartment to engage the knurls to hold the set screw in its adjusted positions. Secured to the side of the compartment 256 are the vertically spaced guide bars 304 between which is received the slidable plate 305, this plate being connected to the end of the arm 289 by the link 306 and the rod 307 in the manner illustrated in Fig. 23 of the drawings. Formed on or secured to the slidable plate 305 is an arm 308 having at the lower end an extension at right angles to receive the wheel or roller 309 which is held upon the extension by means of a plate 310 which is pivoted for swinging movement at 311 and is forced inwardly by means of the coiled spring 312. The outer end of this plate 310 is notched as shown at 313 so as to extend into a groove formed in the extension on the arm 308, this notched arrangement being more clearly illustrated in Fig. 25 of the drawings. As the arm 289 is swung it slides the plate 305 and when the arm is swung into its normal position by the spring 300 the wheel or roller 309 is brought back into contact with the wheel or roller 270 as more clearly illustrated in Figs. 23 and 25 of the drawings. As the arm 289 is swung upon rotation of the rod 284, against the action of the coiled spring 300, the plate 305 will be slid and carry the wheel or roller 309 from its contact with the glue supplying roller 270 and roll it transversely over the paper blank a to form the band or line of glue shown at 253. After the line or band of glue has been applied the arm will be swung back again into its original position and carry the wheel 309 back into contact with the wheel or roller 270 to be in position for further operation.

The compartment 256 has a vertically extending recess 314 formed in one face thereof as shown more clearly in Fig. 23 and in this recess is received the dove-tailed projection 315 formed on the side of the second glue box 316. A shaft 317 is rotatably mounted transversely of the glue box 316 and has the beveled gear 318 secured on its inner end and adapted to mesh with the beveled gear wheel 263 on the top of the vertically extending shaft 257. Keyed upon the shaft 317 is a wheel or roller 319 which has its upper surface extending above the top of the glue box and its lower surface normally extending into the glue 320 in the glue box. A cover 321 is pivotally connected to the glue box 316 at 322 and is adapted to extend over the wheel or roller 319 as more clearly illustrated in Fig. 27. A plate 323 is secured to the top of one end of the glue box 316 by the screws 324 and is provided with the notch 325 to receive the wheel or roller 319, it being noted, by reference to Fig. 23, that the plate will extend on each side of the wheel. Slidable beneath the plate 323 is a plate 326 which has the downwardly extending forked projection 327 which engages between collars formed on the shank of a threaded knurled screw 328 the threaded portion of the shank extending into a threaded opening in the end of the glue box so that when the screw is rotated it will slide the plate 326 to engage its inner end with respect to the edge of the wheel or roller 319. The end of this plate 326 will act to scrape surplus glue from the edge of the wheel. Rotatably mounted on the side of the upper compartment 256 is a shaft 329 which has keyed thereto a pinion 330 and pivotally mounted thereon an arm 331, the end of the arm having an elongated opening 332 through which a pin 333 carried by the shaft 329 extends. A coiled spring 334 surrounds the shaft 329 and the end 335 thereof engages the top of the arm 331 as more clearly illustrated in Fig. 23 of the drawings. A coiled spring 336 also surrounds the shaft 329 and is adapted to normally rotate the shaft in a direction to throw the arm 333 upward into vertical position as shown in Fig. 27 of the drawings. A wheel or roller 337 is carried by the arm 331 in such a position that when the arm is swung into its vertical position the wheel will engage the wheel 319, carried by the glue pan and receive glue therefrom. On the side of the wheel 337 is a flange 338 which has an opening 339 therein through which extends a spring finger 340 which engages in a groove 341 formed in the pin 342, carried by the arm 331 and upon which the wheel 337 is mounted, to connect the wheel to the arm. Pivotally mounted within the compartment 255, at 343 is an arm 344 which has a right angle extension 345 formed on its lower end and to which is secured a roller 346 adapted to engage beneath the cam plate 261 upon the vertically extending shaft 257. Upon the upper end of the arm is a toothed segment 347 which meshes with the gear wheel 330 on the shaft 329. As the arm 344 is swung by the cam plate 261 engaging the roller 346 the movement of the segment 347 will rotate the gear wheel 330 to in turn rotate the shaft 329 to swing the arm 331 carrying the wheel or roller 337. In the position shown in Figs. 23 and 24 the wheel or roller 337 is in its lowered position to apply the longitudinally extending band or line of glue or adhesive to the blank $a$, having received its supply from the wheel or roller 319. The arm 344 will be swung outwardly to rotate the pinion 330 and shaft 329 and this movement will raise the arm 333 so that the wheel or roller 337 will contact with the glue supplying wheel or roller 319. The operation of receiving the glue supply and applying it to the blank will be repeated due to the continued operation of the shaft 257. The slot 332 in the lower end of the arm 331 allows the wheel or roller 337 to slightly rise due to impact with the blank but the spring 334 will tightly hold the said wheel or roller in engagement with the blank at all times. We wish to lay particular stress upon the fact that when the wheel or roller 337 is swung down into contact with the blank $a$ the line or band of glue is applied by the rotation of the turret $b$ which carries the said blank. In other words the wheel or roller 337 is merely swung down into contact with the blank and then the line or band of the glue is applied by the rotation of the turret, which in turn causes the rotation of the freely revoluble glue wheel, the glue aiding in the frictional contact between the wheel and the blank on the turret. This arrangement and operation allows the band or line of the glue to be applied on an arc to conform to the concaved longitudinal curvature of the adjacent edge of the blank. The gears and the connections are so timed that the longitudinal band or line of adhesive 252 will be applied prior to the application of the transversely extending end line or band of glue 253. In other words the glue applying wheel or roller 337 will first be swung down to apply its band or line of glue and then just as this wheel or roller is swung up the roller 309 will be slid over into contact with the blank and apply its transverse line of glue 253. By this arrangement and construction the applying wheels will not interfere with one another and one will be out of the way by the time the other comes into position upon the blank. At times one of the blanks $a$ might not be properly positioned upon the turret and in order to prevent the wheel or roller 309 from applying glue to the semi-circular ring or band 226 over which the blank is carried, should the operation of this glue applying wheel or roller continue we have supplied the clutch mechanism more clearly illustrated in Fig. 28 of the drawings. Should anything happen to the operation of the machine to make it desirable that the glue applying roller 309 not operate it is only necessary to raise the sleeve 229, as has been previously described, and this will remove the projection 298 from the groove 291 and allow the rod 284 to rotate without swinging the arm 289. It will make no difference whether or not the wheel or roller 337 is operated for said roller operates over the space between the edge of the turret $b$ and the edge of the ring or band 226 as is more clearly illustrated in Fig. 25 of the drawings. Even though the wheel or roller 337 is swung down it will not apply glue to any part of the machine but should the wheel or roller 309 be operated, without a blank $a$ being in proper position, it would apply the glue carried thereby to the ring or band 226 over which the blank normally passes. The wheels or rollers 309 and 337 receive their supply of glue from the wheels or rollers 270 and 319 which are continuously rotated in their respective glue pans. The glue pans are easily removable and the wheels 309 and 337 are removable from their respective carrying members as has been previously described. In operating the machine it has been found that at nights when the machines are not in operation it is desirable to remove the glue applying wheels 309 and 337 and to place them in a receptacle containing water or other liquid to prevent the glue from hardening thereon and it is desirable, when cleaning or replacing the glue pans that they also be removable. If any glue remains in the glue pans over night the same may be prevented from hardening in any desired manner. For holding the glue pan 316 in position against accidental displacement we have provided the pin 348 which extends transversely of the compartment 256 so that its end may be received in a recess formed in the dove-tailed projection 315 on the glue pan. The pin 348 is provided with the longitudinally spaced notches 349, as more clearly illustrated in Fig. 23, to receive the lower end of a spring pressed plunger 350, said spring pressed plunger when in that notch adjacent the outer end of the pin holding the inner end of the pin in the recess of the dove-tailed projection but when received in that notch adjacent the inner end of the pin holding the end of the pin out of the recess in the projection so that the glue pan may be removed by sliding vertically. In order to prevent glue from accumulating on the shaft 317 we provide the washer 351 which is received between the bearing supporting the outer end of the shaft and the outer face of the glue applying wheel 319 and the washer 352 which is held tightly against the inner bearing for the shaft by the adjustable collar 353. To prevent glue from accumulating on the shaft 269 which supports the glue applying wheel 270 we have provided the washers 354 which are held against the sides of the glue pan by means of the adjustable collars 355. In order to oil the shaft 269 we provide the oil openings 356. In order to limit the outward movement of the segment 347, on the upper end of the arm 344, which is operated to swing the glue applying wheel 337 we provide the set screw 357 which is adapted to engage a projection 358 formed at the upper end of the arm 344 at the end of the segment. This mechanism is more clearly illustrated in Fig. 29 of the drawings.

Turret number 2, designated at c, is what may be termed the forming turret for it is upon this turret that the blanks are formed into cup shape. This turret is rotatable and carries a plurality of horizontally extending tapered mandrels upon which the bottom blanks are shaped, in a manner to be later described, and around which the body or side blanks a are adapted to be shaped and secured to the bottoms which has been previously applied to the mandrels. As has been previously stated the turret number 1, indicated at b brings the body or side blanks around beneath the mandrels after the lines or bands of glue have been applied to the blank. In Fig. 7 one of the blanks, carried by the turret number 1 is shown in position beneath one of the mandrels carried by turret number 2, the blank being shown prior to being operated upon to be placed around the mandrel. The turret number 2 comprises a vertically extending shaft 359 which is rotatably supported by the vertically extending sleeve or housing 360 as more clearly illustrated in Fig. 9. Received upon the upper end of the shaft is a sleeve 361 the lower end of which engages upon the collar 362 formed on the shaft, said sleeve having the outwardly extending flange 363 formed with the vertically extending guides 364 having received therein the bushings 365. A plate 366 is received upon the upper end of the shaft 359, engages the upper end of the sleeve 361, and is held in position by means of the nut 367 which when adjusted in position secures the sleeve 361 to the shaft so as to rotate therewith. A cover 368 is secured upon the top of the shaft by means of the sleeve nut 369. Formed upon the sleeve flange 363 is an upwardly directed circumferentially extending side flange 370 to which is secured the circumferentially spaced tapered forming mandrels 371, said forming mandrels being secured in position upon the flange by means of the longitudinally extending rods 372 which have the longitudinally extending bore 373 terminating, adjacent its inner end, in a vertically extending bore 374. The outer face of the upwardly extending flange 370 is provided with the recesses to receive the reduced extensions on the inner ends of the mandrels, as more clearly shown in Fig. 9, and the rods 372 are formed on the outer ends with the shoulders 375 and 376, the shoulder 375 engaging the outer end of the mandrel and the shoulder 376 forming a space to receive the plate 377 which has the outwardly extending flange 378 which surrounds the shoulder 376 as more clearly illustrated in Fig. 34. A spring washer plate 379 is interposed between the shoulder 376 and the outer face of the plate 377 to normally hold the plate in engagement with the outer end of the mandrel as is quite clearly shown in Fig. 34, but allowing limited movement both longitudinally and axially of the rod to provide for alignment. The plate 377 with its outward extending flange 378 forms a ring or die for receiving the bottom of the cup in a manner which will later be described. The inner ends of the rods 372 are exteriorly threaded as shown at 380 to receive the nuts 381. It will thus be seen that the rods 372, with the nuts 381, are used for securing the mandrels to the side or upwardly extending flange 370. Communicating with the vertically extending bore 374 of each of the mandrel supporting rods 372 is a vertically extending bore or passage 382 extending through a portion of the upwardly extending flange 370 from the bottom thereof. A coupling 383 is secured in the lower end of each of the bores or passages 382 and to the same is connected a flexible pipe 384, the opposite end of which is connected to a coupling 385 carried by a plate 386 rotatable with the sleeve 361 and pressed into engagement with the top of the sleeve 360 by the coiled spring 387. As the sleeve 361 is rotated the couplings 385 will be brought first into registration with the transversely extending groove 389 formed in the upper end of the sleeve 360 and then into registration with the opening 390 formed in the sleeve. Communicating with the transversely extending groove 389 is an opening 391 to which is secured an air suction pipe 392 and communicating with the opening 390 is an air blast pipe 393. It will thus be seen that as the turret rotates there will first be a suction through the mandrel supporting rods 372 to hold the cup bottom thereon in a manner to be later described, and then an air blast to blow the cup off of the mandrel as will also be later described. Carried by the plate 366, which is carried at the upper end of the shaft 359 are a plurality of depending circumferentially spaced blocks 394 to each of which is pivotally connected at 395 an arm 396 to the outer end of which is pivotally connected at 397 a head or impact block 398 having the rubber block 399 extending from the lower edge thereof. The arms 396 pass through guide slots formed in the depending flange of the cover 368. These impact blocks or heads 398 are adapted to be normally positioned above the mandrel but after the body or side blank for the cup is formed around the mandrel will be lowered to impart a sharp blow to the longitudinally extending seam of the cup to embed the glue in the fibres of the paper as will be presently described. Extending vertically through each of the arms 396 is the upper threaded end 400 of a rod 401, a nut 402 being received on the threaded end and engaging a washer 403 which in turn engages the upper surface of the arm. A roller 404 is rotatably mounted in the forked lower end of the rod 401 and is adapted to engage and operate over the plate 405 having the cam surfaces 406. When the roller engages one of the cam surfaces the rod 401 will be raised and thereby raise its associated arm 396 but when the roller is disengaged from the cam surface the arm 396 as well as the rod 401 will be lowered by means of the coiled springs 407 which have been placed under tension by the raising of the arm. The arm will be drawn down by the coiled spring with a sharp impact as can be readily appreciated. Secured to the lower end of the shaft 359 is a plate 408 having the inwardly extending circumferentially extending notches 409 formed on its outer edge, said plate forming one of the members of a Geneva movement, the arm 409' forming the opposite member of the Geneva movement being carried upon the vertically extending shaft 40 journaled in the table or housing 1, as more clearly illustrated in Fig. 9 of the drawings, said shaft having on its lower end a beveled gear 411 which meshes with a beveled gear 412 carried by the drive shaft 65. It will therefore be seen that as the drive shaft 65 rotates it in turn will rotate the shaft 410, which rotates, through means of the Geneva movement, the shaft 359 and the turret carried thereby. Extending from the forked end of each of the rods 401 is a transversely extending pin or projection 413, the purpose of which will be later described. The rods 401 pass through the bushings 365 and extending transversely of each of the rods 381 is a pin 414 which operates in a slot cut in the guide way 364 and the bushing 365. An upwardly extending ring or flange 415 is supported upon the top of the table or housing 1 and surrounds the upper end of the sleeve 360 and the lower mechanism of the turret number 2 as is more clearly illustrated in Fig. 9 of the drawings.

After the paper 50, which is supported on the side of the machine, and is used for making the bottoms of the cups, passes over the bearing block 53 it passes under a roller 416 from which it then passes up through a guide chute 417 said guide chute being supported by the bracket 418 and having adjacent the vertical portion of said bracket an opening into which extends a spring finger 419 which bears against the face of the paper and holds it against the back of the guide chute. The guide chute, as is more clearly illustrated in Fig. 9 of the drawings, extends below the horizontal portion of the bracket 418 with its lower end in close proximity to the roller 416. The chute 417 extends upwardly and then over to the opposite side of the machine as shown at 420 and terminates adjacent the cutting blades or knives 181 and 185 which have been previously described. These cutting blades 181 and 185 are used for cutting the waste paper, which passes through the chute, after the blanks for forming the bottoms have been cut. In Fig. 4 of the drawings the waste paper is shown passing through the chute, openings being shown in the paper where the blanks have been cut therefrom. The paper 50 is fed from the side supported roll through the chute by means of the feed rollers 421 and 422 mounted on the shafts 423 and 424 respectively, the shaft 423 being mounted in the upwardly extending block 425 and the shaft 424 being mounted in the housing 426 pivoted at 427 for swinging movement. The rollers 421 and 422 extend through an opening formed in the chute, just above the top of the table or housing 1, and normally grip the paper therebetween, each of these rollers having a circumferentially extending groove 428 into which extends a finger 429 struck from the chute. These fingers properly guide the paper into the upper portion of the chute after it has been drawn by the feed rollers. Secured upon the shaft 423, adjacent one end of the roller 421, is a gear wheel 430 and secured upon the shaft 424 is a gear wheel 431 which is normally in mesh with the gear wheel 430 as more clearly illustrated in Fig. 30 of the drawings. A ratchet wheel 432 is also keyed upon the shaft 423 and loosely mounted upon the shaft 423, for swinging movement, is a link or lever 433 having pivotally connected adjacent one end a pawl 434, adapted to engage the ratchet wheel 432, and pivotally connected at 435, adjacent the opposite end, a vertically extending rod 436. A spring 437 is secured upon the upper surface of the link or lever 433 and engages the pawl 434 for normally holding it in engagement with the ratchet wheel 432. The lower end of the rod 436 is secured to the band 437' which surrounds an eccentric carried upon the drive shaft 65 and as the drive shaft with the eccentric revolves the rod 436 will be raised and lowered to swing the link 433 and with the pawl 434 engaging the ratchet wheel 432 the gear wheel 430 will be rotated as well as the roller 421 and the gear wheel 430 meshing with the gear wheel 431 will also rotate the roller 422 and thereby feed the paper through the chute. The block 425 is provided in its upper surface with a longitudinally extending dove-tailed groove 438 which receives and slidably supports the slide 439 which has at its lower end a dovetailed enlargement 440 received in the dovetailed groove 438. The slide 439 has an elongated opening 441 extending through its top to receive the screw 442 which carries the block 443 which has the inwardly extending spaced arms 444 between which one end of a link 445 is pivotally connected at 446. A projection 447 extends from the outer end of the block 443 and passes through the end of the slide 439, a nut 448 being received on the threaded end of this projection so that by adjusting the nut, when the screw 442 is loosened, the block 443 may be adjusted longitudinally of the slide 439, the screw 442 acting, as has been previously described, as a support for the block 443 and as a guide during its sliding or adjusting movements. Pivotally secured to the link 445 at 449 is a vertically extending lever 450 which in turn is pivotally mounted upon the shaft 451, this lever being of a shape more particularly shown in Fig. 31 of the drawings with the horizontally extending intermediate portion 452 which brings the lower end of the lever out of vertical alignment with the upper end thereof. The lower end of the lever is pivotally connected at 453 to the horizontally extending rod 454 the opposite end of which is secured to the band 455 which surrounds the eccentric 456 keyed to the drive shaft 65. The slide 439 is provided in its forward vertically extending face with a threaded opening 457 in which is received the exteriorly threaded shank 458 of the hollow cylindrically shaped male cutting member 459 which is adapted to pass through an opening in the chute 417 and cooperate with the female cutting die 460 to cut a circular blank from the strip of paper 50 to form the bottom of the cup. Slidable within the cylindrical male cutting member 459 is a circular plate 461 having the rod or extension 462 extending from its rear face and through the threaded shank 458, a nut 463 being received on the threaded end of this rod to limit its outward movement with respect to the end of the male cutting die member. A coiled spring 464 is received in the cylindrical male die cutting member, between the end of said cylindrical portion and the inner face of the plate 461, and normally forces the plate towards the end of the cylindrical die member, the nut 463 limiting the forward movement so that in its normal position the outer face of the plate 461 is flush with the outer edge of the cutting portion of the cylindrical male die cutting member. The plate 461 is shown in its original position in Fig. 9 of the drawings as is also the slide 439. The interior diameter of the cylindrical male die cutting member is such that it will be received over the plate or male die forming member 377 on the mandrels 371. As the drive shaft 65 rotates it carries with it the eccentric 456 which will operate the lever 450 which in turn will operate the slide 439. As the slide is fed towards the chute 417, through which the paper 50 passes, the male die cutting member 459 will engage the paper and on its continued forward movement will cooperate with the female die members 460 to cut a circular blank from the paper of a diameter equal to the outer diameter of the cylindrical die cutting member, the plate 461 forming a surface for the blank. As the forward movement of the slide continues the cylindrical cutting member 458 will pass over the plate or male die forming member 377 of the mandrel 371 and will form or draw the edges of the paper blank around the flange 378 of said plate 377 as is more clearly illustrated in Fig. 30 of the drawings, to form the bottom $d$ for the cup. When the plate 461 reaches the outer edge of the flange 378 it will be forced backwardly, as shown in Fig. 30, against the action of the coiled spring 464 and will securely force the paper blank against the outer edge of the flange 378 and the outer end of the mandrel supporting rod or tube 372. The continued rotation of the drive shaft 65 and the eccentrics 456 will reverse the movement of the slide and draw the male cutting member 459 rearwardly and allow the parts to return to their normal position. As has been previously described there is suction through the mandrel supporting rod or tube 372 and this suction will hold the paper bottom $d$ upon the end of the mandrel until the blank $a$, which forms the body or side of the cup is folded around the mandrel and secured to the bottom by the glue previously applied to the said body blank $a$. It can be appreciated that as the bottom blank is being cut it will be necessary to temporarily stop the feed of the paper through the chute 417 and in order to accomplish this we provide means for temporarily disengaging the feed roller 422 from the paper. When thus disengaged paper may be initially fed when a new roll of paper is being applied. As has been previously described the housing 426 which carries the shaft 424, the gear wheel 431, and the roller 422, is pivotally connected at 427 and is normally held in its raised position by means of the rod 465 which has an eye 466 on its inner end through which extends the reduced portion 467 of a rod 468 which extends transversely of the block 425 and is slidable with respect thereto, the reduced extension being eccentrically arranged at the end of the rod. A handle 469 is formed on or secured to the end of the rod 468 as more clearly shown in Fig. 31 of the drawings and may be used for turning the shaft or for sliding the same. A collar 470 is formed adjacent the outer end of the rod 465 and engages the inner face of the lug 471 through which the rod 465 passes, a washer 472 being received on the rod and engaging the outer face of the lug or projection 471 and held thereagainst by means of the coiled spring 473, a nut 474 engaging the outer end of the coiled spring and being adapted to adjust the compression thereof. A screw 475 passes through the housing 426, adjacent the top thereof, and may be adjusted therethrough so that its inner end will extend a more or less extent from the face of the housing to be engaged by a pin 476, carried by the arm 450, said pin extending through an opening in the forward end of the block 425 as more clearly illustrated in Fig. 30 of the drawings. The screw 475 will be held in its adjusted position by means of the lock nut 477. As the lever 450 is operated the pin 476 will be slid and on its forward movement will engage the inner end of the screw 475 and force the housing outwardly to disengage the roller 422 from the strip of paper. When thus disengaged the feed of the paper through the chute or guide 417 will be temporarily discontinued as the blank to form the bottom of the cup is being cut.

When the housing is swung outwardly the coiled spring 473 will be compressed so that as the lever 450 is moved rearwardly the spring will return the housing to its normal position and allow the roller 432 to again engage the surface of the paper. When it is desired to lower the housing to allow for cleaning or the like the rod 465 will be disengaged from the extension 466 on the rod 468 and in order to accomplish this the handle 469 is grasped and the rod 468 rotated to slide the rod 465 to such a position as to release the tension of the spring 473, it being understood that the pin or projection 467 is eccentrically arranged with respect to the center of the rod 468 and then the rod 468 is pulled outwardly to disengage the extension or pin 467 from the eye 466. This frees the rod 465 so that the housing 426 may be swung down and carry with it the feed roller 422 and the gear wheel 431. After the cleaning has been completed the housing is again raised and the eye 466 positioned to receive the pin or extension 467 when the rod 468 is pushed inwardly and when in position the rod 468 will be slightly rotated to again slightly compress the coiled spring 473. Secured to one end of the shaft 423 which carries the feed roll 421, the gear wheel 430, and the ratchet wheel 432, is a knob 478 by means of which the shaft may be rotated by hand and on the opposite end of the shaft, on the outside of the block 425 is keyed a collar or band 479 around which is applied a strip of felt or similar material 480 which is held tightly against the collar or band 479 by the eye portion 481 of a bracket 482 secured to the block 425 by the bolts or similar fasteners 483. The tension of the eye 481 may be adjusted by the screws or similar fasteners 484. The strip 480 of felt or similar material engaging the collar or band 479 will prevent back movement of the shaft 423 and will hold the shaft against rotation except when being driven by engagement of the pawl 434 with the ratchet wheel 432. Secured to the top of the block 425, by means of the screws 485, is the bracket 486 which is secured to the chute 417 by means of the screws 487 more clearly illustrated in Figs. 31 and 32 of the drawings. The screws 485 also secure in position a guard plate 488 which extends over the top of the slide 439, as more clearly illustrated in Figs. 30, 31 and 32 of the drawings, and has the depending side portions 489 which extend parallel with the sides of the slide as is more clearly illustrated in Fig. 31. This guard prevents the fingers of the operator of the machine from being caught between the chute and the male cutting die 459.

When the turret number $1^b$ has carried one of the body or side forming blanks $a$ to a position beneath one of the mandrels carried by the turret number $2^c$, a bottom being held upon the end of the mandrel by suction, such position being clearly shown in Fig. 7 of the drawings, the blank *a* is in a position to be formed around the mandrel and secured to the bottom carried thereby. The blank is formed around the mandrel, by the mechanism to be now described, and the line or band of glue 252 or other adhesive will secure the bottom *d* to the inner side of the body or side blank *a* and the line or band of glue or other adhesive 253 will secure the edges of the body or side forming blank together.

Extending through the top of the table or housing 1 and depending therefrom is a sleeve 490 which has at the top the flange 491 which overlies the upper surface of the table or housing 1 and receives the bolts or other suitable fastening means 492 which secure the sleeve to the table or housing. A lug 493 is formed on each side of the sleeve 490, intermediate the ends of the sleeve, and secured to each of the lugs by means of a screw 494 is a plate 495 to the outer end of which is secured the upper end of a coiled spring 496, the lower ends of the spring being secured to a cross bar 497 which passes through vertically extending elongated openings 498 formed in the sleeve 490, through a transversely extending opening in a vertically extending rod 499, and through a vertically extending elongated opening 500 formed in the sleeve 501 which is slidable in the sleeve 490. The rod 499 is slidable within the sleeve 501. Formed on the upper end of the rod 499 is a head 502 and extending horizontally through this head is a pin 503 which is of such a length as to project beyond the faces of the head and operate in elongated openings 504 formed in the arms of a clamping bar 505 as more clearly illustrated in Figs. 35 and 36 of the drawings. A coiled spring 506 is interposed between the upper end of the rod 499 and the bottom of the clamping bar 505 and normally holds the clamping bar raised, with respect to the rod, so that the pin 503 will engage the lower ends of the openings 504 as shown in Fig. 35 but allowing the clamping bar to yield, in the position shown in Fig. 36. The clamping bar is adapted, when the rod 499, is raised in a manner to be later described, to engage the blank *a* and hold the same against the mandrel 371 as more clearly shown in Fig. 36 of the drawings. Also extending through the head 502, but at right angles to the pin 503, is a pin 507 to which are pivotally connected the clamping arms 508 and 509, these arms being, as more clearly shown in Figs. 35, 36 and 37, of curved formation so as to fit around the mandrel 371, as shown in Figs. 36 and 37, to form or wrap the blank *a* around the mandrel when the sleeve 501 is raised in a manner to be later described. Formed on the upper end of the sleeve 501 are the lugs 510 which have the forked ends in which are pivotally mounted for swinging movement the blocks 511 through which extend the rods 512, the upper end of these rods being formed with an eye 513 to receive a pin 514 by means of which the rods are secured to the clamping arms 508 and 509. The lower ends of the rods 512 are threaded as shown at 515 to receive the nuts 516 by means of which the rods may be adjusted in the blocks 511. Surrounding each of the rods 512, between the eye portion 513 and the upper surface of the block 511 is a coiled spring 517 which normally holds the blocks 511 in position against the nuts 516. Vertically extending openings 518 are formed in the flange 491 of the sleeve 490 and in the top of the table or housing 1 to receive the lower ends of the rods 512 and the nuts 516 as is more clearly shown in Fig. 35 of the drawings. Depending from the lugs 493 formed intermediate the ends of the sleeve 490 are the adjustable screws 519 which are adapted to engage and limit the movement of the cross bar 497 as more clearly shown in Fig. 36 of the drawings. The adjustment of the rod 512 which is connected to the clamping arm 509 is a trifle longer than the rod 512 connected to the clamping arm 508 so that as the sleeve 501 is moved upwardly the clamping arm 509 will engage the mandrel slightly in advance of the clamping arm 508 so as to fold the edge of that portion of the blank *a* carried thereby under the edge of the portion of the blank carried by the arm 508, so that the edges of the blank will be overlapped in the manner shown in Fig. 36. After the edges of the blank have been overlapped the impact member 398 carried by the turret number 2$^c$ will come down with considerable force, against the overlapped portions of the blank and drive the glue or other adhesive into the fibres of the paper thereby making a secure connection at the overlapped edges. Secured upon the drive shaft 65 is a disc wheel 520 having the cam groove 521 formed in one face thereof. Secured to a portion of the table or housing 1, is a bracket 522, and pivotally connected to this bracket at 523 is one end of an arm 524, the opposite end of this arm being connected at 525 to the lower end of the sleeve 501 as more clearly illustrated in Fig. 38 of the drawings. Rotatably mounted intermediate the ends of the arm 524 is a roller 526 which operates in the cam groove 521 of the wheel or disc 520. As the disc or wheel 520 rotates it swings the arm 524 up and down on the pivot point 523 and this slides the sleeve 501 in the sleeve 490 and raises the sleeve 501 so that the clamping arms 508 and 509 will be swung on their pivot points to engage the paper blank *a* and form the same around the mandrel 371 as has been previously described. The upper end of the slot 500 of the sleeve 501 normally engages the cross bar 497 and holds the same down, with the rod 499, against the action of the coiled springs 496. When the sleeve 501 starts to rise this allows the cross bar 497 to be drawn upwardly by the coiled spring 496, this movement of the cross bar raising the rod 499 and bringing the clamping bar 505 into contact with the blank a and hold the same tightly against the mandrel 471. The contact of this clamping bar takes place, as can be readily appreciated, before the clamping arms 508 and 509 engage the blank so that the clamping arms in their forming movement will not dislocate or disarrange the position of the blank with respect to the mandrel, and the adjustable screws 519 limit the upward movement of the rod 499. The coiled spring 506 allows the clamping bar 505 to yield when engaging the paper blank under the mandrel 371. The slot 500 in the sleeve 501 allows the sleeve to continue to rise after the upward movement of the rod has been discontinued and it can readily be seen that as the sleeve continues its upward movement it swings the forming arms 508 and 509 on their pivot points to engage the blank a and to encircle the mandrel as more clearly illustrated in Figs. 36 and 37 of the drawings. As also clearly indicated in these figures the arms 508 and 509 are of such a length that when in position around the mandrel a space is left at the top, between the ends of the arms, through which the impact member may pass to engage the seam formed by the blank. When the wheel or disc 520 continues its movement it will draw the sleeve 501 down thereby releasing the clamping arms 508 and 509 from around the mandrel and when the upper edges of the elongated opening 500 in the said sleeve engages the cross bar 499 it will pull the same downwardly in the slot 498, against the action of the coiled springs 496, and will lower the rod 499 to release the clamping bar 505 from the cup which has been formed upon the mandrel. In forming the body or side blank a around the mandrel the bottom d will be positioned slightly beyond the outer edge of the body portion and as the mandrels are of tapered formation the open end of the completed cup will be of greater diameter than the bottom or closed end and the flange of the bottom will be directed towards the greatest diameter of the cup. As has been previously described the impact members 396 which engage the seam of the body of the cup are operated by the cam surfaces 406 on the rotatable plate 405 and the coiled springs 407 connected thereto but these impact members are not allowed to operate until the clamp forming members 508 and 509 have completed their upper journey. To accomplish this we provide the trigger 527 which is pivotally mounted upon the rod 528 and is provided at the top with the horizontal extension 529 and at the bottom with the horizontal extension 530, the extensions 529 and 530 extending in opposite directions, as more clearly illustrated in Fig. 8 of the drawings, the upper extension 529 being normally engaged by a pin 531 extending from one of the forming arms 508 and 509 so as to position the lower extension below the pin or projection 413 carried at the lower end of the rods which are connected to the impact arm 396 and carry the rollers which operate over the cam plate 405. A coiled spring 532 is connected to the trigger 527 in such a manner that as the clamping arms 508 and 509 are raised it will swing the trigger upon its pivot point, release the lower extension from beneath the pin or projection 413, and allow the impact member to be lowered by its associated spring to give a sharp blow to the overlapping edges of the blank to form the seam of the cup. This trigger will prevent the impact members from being lowered even though the rollers of the rod connected to the impact member have ridden over the cam surfaces 406 of the plate 405.

As has been previously described when the blank a is first cut and drawn into position adjacent the turret number 1<sup>b</sup> it will be engaged by the clamping fingers 235 and held thereby until such time as the blank has been gripped or clamped by the clamping bar 505. It is necessary to provide means for operating the clamping fingers to initially clamp the blank and to release the same from the turret at the proper time. We have provided means for simultaneously releasing the clamping fingers to free the blank and for operating the clamping fingers to hold the blank upon the turret. To accomplish this we provide the bell crank lever 533 which is pivoted to the sleeve 247 which rotatably supports the turret number 1 this lever having a head 534 adapted to engage the pins 535 which operate through the plate 239 forming a part of the turret number 1, as shown more clearly in Fig. 20. The bell crank lever also has the projection 536 which is adapted to be engaged by an adjustable screw 537 carried by an arm on the upper end of the sleeve 501, as more clearly illustrated in Fig. 8 of the drawings. The vertical arm of the bell crank lever is connected to the horizontally extending rods 538 which extend through the supporting sleeve 247, as more clearly illustrated in Fig. 12, the opposite ends of these rods being connected to the vertical arm of a bell crank lever 539 pivoted at 540 to the top of the sleeve 189, as more clearly illustrated in Fig. 20 of the drawings. The end of the horizontal arm of this bell crank lever is split as shown in Fig. 12 of the drawings and the split end is drawn together by means of the screw 541. A screw 542 passes through the arm 539 and is adapted to engage the lower ends of the pins 535. The upper ends of the pins 535 are adapted to engage beneath the arms 239 on the shaft 234 which carries the clamping fingers 235 and when these pins are raised the shaft will be rotated to raise the fingers and when the pins are lowered the fingers will be lowered by the coiled springs 237. Formed on each of the horizontal extending rods 538 is a collar 543 and surrounding each of the rods between the collar and the plate 544 slidably mounted upon the rods is a coiled spring 545 which urges the rods towards the bell crank lever 533. When the screw 537 carried by the arm on the sleeve 501 engages the extension 536 of the bell crank lever it holds the head 534 away from engagement with the pins 535, as shown in Fig. 8 of the drawings and this movement slides the rods 538 in the direction of the bell crank lever 539 and places the coiled springs 545 under tension, at the same time, swinging the bell crank lever 539 so that the adjustable screw 542 is out of engagement with the pins 535. As the sleeve 501 is moved upwardly to operate the clamping arms 508 and 509 it releases the screw 537 from engagement with the bell crank lever extension and the coiled springs 545 then force the rods 538 in the direction of the bell crank lever 533, this movement raising the head 534 of the bell crank lever into engagement with one of the pins 535 which releases the clamping fingers 235 from the body blank $a$ and releases the same from the turret number 1$^b$ so that it may be engaged around the mandrel of turret number 2$^c$. At the same time, in the movement referred to, the rods 538 swing the bell crank lever 539 so that the horizontal portion thereof will be raised into the position more clearly shown in Fig. 20 of the drawings, this movement engaging the adjustable screw 542 with the end of the pin 535 adjacent the blank cutting mechanism, raises the said pin, and swings the clamping fingers 235 to receive the edge of one of the blanks $a$ therebeneath. The continued rotation of the turret disengages the pins 535 from their operating mechanisms and allows the clamping fingers 235 to return to their original lowered positions and to retain such positions until it is desired to either clamp a blank or to release the same to be formed around the mandrel. As the sleeve 501 is again lowered the screw 527 will be again engaged with the extension of the bell crank lever 533 so as again to swing the same into its original position, place the springs 545 under tension again and return the bell crank lever 539 to its original position with the set screw 542 disengaged from the pins 535. While the clamping bar 505 will be released after the blank $a$ has been formed around the mandrel to provide the cup body, the impact members 396 will be held in engagement with the cup body, over the glued seam, until that mandrel comes to a curling station at which time it will be released by engaging one of the cams 406 on the cam plate 405 when it will be raised from engagement with the cup body.

Up to the point described it will be seen that we have provided novel means for taking paper from two separate rolls mounted upon a machine and cutting blanks therefrom, one blank being used for forming the bottom of a paper cup and the other to be used in forming the body or side of the cup, the bottom blank being drawn upon a mandrel to form a flange around the bottom and the body or side blank being provided with two lines or bands of glue or other adhesive and then formed around the mandrel containing the bottom to form a tapered cylindrical body or side, one line or band of the adhesive engaging the flange of the bottom to secure the bottom within the body and the other band or line of adhesive being used for securing together the overlapping longitudinally extending edges of the body. The body or side blank is so formed around the forming mandrel that the bottom will be spaced a short distance from the lower or bottom edge of the cup which is formed upon the mandrel with the flange of the bottom extending upwardly towards the increasing diameter of the cup. It will thus be seen that a complete cup is formed upon each mandrel of the revolving turret which carries the same and while the cup could be used in the form so far described we preferably provide means for curling the lower edge of the body, beneath the bottom, for forming a flange upon the upper edge of the body, and to sterilize the completed cup so that it will pass from the machine in a thoroughly sanitary condition to be packed into packages or cartons for shipment. We further provide means for conveying the cups, after the flanging of the upper edge and the sterilizing, to deliver them directly into the packages or upon a conveyor which carries them to receptacles from which they may be removed, by an attendant, and placed into the individual packages or cartons.

The curling mechanism is preferably positioned upon the machine at a point opposite to that where the body or side blank is formed around the mandrel and this position is quite clearly shown in the several figures of the drawings and more particularly in Fig. 8 thereof. The curling mechanism is carried by a substantially vertically extending arm or lever 546 which is pivotally connected beneath the top of the table or housing 1 at 547 and extends upwardly through an elongated opening 548 formed in the top of said table or housing. Rotatably mounted on the lower end of the arm or lever 546 is a roller 549 which is adapted to engage a cam wheel 550 which is keyed upon the drive shaft 65 as more clearly illustrated in Fig. 10 of the drawings. Said cam wheel 550, as it rotates, swinging the arm or lever to bring the curling mechanism into engagement with the bottom edge of the cup and to release the same therefrom. At the upper end the arm or lever 546 is formed with the sleeve portion 551 through which extends a shaft 552 preferably driven by an electric motor 553 which is preferably carried by the arm or lever. Mounted upon the upper end of the arm or lever 546 is the head 554 which is secured in position upon the end of the arm or lever by the nut 555 which engages the collar 556 carried by the shaft 552, the opposite face of the collar engaging the shoulder 557 formed on the head. A nut 558 is carried on the threaded portion of the shaft 552 and engages the under face of the collar 556 as more clearly illustrated in Fig. 39 of the drawings. Secured upon the upper end of the shaft 552 is a beveled gear wheel 559 which meshes with the beveled gear wheel 560 keyed to the horizontally extending shaft 561 rotatably mounted in the head 554 by the bearings 562. It will thus be seen that the shaft 552 with the nut 558 and beveled gear 559 will rotate relative to the collar 556 which has a bore of greater diameter than the shaft, the collar being clamped between the shoulder 557 and the nut 555. As the shaft 552 is secured at its lower end to the motor 553 it will be seen that longitudinal movement of the shaft in the sleeve 551 is prevented and due to the collar 556 engaging the shoulder 557 and nut 555 the head 554 is held against the upper end of the lever. An opening is formed in the outer end of the head and is normally closed by the cap or cover 563. A square block 564 is formed on or secured to the inner end of the shaft 561 and is provided with a longitudinally extending bore to receive the plunger 565 which carries the plate 566, a coiled spring 567 being received in the longitudinally extending bore between the inner end thereof and the end of the plunger to normally force the plunger towards the end of the block but allowing the same to be pressed inwardly when the plate 566 engages the bottom of a cup in a manner which will be later described. The plunger 565 is provided with the reduced portion 568 into which may extend a screw or pin, not shown, carried by the block 564, for limiting the outward movement of the plunger. Secured to each of the four sides of the block 564 is a shaft 569 the inner ends of these shafts being screw threaded, to be received in screw threaded opening in the block, as more clearly shown in Fig. 41, and a shoulder 570 being formed adjacent the threaded portions to engage the outer face of the block as shown. Secured upon the outer end of each of the studs, by means of a pin 571, is a collar 572 and rotatably and slidably mounted on each of the shafts 569 is a plate or disc 573 having an inwardly extending portion 574 formed with a groove 575 which is adapted to engage the bottom edge of the body of the cup and curl the same inwardly as shown more particularly in Fig. 39, the curled portion engaging beneath the bottom. A hub 576 is formed on the outer face of each of the plates or discs 573 and a coiled spring 577 is interposed between the outer face of the plate or disc and the inner face of the collar 572 to normally force the plate or disc towards the block 564, the said coiled spring surrounding the hub portion 576. It will thus be seen that as the horizontal shaft 561 is rotated, by the vertically extending shaft 552, the plates or discs will be carried by the block 564 to operate around the bottom edge of the body of the cup and at the same time each of the plates or discs is independently rotatable and slidable upon its respective shaft, so that there is no friction during the curling. The inner face of each of the discs or plates is beveled as shown at 578 and as the curling mechanism is swung up so that the groove portions 575 or plates engage the bottom edge of the body the discs or plates will be slid upon their respective shafts thereby allowing for the increased diameter of the cup. Particular stress is laid upon the fact that the curling mechanism is placed in relation to the forming mandrel, upon which the cup is held, during the bottom curling operation, that at the moment of contact of the bottom curling mechanism with the bottom edge of the cup the plane of the bottom curling mechanism is not parallel with the plane of the bottom and does not become parallel until the bottom curling operation is practically completed. The seam impact member 398 is released from the cup, in the manner previously described, as the mandrel containing the cup reaches the curling station, and as it is necessary to securely hold the cup upon the mandrel, during the curling operation, we have provided the clamp and operating mechanism therefor, which we will now proceed to describe. Supported upon the top of the table or housing 1, between the arm or lever 546 and the turret number 2, is an upwardly extending cylinder member 579 which is slotted at the upper end as shown at 580 to form a guide for the bar 581 which is pivotally connected to the arm or lever 546 at 582, the upper edge of this bar engaging a roller 582 secured at the top of the slot 580 and the lower end of the bar being cut away to form the beveled surface 583 as more clearly illustrated in Fig. 39 of the drawings. A plunger 584 operates in the cylinder 579 and is normally urged upwardly by the coiled spring 585. The plunger has the slot 586 extending from the bottom to allow the bar 581 to freely pass therethrough and secured adjacent the bottom of the slot 586 is a roller 587 which engages the lower edge of the bar 581 and is adapted to ride over the beveled portion 583 thereof. A link 588 is secured to the arm or lever 546 by the plate 589 and secured to this link are the coiled springs 590 the opposite ends of which are secured to the vertically extending posts 591 extending from the top of the table or housing 1. These coiled springs normally tend to draw the curling mechanism towards the mandrel and cup and this curling mechanism is swung away from said cup or mandrel by the action of the cam plate or wheel 550 which swing the said arm or lever. Secured to the upper end of the plunger 584 is a tapered clamping bar 592 which, when the plunger is raised by the coiled spring 585, engages the wall of the cup and securely holds the same upon the mandrel. This clamping bar has the downwardly extending flanges 593 which surround the upper end of the plunger and are securely clamped thereto by means of the bolts 594. Extending upwardly from the top of the table or housing, is a lug 595 in which is received a screw 596 which limits the inward swinging movement of the arm or lever 546 as is quite clearly shown in Fig. 39 of the drawings. Extending from the lug 595 are the side arms 597 which extend on each side of the swinging arm or lever 546 and secured to the outer ends of these arms, by means of the bolts 598 is the plate 599 having the inwardly extending portion 600 which will limit the outwardly swinging movement of the arm or lever 546. When the mandrel containing the cup has reached the curling station the cam wheel 550 will be raised to such a position with respect to the roller that the coiled spring 590 will move the upper end of the arm or lever 546 inwardly and this will carry the bar 581 inwardly through the guide slot 580 and the roller 583 carried by the plunger 584 will ride up the beveled surface 583 on the lower edge of the bar and allow the plunger 584 to be raised by the coiled spring 585 so that the clamping bar 592 will engage the cup and securely hold the same upon the mandrel. The continued inward swinging movement of the arm will engage the discs or plates 573 with the edge of the cup and the cup and mandrel being tapered will slightly force the said plates or discs outwardly against the action of the coiled springs 577. The grooved portions 575 of the discs or plates, cooperating with the beveled inner faces 578 will curl the end of the cup inwardly under the bottom, it being understood that the shaft 561 will be rotated by the rod 552 driven from the motor 553 and that the plates or discs will each freely rotate upon its supporting shaft 569. As the curling mechanism is swung inwardly towards the end of the cup the plate 566 will engage the bottom of the cup as shown and will be forced rearwardly against the action of the coiled spring 567. When the curling has been completed and the cam surfaces of the cam wheel 550 are engaged with the roller 549 the arm or lever 546 will be swung so that the curling mechanism is withdrawn from the cup, against the action of the coiled springs 590, and the bar 581 being moved outwardly will force the plunger 584 downwardly and carry with it the clamping bar 592. As has been previously described the curling mechanism is placed in relation to the forming mandrel upon which the cup is held, during the bottom curling operation, that at the moment of contact of the curling mechanism with the edge of the cup the plane of the curling mechanism is not parallel with the plane of the bottom and does not become parallel until the curling operation is practically completed.

After the bottom edge of the cup has been curled as has just been described, turret number 2$^c$ is further rotated through means of the Geneva movement which has previously been described and brings that mandrel which carries the cup, whose edge has just been curled, into alignment with the upper end of the chute 601, said chute being formed of upper and lower ring members connected by circumferentially spaced rods, and when the turret has reached this position there is an air blast from the opening 390, through the longitudinally extending bore or opening 373 of the mandrel 371 and this blast engaging the inner face of the bottom of the cup loosens said cup from the mandrel. In practice we have found that this blast is not sufficient to blow the cup from the mandrel into the chute for as soon as the side walls of the cup are loosened from the mandrel the air will pass around the end of the mandrel and up around and between the mandrel and cup thereby having a tendency to create a suction which would hold the cup upon the mandrel. In order to assure the blowing of the cup from the mandrel we provide at a point just under the mandrel containing the cup to be discharged an air blast pipe 602 which blows air under the mandrel and into the open end of the cup thereby loosening the cup from the mandrel and aiding in blowing the same therefrom. The air will blow the cup through the chute 601 and deposit it into one of the receptacles 603, the lower end of the chute being directly over the upper end of the receptacle, carried by the revolving turret $e$ which we will hereinafter refer to as turret number 3. This turret number 3$^e$ includes a plate 604 which is carried by the vertically extending shaft 605 which is rotatably mounted in the table or housing 1, as shown in Fig. 42 of the drawings, and is driven by the Geneva movement comprising the notched disc 606 and an arm carried by a rotatable shaft 607 which is driven from the main drive shaft 65 by means of the worm gear 608. This turret will be intermittently rotated, as will be clearly understood, the same as will be the turrets number 1 and number 2. The receptacles 603 are secured to the plate 604 by means of the bolts 609, or other suitable means, as is quite clearly shown in Fig. 50, the lower end of the receptacles having an outwardly extending flange, as shown, and being received in a recess cut in the upper surface of the plate. The receptacles carried by the plate 604 are arranged in circular formation as is more clearly illustrated in Fig. 7 of the drawings. Secured upon the upper end of the shaft 605 is a cover plate 610 having openings through which the upper ends of the receptacles 603 pass as shown. Slidably mounted in the receptacles 603 is a plunger 611 which has the vertically extending opening 612 throughout its length. The body portion of the plunger is of less diameter than the interior diameter of the receptacle, as shown in Fig. 50 but the upper end thereof is enlarged as shown at 613 to engage the inner wall of the receptacle. A circumferentially extending groove 614 is formed in the upper face of the enlarged end and when the cup is received in the receptacle it will rest upon the upper end of the plunger with its curled flange engaging in the groove. The plunger has a reduced extension 615 which passes through the plate 604, as more clearly illustrated in Figs. 45 and 50, and this extension is exteriorly threaded to receive the nut 616, a coiled spring 617 being interposed between the nut and the lower face of the plate 604, this coiled spring normally holding the plunger in lowered position with the shoulder 618 in engagement with the top of the plate. As has been previously described the cup is blown from the chute 601 into one of the receptacles 603 and in order to securely hold the cup within the receptacle, during the flanging of the upper edge of the cup, we provide the air blast pipe 619 which is arranged as shown more clearly in Figs. 4 and 7 of the drawings to discharge air into the cup and force the same downwardly into tight engagement with the top of the plunger 611. After being received in one of the receptacles 603 the turret number 3ᵉ is further rotated by the Geneva movement to bring that receptacle containing the cup beneath a flanging member which is carried upon an arm 620 secured to a vertically slidable rod 621 which passes through the top of the table or housing 1 as more clearly illustrated in Fig. 42. A guide rod 622 extends upwardly from the table or housing 1 and extends through an opening adjacent the inner end of the arm 620, this guide rod preventing the arm 620 from rotating and always holding the flanging mechanism, to be later described. Secured to the lower end of the rod 621 by means of the bolts 623 are the bars 624 which will be spaced apart as shown in Fig. 44 to receive therebetween a block 625 carried upon the drive shaft 65, this block 625 operating between the bars 624 acting as a guide for positioning the lower end of the rod 621 but allowing the same to have vertical sliding movement. A wheel 626 is keyed to the drive shaft 65 and has in one face thereof the cam groove 627 in which operates the roller 628 carried by the rod 621. As the wheel 626 is rotated with the drive shaft 65 it raises and lowers the rod 621 which carries the arm 620 which supports the flanging mechanism to be described. As the rod is lowered it brings the flanging mechanism into engagement with the upper end of the cup and when the rod is raised it releases the flanging mechanism. The flanging mechanism comprises a casing or housing 629 which carries a heating coil 630 which receives its current from the electrical connection 631 said current being turned on and off through means of the switch 632. On the upper face of the housing 629 is a projection 633 which operates in a recess 634 formed in the under surface of the outer end of the arm 620 as more clearly shown in Fig. 45. The projection is provided with the recess 635 from the center of which extends the sleeve 636 the upper end of which is interiorly threaded to receive the shank of the screw 637 which secures the housing to the arm. A coiled spring 638 is received in the recess 634 of the arm, the upper end of the spring engaging the top of the recess and the lower end being received in the recess 635 of the projection 633 as shown, this spring normally holding the housing in its lowered position but allowing the same to be raised under pressure. Extending downwardly from the under surface of the housing 629 are a plurality of fingers 639 the outer edges of said fingers being downwardly inclined as shown and adapted to be received in the open end of the cup. A circumferentially extending groove 640 is formed in the under face of the housing, adjacent the fingers, and slidably carried by the housing is a plate 641 having the fingers 642 which intermesh with the teeth 639. Secured to the plate 641 and extending upwardly therefrom is a rod 643 which is slidably mounted in the sleeve 636 as more clearly shown in Fig. 45 of the drawings. This rod has the elongated opening 644 through which a pin 645 extends for limiting the downward movement thereof. A coiled spring 646 is received in the sleeve, the upper end engaging the end of the shank of the screw 637 and the lower end engaging the top of the rod 643 to normally hold the same in its lowered position. The fingers 642 formed on the plate 641 are also tapered as are the fingers 639 and form a continuation of the taper of the said fingers 639. When the cup is received in the receptacle 603 its upper edge will extend above the top of the receptacle and when the flanging mechanism is lowered the fingers 639 and 642 will engage the interior of the cup as more clearly illustrated in Fig. 47 and the upper edge of the cup will be received in the groove 640. When in this position the fingers 642 will tightly grip the cup against the wall of the receptacle and will be held against further downward movement. The continued lowering of the arm 620 will lower the housing 629 and the fingers 639, as shown in Fig. 48, and such lowering will curl the upper edge of the cup as also shown in Fig. 48. It will be seen that the coiled spring 646 will allow the housing to be lowered independently of the plate 641 and when the housing contacts with the top of the turret the spring 638 will allow the same to yield upwardly. After the upper edge of the cup has been curled as shown in Fig. 48 it is then desired to flatten the curl to form the flange more clearly illustrated in Fig. 49. In order to accomplish this we slidably mount upon the receptacle 603 a ring 647 which has formed at the top of the upwardly extending flange 648 and on the bottom edge the outwardly extending lugs 649 to which are secured the vertically extending rods 650 the lower ends of which pass through the plate 604 and are connected to the plate 651. There are a plurality of these rods 650 surrounding the receptacle and carried by each of the rods, between the lower face of the plate 604 and the top of the plate 651 is a coiled spring 652 which normally tends to hold the plates 651, the rods 650, and the ring 647, in lowered position against the flange 653 formed intermediate the ends of the receptacle. In order to raise the plate 651 we provide the vertically slidable rod 654 which passes through a portion of the table or housing 1 as shown more particularly in Fig. 45 and formed on the upper end of this rod are the arms 655 which are adapted to engage the under faces of the plates 651. Perforated lugs 656 are also formed on the rods 654 and secured to these lugs are the coiled springs 657 which pass through openings in the rod support and will have their lower ends secured by the cross pins 658. These springs 657 normally tend to hold the rod 654 in its lowered position but said rod may be raised against the tension of the springs by means of the arm 659 pivoted at 660 to a bracket 661 secured to the table or housing 1. This arm 659 has mounted in its outer free end a roller 662 which is adapted to be engaged by the cam 663 mounted on the drive shaft 65. A beveled block 664 is slidably mounted upon the upper surface of the arm and may be adjusted by the screw threaded rod 665 which has on one end the knurled head 666 by means of which the rod may be rotated. A spring plate 667 is secured to the top of the arm and is adapted to engage the knurled head and normally hold the rod against rotation. The beveled block 664 is to be positioned beneath the lower end of the rod 654 and it can be seen that by adjusting the same upon the arm the degree of sliding the rod 654 may be adjusted. When the arm is swung upwardly it will slide the rod 654 upwardly and this will cause the arm 655 to engage under the plate 651 and raise the same. The raising of the plate, through the rods 650 causes the ring 647 to also rise and this presses the curled edge of the cup together, as shown in Fig. 49, and forms the outwardly extending flange on the upper edge of the cup. When the flange has been formed the continued rotation of the cam 663 will allow the arm 659 to be lowered and the lowering of the arm will allow the coiled spring 657 to draw the rod 654 downwardly and in turn allow the plate 651 to be lowered by the coiled spring 652. The lowering of the plate 651 will lower the ring 647 to its lowermost position. After the flange has been formed on the top edge of the cup it is desired that the cup be removed from the receptacle 603 and in order to accomplish this we secure to the table or housing 1 the block 668, more particularly illustrated in Figs. 50 and 52 of the drawings, this plate being provided with the inclined portion 669 and the vertically extending opening 670 in the lower end of which is connected an air blast pipe 671. After the flange has been formed upon the upper edge of the cup the turret number 3$^e$ is rotated further and the end of the extension 615 on the plunger 611 will ride over the inclined surface 669 of the block 668 and raise the plunger against the action of the coiled spring 617. This raising of the plunger will loosen the cup from the receptacle and when the opening 612 in the plunger aligns with the opening 670 in the block 668 a blast of air will be discharged therethrough and blow the cup from the receptacle into a chute which is positioned thereover. The heating coil 630 heats the flanging mechanism so that the flange on the upper edge of the cup will be properly set and at the same time the heat is transmitted throughout the entire body of the cup so as to sterilize the same and make it perfectly sanitary, it being understood that the intermittent contact of the flanging mechanism with the receptacle keeps the receptacle heated thus aiding in the heating of the cup. The chute through which the cup is blown from the receptacle 603 comprises the curved cylindrical portion 672 to the lower end of which are connected by means of the band 673 the outwardly flared rods 674 which extend into close proximity with the upper surface of the turret. The band 673 is secured to the lower end of the cylindrical portion by means of the screws 675. Secured to the upper end of the cylindrical portion 672 by the band 676 are the rods 677 which are curved to extend downwardly over the upper surface of the conveyor B. The cups are blown from the flanging receptacles with the open end uppermost but when the cups pass out of the outer or upper end of the cylindrical portion 672 the pressure therebehind is broken and as the cups pass through the rods 677 forming a portion of the chute the open ends will be directed downwardly and they will be deposited upon the conveyor with their open end downward. As the cups pass through the rods 677 there will be a "parachuting" action to break the fall of the cups. A ring 678 is carried by the rods 677 adjacent their lower ends and connected to this ring is a supporting arm 679. If desired trip fingers may be secured to this ring as shown at 680 for aiding in the breaking of the fall of the cup. Spring fingers 681 may also be secured to the lower end of the chute 601 to break the fall or guide the cups into the receptacles 603. Where the endless conveyor receives cups from two or more machines the guide member K will direct those cups delivered from the first machine towards the opposite edge of the conveyor as is more clearly illustrated in Fig. 2 of the drawings. The blast of air is supplied to the air blast pipes and nozzles through the pipe 682 and suction is created in the suction pipes and cups through means of the pipe 683. The pipes 682 and 683 of a plurality of machines will lead to a central point where either an air blast is created or suction is created. The pipes 682 and 683 are connected by the cross pipe 684, having the valves 682' and 683', adjacent the pipes 682 and 683, respectively, to be operated for directing the air in the desired directions through the various pipes, and arranged in the pipe line 682 is a valve 685 and arranged in the pipe line 683 is a valve 686. If it is desired, at any time, to blow out the suction pipes the valves 685 and 686 may be closed and the valves 682' and 683' opened and the air blast will be directed into the several suction pipes. A coupling 687 having the valve 688 is positioned intermediate the ends of the pipe 684 and secured to the coupling is a hose or other flexible tube 689 and when desired the air blast may be directed through this hose or tube for blowing dirt off of the machine or from the floor around the machine. The motor driving the drive shaft 65 may be started and stopped by means of the switch 690 and the motor for driving the endless conveyor and the motor for driving the curling mechanism may be controlled through suitable separate switches or through the switch 690. A fuse box 691 is secured to the end of the machine and a conductor wire 692 leads from the box to the switch 632 and a conductor wire 693 leads from the box to the switch 690. The main feed wire, not shown, will also lead to this fuse box.

As has been previously stated the completed cups are delivered from the conveyor into receptacles from which they are removed to be placed into packages or cartons, the cups being separated by the arm N which extends over the top of the end of the conveyor for a short distance and guided into the transversely spaced vertically extending tubes or chutes M, the chutes or tubes M overlying the upper end of the receptacles as more clearly illustrated in Figs. 53, 54, and 58 of the drawings. The receptacles are arranged in pairs, one receptacle receiving the completed cups from each of the chutes or tubes M and each of the receptacles is shown as comprising three separate compartments which are adapted to be consecutively brought beneath the lower end of one of the tubes or chutes M, when one compartment is filled the receptacle being rotated to bring another compartment into position to receive the cups. A bearing plate 694 is supported upon the ground or other surface and is provided with a longitudinally extending groove or recess 695 and the oppositely inclined portions 696 leading to said groove or recess 695 as more clearly indicated in Figs. 55 and 56 of the drawings. Each of the receptacles comprises a central vertical shaft 697 which is supported between the bearing plate 694 and a plate 698 secured transversely of the chutes or tubes M, as more clearly illustrated in Figs. 53 and 54 of the drawings, an upper plate 699, a lower plate 700 and a plurality of compartments 701 secured to the plates 699 and 700. A sleeve 702 is formed on or carried by the upper plate 699 and a sleeve 703 is formed on or secured to the lower plate 700, the shaft 697 extending through the sleeves and allowing the receptacle to be rotated around the shaft. Each of the compartments is formed of a plurality of vertically extending rods or bars 704 the lower ends of which are secured to the plates 705 carried by the lowermost plate 700 and the upper ends of which extend through the top plate 699 and are outwardly flared as shown at 706 so as to properly guide the cups into the compartments as they are delivered through the tubes or chutes M. The sleeve 702 carried by the upper plate 699 is of such a length as to terminate below the bottom edge of the plate 698 to leave the space 707, this space allowing the receptacle to move vertically for rotating in a manner which will be presently described. Extending from the bottom of the lower plate 700 of each receptacle are the circumferentially spaced lugs or projections 708 which are adapted to be received in the groove or recess 695 and normally hold the receptacles against rotation. When one of the compartments of the receptacles has become filled the attendant will rotate the receptacle so as to bring another one beneath the lower end of the chute or tube M and in order to do this the receptacle is moved vertically so as to release the lug or projection 708 from the groove 695 and when the lug or projection is removed from the groove the receptacle may be easily rotated to bring another compartment beneath the chute or tube. When the new compartment is brought beneath the tube or chute another one of the lugs or projections will drop into the groove 695. The inclined faces 696 of the bearing plate 694 allow the lugs or projections to ride over the upper surface of the plate and to be guided into the groove or recess. It will be understood that the cups drop into the compartments of the receptacle with the open end directed upwardly and the cups will be nested so that a comparatively large number of cups may be received in each of the separate compartments. While we have only shown each receptacle as comprising three separate compartments it will be understood that any number of compartments might be provided for each receptacle as would be found convenient for operation.

In Figs. 59, 60, 61, 62, 63, 64, 65, and 66 we have illustrated a modified means for rotating the receptacles into which the cups are deposited from the conveyor, this rotating means being automatically controlled to rotate the receptacles C when a predetermined number, preferably one hundred cups, have been received in one of the compartments of the receptacle. This automatic means is controlled by the passage of the cups through the chutes or tubes M and will do away with the necessity of an attendant rotating the receptacles to bring the different compartments beneath the delivering chutes or tubes M. In this form of the invention the receptacles C are mounted upon a shaft 709 which is rotatably supported at the bottom in the support 710 and at the top in the sleeve 711 which is secured to the chutes or tubes M as shown. Each of the receptacles is shown as comprising the three compartments 712 which are adapted to be successively brought beneath the lower end of the chute or tube M, the receptacles being arranged in pairs as shown and as previously described. A housing or casing 713 is secured to one of the conveyor supports D and to the tube or chute M, as more clearly illustrated in Fig. 59 of the drawings, this casing or housing enclosing a portion of the operating mechanism for rotating the receptacle. Secured upon the shaft 714 which carries the roller J around which the delivery end of the conveyor B passes is a beveled gear wheel 715 which meshes with the beveled gear wheel 716 which is keyed to the vertically extending shaft 717 so as to continually rotate the said shaft 717 as the conveyor is operated. To the lower end of the shaft 717 is keyed a gear wheel 718 which meshes with the smaller gear wheel 719 which is keyed to the vertically extending shaft 720 to which is also keyed, over the gear wheel 719, the gear wheel 721 which meshes with the smaller gear wheel 722 keyed to the shaft 723. An arm 724 is secured to the shaft 723 and carries at its outer end a roller 725 which is adapted to operate in the elongated opening 726 of the link 727 which is carried by a sleeve 728 secured to the upper end of a shaft 729 for swinging movement. A pawl 730 is pivotally connected at 731 to the link 727 and is normally urged towards the pivoted end of the link by the coiled spring 732. With the mechanism so far described the operation of the conveyor rotates the shaft 723 to which the arm 724 is secured and as the arm rotates with the shaft it swings the link 727 for about a quarter turn said link normally swinging on the sleeve 728 rotating the shaft 729 to the lower end of which is secured a gear wheel 733 which meshes with a gear wheel 734 secured to a shaft 735 rotatably carried by the support 710. Also secured to the shaft 735 is a larger gear wheel 736 which meshes with the gear wheel 737 secured to the shaft 709 which carries the receptacle C. The lower end of the shaft 729 is rotatably mounted in the support 710. Rotatably carried by the bracket 738 is a shaft 739 to which is secured a gear wheel 740 which meshes with a smaller gear wheel 741 secured to the shaft 742. Secured to the lower end of the shaft 742 is a worm gear wheel 743 with which meshes the worm gear 744 on the horizontally extending shaft 745 as more clearly illustrated in Fig. 60 of the drawings. Secured to the outer end of the horizontal shaft 745 are the arms 746 which are adapted to pass through the vertically extending elongated opening 747 formed in the side wall of the chute or tube M as more clearly illustrated in Fig. 61 of the drawings. As a cup drops through the tube or chute it engages that arm which is extending through the opening 747 and gives the shaft 745 a quarter turn and the rotation of this shaft, through means of the worm 744 and the gear 743 will rotate the gear 741 which in turn will rotate the gear 740 and the shaft 739 to which it is secured. In order that the cup will not be thrown out of its vertical position, while dropping through the chute or tube M, by engaging the arm 746, we provide on the opposite side of the chute or tube a bracket 748 in which is rotatably mounted a shaft 749 which has secured to the outer end the arms 750 and to the inner end the collar 751. A coiled spring 752 surrounds the shaft between the collar 751 and the bracket 748 and normally applies sufficient tension to prevent the turning of the shaft. One of the arms 750 is adapted to pass through an elongated opening 753 formed in the chute or tube M opposite to the opening or slot 747. It will thus be seen that as the cup passes through the chute or tube it will engage the arms 746 and 750 and be held in a vertical position as more clearly illustrated in Fig. 61 of the drawings. Secured to the shaft 739, beneath the gear wheel 740, is a ratchet wheel 754 which is adapted to be rotated. A pawl 755 is forced into engagement with the ratchet wheel 754 by means of the spring 756 as more clearly illustrated in Fig. 62 of the drawings. Secured to the shaft 739 beneath the ratchet wheel 754 is a plate 757 which has a single notch 758 cut in its edge and secured on the shaft 739 beneath this plate is a second plate 759 having the four beveled notches 760 cut in its edge. A pawl 761 pivoted at 762 is normally forced to engagement with the outer edge of the plate 757 by means of the spring 762' but when the notch 758 of the plate 757 is brought into proper position the end of the pawl will drop into the notch as is shown in Fig. 62. Secured to the outer face of the pawl 761 is a roller 763 which engages with the edge of the pawl 730 and when the end of the pawl 761 is removed from the notch 758 and engages the edge of the plate or disc 757 the roller will force the pawl 730 outwardly against the action of the spring 732 so that the pawl will normally not engage with the plate 759 so that the link 727 may freely swing. When the end of the pawl 761 is in the notch 758 then the end of the pawl 730 will engage one of the notches 760 so that when the link 737 is swung the plate 759 will be rotated and in turn rotate the shaft 729 which through the train of gears previously described will rotate the receptacle one-third turn so as to bring another compartment of the receptacle beneath the lower end of the chute or tube M. It can be seen that as each cup drops through the chute or tube it will engage one of the arms 746 and this will rotate the worm 744 which in turn will rotate the gear 741 which meshing with the gear 740 will rotate the shaft 739 and the ratchet wheel 754 and plate 757. The notch 758 of the plate 757 is adapted to be positioned so that the end of the pawl 761 will drop therein when one hundred cups have passed into the compartment of the receptacle and until the end of the pawl engages in the notch the pawl 730 will be held from engagement in the notches 760 of the plate 759 and the link 727 will be swung without rotating the plate 759 or the shaft 729. However, when the end of the pawl 761 drops into the notch 758 the end of the pawl 730 is adapted to engage in one of the notches 760 of the plate 759 and then when the link 727 is swung, through the mechanism previously described, the plate 759 will be given a quarter turn, rotate the shaft 729, and through means of the train of gears previously described give the receptacle C a one-third turn to bring a new compartment of the receptacle beneath the lower end of the tube or chute. After the receptacle has been given its proper turn the next cup which drops through the chute or tube will rotate the shaft 739 and the plate 757 so as to again remove the end of the pawl 761 from the notch 758 and the mechanism is set into its original position for operation as previously described until one hundred cups have been received in the newly positioned compartment. While we have described the mechanism as operating the receptacle when one hundred cups have been received in each of the compartments it will be understood that we do not limit ourselves to this particular number of cups for operating the receptacle but the mechanism may be arranged to operate when any desired number of cups have been placed in one of the compartments.

It can be appreciated that at the close of a day's work or should anything go wrong with the machine which would necessitate the stopping of the same the cups might be removed from the receptacle prior to the one hundred cups being received therein and in order that the attendant may reset the counting mechanism so that when the machine is again started the receptacle may be properly rotated, upon one hundred cups being received in the compartment, we secured to the upper end of the shaft 739 a knob or hand hold 764 by means of which the shaft may be manually rotated by the attendant. To accomplish this manual rotation a portion of the upper face of the ratchet wheel 754 is cut away as shown at 765 and forms the shoulder 766. A pawl 767 is positioned to have its ends received in such cut out portion 765 but adapted to be normally forced therefrom by means of the spring 768. To reset the operating mechanism the attendant will grasp the knob or hand hold 764 and turn the same so as to rotate the shaft 739 and the ratchet wheel 754. As the ratchet wheel is rotated the end of the pawl 767 will drop into the cut out portion 765 and be held therein until it engages the shoulder 766 and when this does engage the shoulder 766 the attendant knows that the machine is in proper set position and will stop rotating immediately and the spring 768 will force the end of the pawl 767 from the cut out portion thus leaving the mechanism in proper position for beginning operation. The spring 768 will not force the end of the pawl out of the recess until it has engaged the shoulder 766 and it will be understood that the rotation of the ratchet wheel will be somewhat rapid and the pawl will engage the shoulder before the spring has an opportunity to force the same out of the recess.

Figure 64:
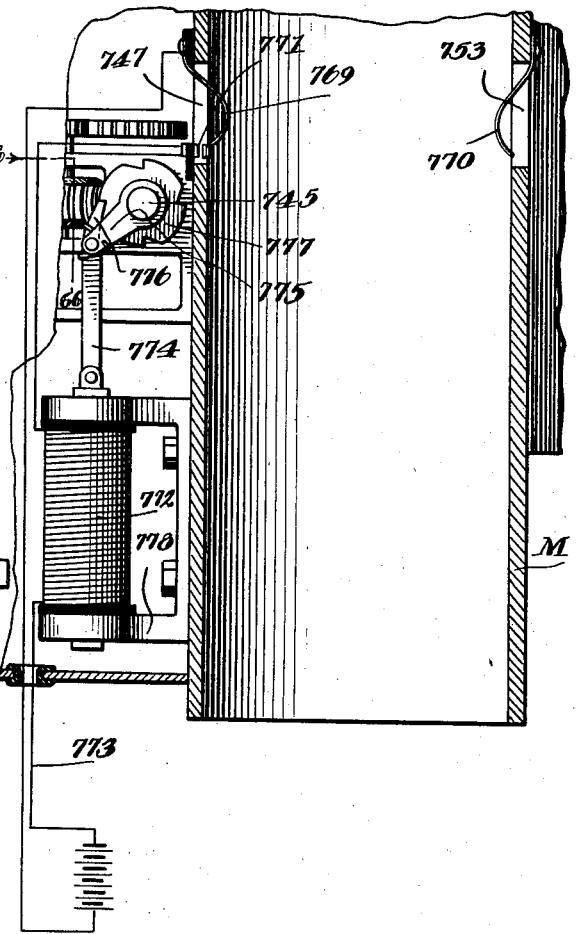
Fig. 64 is a vertical section, with parts in side elevation, showing a modification of a contact forming member for use in connection with the operating mechanism shown in Figs. 59 and 60.
Figure 65:
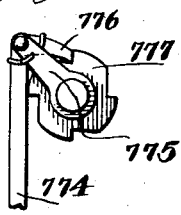
Fig. 65 is a detail showing a side elevation of the ratchet wheel pawl disclosed in Fig. 64.
Figure 66:
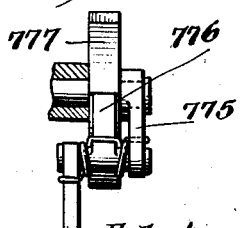
Fig. 66 is a section on the line 66—66 of Fig. 64.

In Figs. 64, 65, and 66 of the drawings we have illustrated an electrical means for rotating the worm 744 instead of the arms or fingers 746 which have been previously described and which are engaged by the cup passing through the chute or tube M. In this electrically operated means spring contact fingers 769 and 770 extend through the opening 747 and 753 respectively in the chute or tube M in the path of a cup which is dropping through the chute or tube and as the cup engages the fingers it forces the lower end of the finger 769 outwardly to engage with the contact 771 and when this contact is made the solenoid 772 is energized through the electric circuit shown generally at 773 and the bar 774 connected to the core of the solenoid is raised and operates the arm or lever 775 and the pawl 776, the pawl engaging a ratchet wheel 777 secured to the worm shaft 745 for rotating the shaft. As the contact of the finger with the contact 771 is broken the solenoid will be de-energized and the bar 774, arm 775, and pawl 776, returned to their original positions for the next operation. In all other respects the means for automatically rotating the receptacle is the same as previously described and a further description thereof is thought to be unnecessary. The solenoid 772 will be secured to the chute or tube M by means of the bracket 778.

At times it might be desired instead of flanging the upper edge of the cup body or side to provide the cup adjacent the upper edge of the body or side with a bead and when this is done it is possible to do away with the turret number 3, which receive the cups for flanging the upper edge, and to form the bead in the blank a while being carried by the turret number 1ᵇ. The mechanism for forming a bead is illustrated in Figs. 67, 68 and 69 of the drawings the bead being formed as the blank is carried by the turret number 1ᵇ over the supporting plate 226. When the bead is to be formed in the blank a block 779 is secured to the under surface of the plate 226 and rotatably supported by this block is a shaft 780 on the inner end of which is secured a wheel 781 adapted to contact with the under side of the plate 239 forming a part of the turret number 1ᵇ as illustrated in Fig. 68 of the drawings. As the turret revolves it in turn revolves the wheel 781 and shaft 780. The block has the recess 782 formed in its upper face and secured to the shaft 780 and received in this recess 782 is a roller 783 having the circumferentially extending groove 784, the roller as shown being positioned adjacent the outer edge of the plate 226 and the upper surface thereof being on a level with the upper surface of the plate. Secured to the block 779 is a guide or yoke member 785 in which is mounted, for vertical sliding movement, a block 786 which has rotatably mounted therein the horizontal shaft 787. Secured on the inner end of this horizontal shaft is a roller 788 which is provided intermediate its ends with a flange 789 adapted to extend into the groove 784 of the roller 783. Extending from the top of the guide 785 is the adjustable screw 790 and carried in a recess in the top of a block 786 is a coiled spring 791 which is adapted to engage the end of the screw as more clearly illustrated in Figs. 68 and 69 of the drawings. It can be seen that as the blank a is carried by the turret number 1ᵇ that it will be fed between the rollers 783 and 788 and the flange 789 on the roller 788 entering the groove 784 of the roller 783 will form the outwardly extending bead adjacent the outer edge of the blank, as more particularly shown in Fig. 67 of the drawings. The coiled spring 791 will allow the block 786 to raise in the guide 785 to allow the blank to initially pass between the rollers or should some of the blanks be of a slightly greater thickness than the others. While we have shown the shaft 780 as being rotated by the frictional engagement of the wheel 781 with the under surface of the plate 239 of the turret number 1 it will be understood that if desired a gear wheel might be used instead of the wheel 781 to mesh with teeth formed on or secured to the turret. When the bead is formed on the cups instead of having the upper edge of the cups flanged the cups may be conveyed directly from the mandrels of the turret number 2 to the packages or cartons instead of being discharged into the receptacles of the turret number 3 and then discharged to the conveyor. This arrangement is shown in Figs. 70, 71, 72 and 73 of the drawings. In these figures 792 illustrates a chute through which the cups are discharged directly from the forming mandrels of the turret number 2 into the packages or cartons 793. The carton is supported on the circular head 794 of the arm 795 and the fingers 796 secured to the lower end of the chute 792 engage in the upper open end of the package or carton there preferably being four of these fingers, one adapted to engage in each corner of the package or carton. The arm 795 is pivotally connected to one of the supporting legs 2 of the machine at 796' and the inner end of the arm is curved as shown at 797 to engage the ratchet wheel 798 which is secured upon the shaft 607, which normally carries the arm portion of the Geneva movement which rotates the turret number 3, it being understood that when the cups are discharged directly from the forming mandrels of turret number 2 that it will not be necessary to rotate the turret number 3. A coiled spring 799 is secured to the arm 795 and to the supporting leg 2 and normally holds the inner end of the arm in engagement with the ratchet wheel 798. The cups will be discharged through the chute 792 to the cartons and nested therein as shown in Fig. 72. The ratchet wheel 798 will vibrate the arm 795 so as to shake the package 793 and properly nest the cups. When the carton is filled it may be easily removed and a new one placed in position.

At times it might also be desirable to discharge the cups directly from the turret number 3ᵉ into the packages or cartons and when this is to be done the chute 800 conveys the cups directly from the turret number 3ᵉ, from which they are blown, into the cartons 801 as more clearly shown in Figs. 74 and 75 of the drawings. The chute will be provided at its lower end with the fingers 802 which will engage into the corners of the upper or open end of the carton and the lower end of the carton will be received upon the arm 803 as shown. This arm may be vibrated, if desired, in the manner as previously described for the arm 795.

From the above detailed description it is thought that the construction and operation of our machine will be clearly understood and it will be seen that we have provided a machine which will take paper from two rolls, supported upon the machine, and cut and form the same into completed paper cups which are primarily intended for single service, the cups being formed of relatively thin material and the machine being capable of turning out completed cups in such quantities as to make their cost relatively low so that they may be used in large quantities without great expense and, as above stated, will be destroyed, by crushing or otherwise, after a single use. The paper, which has been previously described, is fed to the machine from two separate rolls, one of which rolls furnishing the paper from which the blanks are cut for forming the body or side wall of the cup and the other roll furnishing the paper from which blanks are cut for forming the bottoms of the cups, said bottoms being constructed with a flange which will extend upwardly towards the increasing diameter of the cup body, which body is tapered to provide an increased diameter at the upper edge and the bottom being secured to the body or side wall at a point above the lower edge of the said body or side wall. One roll of paper is supported adjacent one end of the machine and the paper therefrom is automatically fed, by means of the feed rollers to the cutting dies previously described, one of which is stationary and one of which is mounted for reciprocating movement, the dies cooperating to cut from the paper a blank which is used in forming the body or side wall of the cup and the feed rollers being temporarily released from engagement with the paper during the cutting operation so that the feed of the paper will be intermittent. Tension devices are provided for holding the paper under tension as it is drawn from the roll. The cut blank is attracted by suction cups mounted upon a vertically movable carrier and is fed to a revolving turret which we have referred to as turret number 1, said turret being provided with clamping fingers which engage the blank and securely holds the same in proper position to be moved with the turret, two lines or bands of glue being applied to the blank during the time it is carried by the turret. One line or band of glue is applied adjacent one longitudinally extending edge and the other line or band is applied adjacent one end. After the lines or bands of glue have been applied to the blank the further rotation of the turret brings the blank beneath a tapered forming mandrel which is carried by a revolving turret to which we have referred to as turret number 2. The second roll of paper is supported at one side of the machine and paper from this roll is fed to cutting dies by means of feed rollers which are intermittently operated so as to temporarily stop the feed of paper during the cutting action of the dies, said dies cutting a blank which is carried in position against the end of the forming mandrel carried by turret number 2 and then drawn over the end of the mandrel to form a flange which extends inwardly towards the increasing diameter of the mandrel. The bottom thus formed is held upon the end of the mandrel by suction and when the mandrel carrying the bottom is in position over the body or side blank, which has been carried by the turret number 1, then a clamping member is operated to securely hold the body or side blank against the mandrel. When thus clamped the fingers of turret number 1, which have been clamping the body or side blank are released and forming arms are operated to fold the blank around the mandrel, the line or band of glue which has been applied adjacent one longitudinally extending edge of the blank engaging with the flange of the bottom so as to securely connect the bottom within the body or side wall. The clamping arms are so operated as to overlap the ends of the blank so that the line or band of glue adjacent one end of the blank will securely connect the ends to form a seam extending vertically of the body or side wall. After the edges of the side blank have been overlapped a hammer or impact member is brought into engagement with the overlapped portions and securely embeds the glue into the fibres of the paper so as to make a secure connection. After the side or body blank has been secured to the bottom the suction which has been holding the bottom upon the mandrel is cut off and the hammer or impact member will be held in engagement with the formed cup to hold the same upon the mandrel during the further rotation of the turret. The further rotation of the turret number 2 brings that mandrel containing the formed cup into position adjacent curling mechanism which is operated, as has been previously described, to curl the bottom edge of the cup and turn the same inwardly towards the bottom. With the bottom edge curled the turret is further rotated to bring the mandrel, containing the cup with the curled edge, in position adjacent the upper end of a chute and when in this position an air blast blows the cup from the mandrel, the hammer or impact member having been previously raised to release it from the cup. The air blast passes through an opening in the mandrel and engages the inner face of the bottom of the cup and while this air blast has been found sufficient to loosen the cup from the mandrel it has been found that when the cup is loosened from the mandrel that a certain amount of the air will escape between the cup and mandrel and create sufficient suction or back draft to prevent the cup from being entirely discharged from the mandrel. To prevent this back draft or suction from holding the cup upon the mandrel we provide a second air blast, just beneath the mandrel, which will enter the open end of the cup and aid in blowing the same from the mandrel into the chute previously described. From the chute the cup is conveyed to a third turret which we have referred to as turret number 3 and this turret has a plurality of cups or receptacles to receive the paper cups as they are discharged from the lower end of the chute. The paper cup is forced into the receptacles or cups of the turret by an air blast which is directed into the cup. As the turret number 3 revolves it brings the cup, the upper end of which is extending above the top face of the turret, beneath a flanging tool which is lowered to form a flange on the upper edge of the cup, the flanging tool being heated to properly set the flange and at the same time to transmit heat throughout the body of the cup to sterilize the same. After the flange has been formed on the cup the turret is further revolved to bring the cup beneath the lower end of a chute and when in this position an air blast is provided and directed against the bottom of the paper cup to discharge the same through the chute and to deliver the same upon a conveyor which is traveling along the side of the machine. The chute which carries the cups from the turret number 3 to the conveyor is of a peculiar construction, that part adjacent the turret being of closed cylindrical form and connected to a plurality of spaced rods which lead to the conveyor. During the passage of the cup through the cylindrical closed portion of the chute the air blast is directed against the bottom of the cup to convey the same but when the cup reaches the spaced rods, forming a part of the chute, the force behind the cup is broken and the cups will be parachuted through the arms, the open end of the cup being directed downwardly so as to deliver the cups upon the conveyor bottom end uppermost. The conveyor traverses two or more of the machines and we have provided means for arranging the cups upon the conveyor in rows and delivering them, at the end of the conveyor, to receptacles, said receptacles being formed of a plurality of compartments in which the cups are delivered, bottom end lowermost, so that the cups will be received in the compartments of the receptacle in nested form. It will be understood that, as illustrated in Fig. 7, the cups from each of the machines will be delivered to the conveyor adjacent the inner longitudinal edge thereof but those cups from the first machine will be directed towards the opposite edge of the conveyor by means of the inclined guard. The cups, as received upon the conveyor, are spaced apart so that they may be easily inspected by the attendant. The cups received in the receptacles at the end of the conveyor may be removed by the attendant and placed in suitable cartons or packages. The waste paper from which the blanks for both the body or side and the bottom are cut is cut up into relatively small pieces and delivered to a chute which is preferably directed towards the side of the machine and delivers the cut pieces into a receptacle. In order that the waste pieces will not hold to the chute we provide an air blast which is directed over the upper surface of the chute and this blast carries the pieces of paper along over the chute and causes them to be discharged into the receptacle without accumulating upon the chute. The parts of the machine described will operate through suitable motors which are in easy control of the operator and the several turrets are so timed as to be properly positioned one with respect to the other. With the machine described the cup is formed, from paper taken from rolls, by a continuous operation and it is not necessary to cut the blanks by one machine, and place them in position on another machine which forms them into the cups. The cups are retained, at all times, in a perfectly sanitary condition and are sterilized prior to their discharge from the machine. We have also provided means for embossing the paper, just prior to the time that the blank is cut for forming the body or side, this embossing preferably being in the form of the trade-name under which the cups are sold or other data such as the word "patented" and the dates of the issue of the patents.

The receptacles at the end of the conveyor, for receiving the cups in nested form, as has been previously described are formed with a plurality of compartments and these receptacles are adapted to be rotated so as to bring the different compartments beneath the chutes which direct the cups from the conveyor into the receptacles. The rotation may be done either by hand or automatically, a receptacle adapted for hand operation being illustrated in Figs. 53, 54, 55 and 56 of the drawings, while a receptacle for automatic rotation is shown in Figs. 59, 60, 61, 62, 63, 64, 65 and 66 of the drawings. In that form of the invention, wherein the receptacles are adapted for automatic rotation the cups, as they pass through the discharge chute, set a mechanism, for rotating the receptacle when a predetermined number of the cups have been received in each of the compartments of the receptacle. Of course, it will be understood that when either the hand rotated or automatically rotated receptacles are used it will be necessary for the attendant to remove the stacks of nested cups from the compartments and to place them in to suitable packages or cartons which are adapted to be sealed for transporting. As has been previously described it may sometimes be desirable to discharge the completed cups directly into the cartons or containers instead of delivering them upon a conveyor and when this is to be done the cups are discharged from the turret number 3 through a chute which leads to the upper or open end of a carton or container which is held upon a suitable support beneath the discharge end of the chute, and the chute is preferably provided at its discharge end with a plurality of fingers which engage into the open end of the carton or container as is more particularly illustrated in Fig. 75 of the drawings. As we have also stated in the specification at times it is desirable not to flange the upper edge of the cup and when this is not done a bead is formed in the body or side wall of the cup adjacent the upper edge thereof. For forming this bead we have provided the mechanism disclosed in Figs. 67, 68 and 69 of the drawings, the beading mechanism being shown as operated from turret number 1 which carries the blank used in forming the body or side wall, the bead being formed during the rotation of the turret number 1 with the blank secured in position by the clamping fingers of the turret. When the cup is formed with the bead instead of having its upper edge flanged then it will not be necessary to carry the cup to the turret number 3 but instead the cup may be discharged directly from turret number 2, as shown in Figs. 70 and 71 of the drawings, through a chute and into a carton or container which is carried upon a suitable support beneath the discharge end of the chute. In this arrangement the discharge end of the chute will also be provided with fingers which will enter the open end of the carton or container and hold the same in proper position to receive the cups which will be nested in the said carton or container. When the cups are discharged directly into the cartons or containers it has been found necessary to at times vibrate the carton or container to make the cups properly nest therein and to do this we have provided the vibrating mechanism more particularly illustrated in Figs. 71 and 73 of the drawings, the support which holds the carton or container being pivotally mounted and operated through suitable mechanism driven from the machine for vibrating or shaking the carton. With this vibrating mechanism the cups as they are discharged into the container are properly nested and a relatively large number of cups may be positioned and sealed in a single carton or container.

We wish to again lay particular stress on the fact that with a machine such as described a cup which is formed from a plurality of parts is manufactured from what may be termed raw material in the form of strips of paper the parts making up the cup being formed into the desired shape and then secured together by a continuous operation of the machine.

Having fully described our invention what we claim as new and desire to secure by Letters Patent is:

1. In a machine for making paper cups or the like, a supply of paper, means for cutting the paper into bottom and side blanks, means for shaping the bottom blank, and means for shaping the side blank around the shaped bottom and connecting the same thereto.

2. In a machine for making paper cups or the like, a supply of paper, means for cutting the paper into bottom and side blanks, means for shaping the bottom blank, means for shaping the side blank around the shaped bottom and connecting the same thereto to form a cup, and means for curling the bottom edge of the cup.

3. In a machine for making paper cups or the like, a supply of paper, means for cutting the paper into bottom and side blanks, means for shaping the bottom blank, means for shaping the side blank around the shaped bottom and connecting the same thereto to form a cup, and means for flanging the upper edge of the cup.

4. In a machine for making paper cups or the like, a supply of paper, means for cutting the paper into bottom and side blanks, means for shaping the bottom blank, means for shaping the side blank around the shaped bottom and connecting the same thereto to form a cup, means for curling the bottom edge of the cup, and means for flanging the upper edge.

5. In a machine for making paper cups or the like, a source of paper supply, a stationary cutter and a movable cutter for cutting a blank, means for feeding the paper to the cutters, means carried part by the movable cutter and part by the stationary cutter for embossing the paper, means for shaping the cutter blank to form the body of a cup, and means for securing a bottom within the body.

6. In a machine for making paper cups or the like, a source of paper supply, cutters for cutting the paper into blanks, means for feeding the paper to the cutters, and a spring controlled pivoted member engageable with the paper, during its feeding movement to place the paper under tension, means for shaping the cut blanks to form cup bodies, and means for securing bottoms within the bodies.

7. In a machine for making paper cups or the like, a source of paper supply, a stationary cutter, a movable cutter, means for feeding the paper to the cutters, means for operating the movable cutter to cut a blank from the paper, means carried part by the stationary cutter and part by the movable cutter for cutting the waste paper from which the blank has been cut, means for shaping the cut blank to form a cup body, and means for securing a bottom within the body.

8. In a machine for making paper cups or the like, a source of paper supply, cutters, means for feeding the paper to the cutters, means for operating the cutters to cut a blank from the paper, suction means for removing the cut blank from the cutters, means for shaping the cut blank to form a cup body, and means for securing a bottom within the body.

9. In a machine for making paper cups or the like, a source of paper supply, a stationary cutter, a movable cutter, means for feeding the paper between the cutters, a stationary embossing die secured adjacent the stationary cutter, an embossing die yieldably carried by the movable cutter, means for operating the movable cutter to cut a blank from the paper, means for shaping the blank to form a cup body, and means for securing a bottom within the body.

10. In a machine for making paper cups or the like, a source of paper supply, cutters, means for feeding the paper to the cutters, means for operating the cutters to cut a blank, a revolving turret, means for transferring the cut blank from the cutters to the revolving turret, means for removing the blank from the revolving turret and shaping the same to form a cup body, and means for securing a bottom within the body.

11. In a machine for making paper cups or the like, a source of paper supply, cutters, means for feeding the paper to the cutters, means for operating the cutters to cut a blank from the paper, a revolving turret, a reciprocating member for transferring the cut blank from the cutters to the revolving turret, means for removing the blank from the revolving turret and shaping the same into a cup body, and means for securing a bottom within the body.

12. In a machine for making paper cups or the like, a source of paper supply, cutters, means for feeding the paper to the cutters, means for operating the cutters to cut a blank from the paper, a revolving turret, a vertically movable member for transferring the blank from the cutters to the revolving turret, means for removing the blank from the revolving turret and shaping the same to form a cup body, and means for securing a bottom within the body.

13. In a machine for making paper cups or the like, a source of paper supply, cutters, means for feeding the paper to the cutters, means for operating the cutters to cut a blank from the paper, a revolving turret, suction means for transferring the cut blank from the cutters to the revolving turret, means for removing the blank from the revolving turret and shaping the same to form a cup body, and means for securing a bottom within the body.

14. In a machine for making paper cups or the like, a source of paper supply, cutters, means for feeding the paper to the cutters, means for operating the cutters to cut a blank from the paper, a revolving turret, a movable member, suction cups carried by the member for transferring the cut blank from the cutters to the revolving turret, means for removing the blank from the revolving turret and shaping the same to form a cup body, and means for securing a bottom within the body.

15. In a machine for making paper cups or the like, a source of paper supply, cutters, means for feeding the paper to the cutters, means for operating the cutters to cut a blank from the paper, a revolving turret, clamping fingers carried by the revolving turret, means for transferring the cut blank from the cutters and positioning the same to be engaged by the clamping fingers of the revolving turret, means for removing the blank from the revolving turret and for shaping the same to form a cup body, and means for securing a bottom within the body.

16. In a machine for making paper cups or the like, a source of paper supply, cutters, means for feeding the paper to the cutters, means for operating the cutters to cut a blank from the paper, a revoluble turret, means for transferring the cut blank from the cutters to the turret, means for intermittently revolving the turret, means for removing the blank from the turret and shaping the same to form a cup body, and means for securing a bottom within the body.

17. In a machine for making paper cups or the like, a source of paper supply, cutters, means for feeding the paper to the cutters, means for operating the cutters to cut a blank from the paper, a revolving turret, clamping fingers carried by the revolving turret, means for transferring the cut blank from the cutters to the revolving turret, means for operating the clamping fingers to engage the blank, means for operating the clamping fingers to release the blank, means for removing the blank from the turret and shaping the same to form a cup body, and means for securing a bottom in the body.

18. In a machine for making paper cups or the like, a source of paper supply, cutters, means for feeding the paper to the cutters, means for operating the cutters to cut a blank from the paper, a revoluble turret, clamping fingers carried by the revoluble turret, means for transferring the cut blank from the cutters to the revoluble turret, means for operating the clamping fingers to engage the blank, means for intermittently rotating the turret, means for operating the clamping fingers to release the blank, means for removing the blank from the turret and shaping the same to form a cup body, and means for securing a bottom within the body.

19. In a machine for making paper cups or the like, a source of paper supply, cutters, means for feeding the paper to the cutters, means for operating the cutters to cut a blank from the paper, a revolving turret, means for transferring the cut blank from the cutters to the revolving turret, gauges for positioning the blank with respect to the turret, clamping fingers carried by the turret and engageable with the blank, means for releasing the clamping fingers and removing the blank, means for shaping the blank to form a cup body, and means for securing a bottom within the body.

20. In a machine for making paper cups or the like, a source of paper supply, means for cutting a blank from the paper and then shaping the blank into a bottom, and means for cutting the paper to form a blank for the body of the cup, said last named blank being shaped around and secured to the bottom to form a complete cup.

21. In a machine for making paper cups or the like, comprising a source of paper supply, a mandrel, means for cutting the paper and shaping a cup bottom over the end of the mandrel, and means for cutting the paper and forming the same around the mandrel and shaped bottom to form the cup body, said body being secured to the bottom during the shaping operation.

22. In a machine for making paper cups or the like, a source of paper supply, a revolving turret, a mandrel carried by the revolving turret, means for cutting the paper to form a bottom blank, means for shaping the bottom blank over the end of the mandrel, means for cutting the paper to form a body blank, and means for shaping the body blank around the mandrel and shaped bottom and securing the same to the shaped bottom.

23. In a machine for making paper cups or the like, a source of paper supply, a revolving turret, mandrels secured to the revolving turret, means for cutting the paper to provide a bottom blank, means for shaping a bottom over the end of the mandrel, means for holding the shaped bottom on the end of the mandrel, means for cutting the paper to form a body blank, and means for shaping the body blank around the mandrel and shaped bottom and securing it to the bottom.

24. In a machine for making paper cups or the like, a source of paper supply, a revolving turret, tapered mandrels carried by the turret, means for cutting the paper to provide a bottom blank, means for forming the bottom blank over the end of the tapered mandrel to provide a bottom having a flange directed inwardly of the mandrel, means for cutting the paper to form a body blank, and means for shaping the body blank around the mandrel and securing the same to the bottom flange.

25. In a machine for making paper cups or the like, a source of paper supply, a mandrel, means for cutting the paper to form a bottom blank, means for shaping the bottom blank over the end of the mandrel, suction means for holding the shaped bottom on the end of the mandrel, means for cutting the paper to form a body blank, and means for shaping the body blank around the mandrel and shaped bottom and securing the same to the bottom.

26. In a machine for making paper cups or the like, a source of paper supply, a mandrel, means for cutting the paper to form a bottom blank, means for shaping the bottom blank around the end of the mandrel, means for cutting the paper to form a body blank, means for clamping the body blank to the mandrel, and means for shaping the body blank around the mandrel and shaped bottom and securing the same to the bottom.

27. In a machine for making paper cups or the like, a source of paper supply, a mandrel, means for cutting the paper to form a bottom blank, means for shaping the bottom blank around the end of the mandrel, means for cutting the paper to form a body blank, means for shaping the body blank around the mandrel and securing the same to the bottom, said shaping means overlapping the longitudinal edges of the body, and means for delivering a blow to the overlapped edges.

28. In a machine for making paper cups or the like, a source of paper supply, a mandrel, means for cutting the paper to form a bottom blank, means for shaping the bottom blank around the end of the mandrel, means for cutting the paper to provide a body blank, means for applying lines of adhesive to the body blank, means for shaping the body blank around the mandrel and securing the same to the bottom by one of the lines of adhesive, said shaping means overlapping the longitudinal edges of the body blank, and means for imparting a blow to the overlapped edges to securely connect the same by the other line of adhesive.

29. In a machine for making paper cups or the like, a source of paper supply, a revolving turret, means for cutting the paper to form a body blank, means for transferring the cut blank to the revolving turret, a mandrel, means for cutting the paper to form a bottom blank, means for shaping the bottom blank over the end of the mandrel, means for revolving the turret to bring the body blank beneath the mandrel, and means for shaping the body blank around the mandrel and securing it to the bottom.

30. In a machine for making paper cups or the like, a source of paper supply, a revolving turret, means for cutting the paper to form a body blank, means for transferring the blank from the cutters to the revolving turret, means for clamping the blank upon the revolving turret, a mandrel, means for cutting the paper to form a bottom blank, means for forming the bottom blank around the end of the mandrel, means for revolving the turret to position the body blank beneath the mandrel, means for releasing the body blank from the turret, and means for shaping the body blank around the mandrel and securing the same to the bottom.

31. In a machine for making paper cups or the like, a source of paper supply, a revolving turret, means for cutting the paper to form a body blank, means for transferring the blank from the cutters to the revolving turret, means for cutting the paper to form a bottom blank, means for shaping the bottom blank over the end of the mandrel, means for holding the shaped bottom on the mandrel, means for revolving the turret to position the body blank beneath the mandrel, and means for shaping the body blank around the mandrel and secure the same to the bottom.

32. In a machine for making paper cups or the like, a source of paper supply, a revolving turret, means for cutting the paper to form a body blank, means for transferring the cut blank from the cutters to the turret, a mandrel, means for cutting the paper to form a bottom blank, means for shaping the bottom blank over the end of the mandrel, means for holding the shaped bottom on the mandrel, means for revolving the turret to position the body blank beneath the mandrel, means for clamping the body blank to the mandrel, means for shaping the body blank around the mandrel for securing the same to the bottom, the longitudinal edges of the body blank being lapped during the shaping operation, and means for securing together the lapped edges of the blank.

33. In a machine for making paper cups or the like, a source of paper supply, a revolving turret, means for cutting the paper to form a body blank, means for transferring the cut blank from the cutters to the revolving turret, a second revolving turret, mandrels secured to the second revolving turret, means for cutting the paper to form a bottom blank, means for shaping the bottom blank over the end of one of the mandrels, means for holding the shaped bottom upon the mandrel, means for revolving the turrets to position the body blank beneath the mandrel containing the shaped bottom, and means for shaping the body blank around the mandrel and securing the same to the bottom.

34. In a machine for making paper cups or the like, a source of paper supply, a revolving turret, means for cutting a body blank from the paper, means for transferring the body blank from the cutters to the revolving turret, a second revolving turret, circumferentially spaced mandrels secured to the outer periphery of the second mentioned turret, means for cutting the paper to form a bottom blank, means for shaping the bottom blank over the end of a mandrel, means for revolving the turrets to position the body blank beneath the mandrel containing the bottom, and means for shaping the body blank around the mandrel and securing the same to the bottom.

35. In a machine for making paper cups or the like, a source of paper supply, a revolving turret, means for cutting a body blank from the paper, means for transferring the body blank from the cutters to the revolving turret, a second revolving turret, tapered mandrels secured to the second turret, means for cutting the paper to form a bottom blank, means for shaping the bottom blank over the smaller end of the mandrel, means for revolving the turrets to position the body blank beneath the mandrel having the shaped bottom, and means for shaping the body blank around the mandrel and securing the same to the bottom.

36. In a machine for making paper cups or the like, a source of paper supply, a revolving turret, means for cutting a body blank from the paper, means for transferring the body blank from the cutters to the revolving turret, a second revolving turret, circumferentially spaced mandrels secured to the second mentioned turret, means for cutting a bottom blank from the paper, means for shaping the bottom blank over the end of a mandrel, means for holding the shaped bottom upon the mandrel, means for revolving the turrets to position the body blank beneath the mandrel containing the bottom, and means for shaping the body blank around the mandrel and securing the same to the bottom.

37. In a machine for making paper cups or the like, a source of paper supply, a revolving turret, clamping fingers carried by the revolving turret, means for cutting a body blank from the paper, means for transferring the blank from the cutters to the revolving turret, means for operating the clamping fingers to engage the blank, a second revolving turret, a mandrel carried by the second turret, means for cutting a bottom blank from the paper, means for shaping the bottom blank around the end of the mandrel, means for revolving the turrets to position the body blank beneath the mandrel, means for releasing the clamping fingers of the first mentioned turret, and means for shaping the body around the mandrel and securing it to the bottom.

38. In a machine for making paper cups or the like, a source of paper supply, a revolving turret, means for cutting a body blank from the paper, means for transferring the cut blank from the cutters to the turret, means for revolving the turret, means for applying lines of adhesive to the blank, a second turret, a mandrel secured to the second mentioned turret, means for cutting a bottom blank from the paper, means for shaping the bottom blank over the end of the mandrel, means for revolving the second mentioned turret to position the mandrel containing the bottom over the blank containing the lines of adhesive, and means for shaping the body blank around the mandrel, one line of adhesive engaging the bottom and securing it within the body and the other line of adhesive securing the longitudinal edges of the shaped blank.

39. In a machine for making paper cups or the like, a source of paper supply, a revolving turret, means for cutting a body blank from the paper, means for transferring the body blank from the cutters to the turret, means for revolving the turret, means for applying lines of adhesive to the blank, a second turret, a mandrel carried by the second mentioned turret, means for cutting a bottom blank from the paper, means for shaping the bottom blank over the end of the mandrel, means for revolving the second mentioned turret to position the mandrel containing the bottom over the body blank, means for shaping the body blank around the mandrel, one line of adhesive engaging the bottom and securing it within the body and the other line of adhesive connecting the longitudinally extending edges of the shaped blank, and means engageable with the longitudinally extending edges for embedding the adhesive into the fibres of the paper.

40. In a machine for making paper cups or the like, a source of paper supply, a revolving turret, clamping fingers carried by the revolving turret, means for cutting a body blank from the paper, means for transferring the body blank from the cutters to the revolving turret, means for operating the clamping fingers to engage the blank, means for revolving the turret, means for applying lines of adhesive to the body blank, a second turret, a mandrel carried by the second mentioned turret, means for cutting a bottom blank from the paper, means for shaping the bottom blank around the end of the mandrel, means for revolving the second mentioned turret to position the mandrel containing the bottom over the body blank, means for releasing the clamping fingers of the first mentioned turret, means for clamping the body blank to the mandrel, means for shaping the body blank around the mandrel, one line of adhesive engaging the bottom for securing the same within the body and the other line of adhesive connecting the longitudinal edges of the shaped blank, and means engageable with the longitudinal edges to embed the adhesive in the fibres of the paper.

41. In a machine for making paper cups or the like, a source of paper supply, a revolving turret, means for cutting a body blank from the paper, means for transferring the cut blank from the cutters to the turret, a second turret, a mandrel secured to the second mentioned turret, means for cutting a bottom blank from the paper, means for shaping the bottom blank over the end of the mandrel, means for revolving the second mentioned turret to position the mandrel containing the bottom over the body blank, a vertically movable clamping member adapted for clamping the body blank to the mandrel, and means for shaping the body blank around the mandrel and securing it to the bottom.

42. In a machine for making paper cups or the like, a source of paper supply, a revolving turret, means for cutting a body blank from the paper, means for transferring the cut blank from the cutters to the turret, a second revolving turret, a mandrel secured to the second mentioned turret, means for cutting a bottom blank from the paper, means for shaping the bottom blank over the end of the mandrel, means for rotating the turrets to position the mandrel containing the bottom over the body blank, means for shaping the body blank around the mandrel and secure it to the bottom, and means for securing the longitudinal edges of the shaped body, said means including an impact member.

43. In a machine for making paper cups or the like, a source of paper supply, a revolving turret, means for cutting a body blank from the paper, means for transferring the cut blank from the cutters to the turret, a second revolving turret, a mandrel secured to the second mentioned turret, means for cutting a bottom blank from the paper, means for shaping the bottom blank over the end of the mandrel, means for rotating the turrets to position the mandrel containing the bottom over the body blank, means for shaping the body blank around the mandrel and secure it to the bottom, and means for securing the longitudinal edges of the shaped body, said means including a pivoted impact member.

44. In a machine for making paper cups or the like, a source of paper supply, a revolving turret, means for cutting a body blank from the paper, means for transferring the blank from the cutters to the revolving turret, a second revolving turret, a mandrel carried by the second mentioned turret, means for cutting a bottom blank from the paper, means for shaping the bottom blank over the end of the mandrel, means for revolving the turrets, to position the mandrel containing the bottom over the body blank, means for clamping the body blank to the mandrel, means for shaping the body blank around the mandrel and securing it to the bottom, and means for securing the longitudinally extending edges of the shaped body, said means including an impact member operable by the rotation of the second mentioned turret to engage the longitudinal edges.

45. In a machine for making paper cups or the like, a source of paper supply, a revolving turret, means for cutting a body blank from the paper, means for transferring the body blank from the cutters to the revolving turret, means for revolving the turret, means for applying lines of adhesive to the blank upon the rotation of the turret, a second revolving turret, a mandrel carried by the second revolving turret, means for cutting a bottom blank from the paper, means for shaping the bottom blank over the end of the mandrel, means for revolving the second mentioned turret to position the mandrel containing the bottom over the body blank, means for shaping the body blank around the mandrel, one line of adhesive engaging the bottom for securing the same within the body and the other line of adhesive securing the longitudinal edges of the shaped body together, and an impact member operable by the rotation of the second mentioned turret for engaging the longitudinal edges of the body.

46. In a machine for making paper cups or the like, two sources of paper supply, a revolving turret, means for cutting a body blank from the paper of one source of supply, means for transferring the body blank from the cutters to the turret, a second revolving turret, a mandrel carried by the second mentioned turret, means for cutting bottom blanks from the second source of paper supply, means for shaping the bottom blank over the end of the mandrel, means for revolving the turrets to position the mandrel containing the shaped bottom over the body blank, and means for shaping the body blank around the mandrel and securing the same to the bottom.

47. In a machine for making paper cups or the like, two sources of paper supply, a revolving turret, cutters for cutting a body blank from one source of paper supply, means for feeding the paper to the cutters, means for transferring the cut blank from the cutters to the turret, a second turret, a mandrel carried by the second mentioned turret, cutters for cutting a bottom blank from the second source of paper supply, means for feeding the paper to said cutters, means for shaping the bottom blank over the end of the mandrel, means for rotating the turrets to position the mandrel containing the shaped bottom over the body blank, and means for shaping the body blank around the mandrel and securing the same to the bottom.

48. In a machine for making paper cups or the like, two sources of paper supply, a revolving turret, cutters for cutting a body blank from the paper of one source of supply, means for intermittently feeding the paper to the cutters, means for transferring the cut blank from the cutters to the turret, a second turret, a mandrel carried by the second turret, cutters for cutting a bottom blank from the second source of paper supply, means for intermittently feeding the paper to said cutters, means for shaping the bottom blank around the end of the mandrel, means for revolving the turrets for positioning the mandrel containing the shaped bottom over the body blank, and means for shaping the body blank around the mandrel and securing the same to the bottom.

49. In a machine for making paper cups or the like, two sources of paper supply, a revolving turret, clamping fingers carried by the revolving turret, cutters for cutting a body blank from the paper from one source of supply, means for feeding the paper to the cutters, means for transferring the cut blank from the cutters to the turret, means for operating the clamping fingers for engaging the blank, a second revolving turret, a mandrel carried by the second turret, cutters for cutting a bottom blank from the paper of the second source of supply, means for feeding the paper to the cutters, means for shaping the bottom blank over the end of the mandrel, means for revolving the turrets to position the mandrel carrying the bottom over the body blank, means for releasing the clamping fingers from the blank, and means for shaping the body around the mandrel and securing the same to the bottom.

50. In a machine for making paper cups or the like, two sources of paper supply, a revolving turret, clamping fingers carried by the revolving turret, cutters for cutting a body blank from the paper of one source of supply, means for feeding the paper to the cutters, means for transferring the body blank from the cutters to the turret, means for operating the clamping fingers to engage the blank, a second revolving turret, a mandrel carried by the second mentioned turret, cutters for cutting a bottom blank from the paper of the second source of supply, means for feeding the paper to said cutters, means for shaping the bottom blank over the end of the mandrel, means for holding the shaped bottom on the end of the mandrel, means for rotating the turrets to position the mandrel containing the shaped bottom over the body blank, means for releasing the clamping fingers from the body blank, and means for shaping the body blank around the mandrel and securing it to the bottom.

51. In a machine for making paper cups or the like, two sources of paper supply, a revolving turret, clamping fingers carried by the revolving turret, cutters for cutting a body blank from the paper of one source of supply, means for feeding the paper to the cutters, means for transferring the body blank from the cutters to the turret, means for operating the clamping fingers to engage the blank, a second revolving turret, a mandrel carried by the second mentioned turret, cutters for cutting a bottom blank from the paper of the second source of supply, means for feeding the paper to said cutters, means for shaping the bottom blank over the end of the mandrel, means for holding the shaped bottom on the end of the mandrel, means for rotating the turrets to position the mandrel containing the shaped bottom over the body blank, means for releasing the clamping fingers from the body blank, means for shaping the body blank around the mandrel and securing it to the bottom, and means for releasing the bottom from the mandrel.

52. In a machine for making paper cups or the like, two sources of paper supply, a revolving turret, clamping fingers carried by the revolving turret, cutters for cutting a body blank from the paper of one source of supply, means for feeding the paper to the cutters, means for transferring the cut blank from the cutters to the revolving turret, means for operating the clamping fingers to engage the blank, a second revolving turret, cutters for cutting a bottom blank from the paper of the second source of supply, means for feeding the paper to said cutters, means for shaping the bottom blank over the end of the mandrel, suction means for holding the shaped bottom on the end of the mandrel, means for revolving the turrets to position the mandrel containing the shaped bottom over the body blank, means for releasing the clamping fingers from the body blank, means for shaping the body blank around the mandrel and secure the same to the bottom, and means for cutting off the suction to release the bottom from the mandrel.

53. In a machine for making paper cups or the like, two sources of paper supply, a revolving turret, clamping fingers carried by the revolving turret, cutters for cutting a body blank from the paper of one source of supply, means for feeding the paper to said cutters, means for transferring the cut blank from the cutters to the revolving turret, means for operating the clamping fingers to engage the body blank, means for rotating the turret, means for applying lines of adhesive to the body blank, a second turret, a mandrel carried by the second turret, cutters for cutting a bottom blank from the paper of the second source of supply of paper, means for feeding the paper to the said cutters, means for shaping the bottom blank over the end of the mandrel, means for revolving the second turret to bring the mandrel containing the shaped bottom over the body blank having the lines of adhesive, means for releasing the clamping fingers of the first mentioned turret from the body blank, means for clamping the body blank to the mandrel, means for shaping the body blank around the mandrel with the longitudinal edges of the shaped blank overlapped, one line of adhesive engaging the bottom for securing the same within the body and the other line of adhesive securing the longitudinal edges of the body, and an impact member operated by the rotation of the second mentioned turret for engaging the overlapped longitudinal edges of the body.

54. In a machine for making paper cups or the like, two sources of paper supply, a revolving turret, clamping fingers carried by the revolving turret, cutters for cutting a body blank from the paper of one source of supply, means for feeding the paper to the cutters, means for embossing the paper during the cutting operation, means for transferring the cut blank from the cutters to the turret, means for operating the clamping fingers to engage the body blank, a second revolving turret, a mandrel carried by the second turret, cutters for cutting a bottom blank from the paper of the second source of supply, means for shaping the bottom blank over the end of the mandrel, means for revolving the turrets to position the mandrel containing the bottom over the body blank, means for releasing the clamping fingers from the body blank, means for clamping the body blank to the mandrel, and means for shaping the body blank around the mandrel and securing the same to the bottom.

55. In a machine for making paper cups or the like, two sources of paper supply, a revolving turret, clamping fingers carried by the revolving turret, cutters for cutting a body blank from the paper of one source of supply, means for feeding the paper to said cutters, means for embossing the paper during the cutting operation, means for transferring the body blank from the cutters to the revolving turret, means for operating the clamping fingers to engage the blank, means for revolving the turret, means for applying lines of adhesive to the body blank during the rotation of the turret, a second revolving turret, a mandrel carried by the second mentioned revolving turret, cutters for cutting a bottom blank from the paper of the second source of supply, means for feeding the paper to the cutters, means for shaping the bottom blank over the end of the mandrel, means for holding the shaped bottom on the mandrel, means for revolving the second mentioned turret to position the mandrel containing the shaped bottom over the body blank, means for releasing the clamping fingers from the blank, means for clamping the blank to the mandrel, means for shaping the body blank around the mandrel, one line of adhesive engaging the bottom to secure the same within the body and the other line of adhesive securing together the longitudinal edges of the shaped body, and impact members operable by the rotation of the second mentioned turret for engaging the longitudinal edges of the body.

56. In a machine for making paper cups or the like, a source of paper supply, a revolving turret having a plurality of pairs of clamping fingers, means for cutting body blanks from the paper, means for successively transferring the body blanks from the cutters to the turret, a second turret, a plurality of circumferentially spaced mandrels carried by the second mentioned turret, means for cutting bottom blanks from the paper, means for shaping the bottom blanks on the mandrels as the turret is revolved, means for revolving the turrets to successively bring the mandrels of the second mentioned turret over the body blanks carried by the first mentioned turret, means for simultaneously operating the pairs of clamping fingers so that one pair will clamp a blank delivered from the cutters and another pair will release the blank beneath the mandrel, and means for shaping the released body blank around the mandrel and securing the same to the bottom carried thereby.

57. In a machine for making paper cups or the like, a source of paper supply, a revolving turret, means for cutting body blanks from the paper and delivering them successively to the turret, a second revolving turret, circumferentially spaced mandrels carried by the second mentioned turret, means for cutting bottom blanks from the paper, and means for shaping the body blanks over successive mandrels, and means for transferring the body blanks from the first mentioned turret shaping them around the mandrels carried by the second mentioned turret, and securing them to the bottoms.

58. In a machine for making paper cups or the like, a source of paper supply, a revolving turret, means for cutting a body blank from the paper, means for transferring the body blank from the cutters to the revolving turret, a second turret, a mandrel carried by the second mentioned turret, means for cutting a bottom blank from the paper, means for shaping the bottom blank over the end of the mandrel, means for rotating the turrets to position the mandrel containing the bottom over the body blank, means for clamping the body blank to the mandrel, and shaping arms carried by the clamping means for shaping the body blank around the mandrel and securing it to the bottom.

59. In a machine for making paper cups or the like, a source of paper supply, a revolving turret, means for cutting a body blank from the paper, means for transferring the body blank from the cutters to the revolving turret, a mandrel, means for cutting a bottom blank from the paper, means for shaping the bottom blank over the end of the mandrel, means for revolving the turret to position the body blank beneath the mandrel, a vertically slidable rod, a clamping member carried by the rod for clamping the body blank to the mandrel, and means carried by the rod for shaping the body blank around the mandrel and securing it to the bottom.

60. In a machine for making paper cups or the like, a source of paper supply, a revolving turret, means for cutting body blanks from the paper and delivering them to the turret, a mandrel, means for cutting bottom blanks from the paper, means for shaping the bottom blanks over the end of the mandrel, means for revolving the turret to position the body blank beneath the mandrel, a vertically slidable rod, a clamping member carried by the rod and adapted to engage the body blank for clamping the same to the mandrel, and curved arms carried by the rod for shaping the body blank around the mandrel and securing the same to the bottom.

61. In a machine for making paper cups or the like, a source of paper supply, a revolving turret, means for cutting a body blank from the paper and transferring it to the turret, a mandrel, means for cutting a bottom blank from the paper, means for shaping the bottom blank over the end of the mandrel, means for revolving the turret to position the body blank beneath the mandrel, a vertically slidable rod, a yieldable clamping member adapted to engage the body blank and clamp the same to the mandrel, and means carried by the rod for shaping the body blank around the mandrel and securing the same to the bottom.

62. In a machine for making paper cups or the like, a source of paper supply, a revolving turret, means for cutting body blanks from the paper and transferring them to the turret, a mandrel, means for cutting bottom blanks from the paper, means for shaping the bottom blanks over the end of the mandrel, means for revolving the turret to position the body blank beneath the mandrel, a clamping member for clamping the body blank to the mandrel, and arms for shaping the body blank around the mandrel and securing it to the bottom, one of said arms operating in advance of the other to overlap the longitudinal edges of the shaped body.

63. In a machine for making paper cups or the like, a source of paper supply, a revolving turret, means for cutting a body blank from the paper and transferring it to the revolving turret, a mandrel, means for cutting a bottom blank from the paper, means for shaping the bottom blank over the end of the mandrel, means for revolving the turret to position the body blank beneath the mandrel, a clamp for clamping the body blank to the mandrel, curved shaping arms, and means for operating the shaping arms to shape the body blank around the mandrel and secure the same to the bottom.

64. In a machine for making paper cups or the like, a source of paper supply, a revolving turret, means for cutting body blanks from the paper and transferring them to the turret, a mandrel, means for cutting bottom blanks from the paper, and a slidable die for shaping the bottom blank over the end of the mandrel, means for rotating the turret to bring the body blanks beneath the mandrel, and means for shaping the body blanks around the mandrel and secure the same to the bottom.

65. In a machine for making paper cups or the like, a source of paper supply, a revolving turret, means for cutting a body blank from the paper and delivering it to the turret, a mandrel, a slidable member for cutting a bottom blank from the paper and shaping it around the end of the mandrel, means for revolving the turret to position the body blank beneath the mandrel, and means for shaping the body blank around the mandrel and secure the same to the bottom.

66. In a machine for making paper cups or the like, a source of paper supply, a revolving turret, means for cutting body blanks from the paper and delivering them to the revolving turret, a mandrel, a slidable member adapted to cut a bottom blank from the paper, carry it to the end of the mandrel, and then shape the same around the end of the mandrel, means for revolving the turret to position the body blank beneath the mandrel, and means for shaping the body blank around the mandrel and secure it to the bottom.

67. In a machine for making paper cups or the like, a source of paper supply, a revolving turret, means for cutting a body blank from the paper and delivering it to the turret, a mandrel, a slidable member for cutting a bottom blank from the paper and shaping it around the end of the mandrel, said slidable member including a hollow portion adapted to surround the end of the mandrel and a yieldable plunger adapted to engage the end of the mandrel, means for rotating the turret to position the body blank beneath the mandrel, and means for shaping the body blank around the mandrel and secure it to the bottom.

68. In a machine for making paper cups or the like, a source of paper supply, a revolving turret, means for cutting body blanks from the paper and delivering them to the turret, a mandrel, a slidable member for cutting bottom blanks from the paper and shaping them around the end of the mandrel, said slidable member comprising a hollow portion and a spring held plunger, the spring held plunger normally lying flush with the outer end of the hollow portion but adapted to yield upon engaging the end of the mandrel, the hollow portion engaging around the end of the mandrel, means for revolving the turret to position the body blank beneath the mandrel, and means for shaping the body around the mandrel and secure the same to the bottom.

69. In a machine for making paper cups or the like, a source of paper supply, a revolving turret, means for cutting a body blank from the paper and delivering it to the turret, a mandrel, a slidable member adapted to cut a bottom blank from the paper, carry it to the end of the mandrel, and then force the edges of the blank over the end of the mandrel to extend inwardly thereof, said slidable member including a hollow portion adapted to pass over the end of the mandrel and a spring controlled plunger operable in the hollow portion and adapted to engage the end of the mandrel, means for revolving the turret to position the body blank beneath the mandrel, and means for shaping the body blank around the mandrel and secure the same to the bottom carried thereby.

70. In a machine for making paper cups or the like, a source of paper supply, a revolving turret, clamping fingers carried by the revolving turret, cutters for cutting a body blank from the paper, means for transferring the blank from the cutters to the turret, means for operating the clamping fingers to engage the blank, a second revolving turret, a mandrel carried by the second mentioned turret, a slidable member for cutting a bottom blank from the paper, carry it to the end of the mandrel, and shape the same therearound, means for revolving the turrets to position the body blank beneath the mandrel containing the bottom, means for releasing the clamping fingers from the body blank, and means for shaping the body blank around the mandrel and secure it to the bottom.

71. In a machine for making paper cups or the like, a source of paper supply, a revolving turret, clamping fingers carried by the revolving turret, means for cutting a body blank from the paper, means for transferring the body blank from the cutters to the turret, means for operating the clamping fingers to engage the blank, a second revolving turret, a mandrel carried by the second revolving turret, a slidable member for cutting a bottom blank from the paper, carry it to the end of the mandrel, and shape the same therearound, means for holding the shaped bottom on the end of the mandrel, means for revolving the turrets to position the body blank beneath the mandrel containing the bottom, means for releasing the clamping fingers from the body blank, and means for shaping the body blank around the mandrel and secure the same to the bottom.

72. In a machine for making paper cups or the like, two sources of paper supply, a revolving turret, clamping fingers carried by the revolving turret, means for cutting body blanks from the paper of one source of supply, means for transferring the body blanks from the cutters to the turret, means for operating the clamping fingers to engage the body blank, a second revolving turret, a mandrel carried by the second revolving turret, a slidable member for cutting a bottom blank from the second source of paper supply, carry the same to the end of the mandrel, and shape the same therearound, means for holding the shaped bottom on the end of the mandrel, means for revolving the turrets to position the body blank beneath the mandrel containing the bottom, means for releasing the clamping fingers from the body blank, and means for shaping the body blank around the mandrel and secure the same to the bottom.

73. In a machine for making paper cups or the like, two sources of paper supply, a revolving turret, means for cutting body blanks from one source of paper supply and transferring the same to the turret, a second revolving turret, a mandrel carried by the second mentioned turret, means for cutting bottom blanks from the second source of paper supply, means for shaping the bottom blank over the end of the mandrel, means for rotating the turrets to position the body blank beneath the mandrel, means for shaping the body blank around the mandrel and securing the same to the bottom carried thereby, and means for cutting into relatively small pieces the paper from each source of supply from which the blanks have been cut.

74. In a machine for making paper cups or the like, two sources of paper supply, a revolving turret, means for cutting body blanks from one source of paper supply and transferring the same to the turret, a second revolving turret, a mandrel carried by the second mentioned turret, means for cutting bottom blanks from the second source of paper supply, means for shaping the bottom blank over the end of the mandrel, means for rotating the turrets to position the body blank beneath the mandrel, means for shaping the body blank around the mandrel and securing the same to the bottom carried thereby, and means for cutting into relatively small pieces the paper from each source of supply from which the blanks have been cut, and delivering them to a chute from which they are conveyed to a receptacle.

75. In a machine for making paper cups or the like, two sources of paper supply, a revolving turret, means for cutting body blanks from one source of paper supply and transferring the same to the turret, a second revolving turret, a mandrel carried by the second mentioned turret, means for cutting bottom blanks from the second source of paper supply, means for shaping the bottom blank over the end of the mandrel, means for rotating the turrets to position the body blank beneath the mandrel, means for shaping the body blank around the mandrel and securing the same to the bottom carried thereby, and means for cutting into relatively small pieces the paper from each source of supply from which the blanks have been cut, and delivering them to a chute from which they are conveyed to a receptacle, said chute having an air conveying current delivered over the surface thereof.

76. In a machine for making paper cups or the like, means for forming a bottom, means for forming and securing a body around the bottom, and means for curling the bottom edge of the body without effecting the previously shaped bottom.

77. In a machine for making paper cups or the like, means for forming a bottom, means for forming a body and securing the same to the bottom, the bottom being spaced from the lower edge of the body, and means for curling the lower edge of the body beneath the bottom without effecting the previously shaped bottom.

78. In a machine for making paper cups or the like, means for forming a bottom, means for forming a body and securing it to the bottom, a pivoted arm, and means carried by the pivoted arm for curling the lower edge of the body.

79. In a machine for making paper cups or the like, means for forming a bottom, means for forming a body and securing it to the bottom, a pivoted arm, and rotatable means carried by the pivoted arm for curling the lower edge of the body.

80. In a machine for making paper cups or the like, means for forming a bottom, means for forming a body and securing the same to the bottom, a pivoted arm, rotatable curling means carried by the pivoted arm, and means for swinging the pivoted arm to bring the curling means into engagement with the lower edge of the body.

81. In a machine for making paper cups or the like, means for forming a bottom, means for forming a body and securing it to the bottom, a pivoted arm, rotatable curling means carried by the pivoted arm, means for swinging the arm to bring the curling means into engagement with the lower edge of the body, and means carried by the arm for rotating the curling means.

82. In a machine for making paper cups or the like, means for forming a bottom, means for forming a body and securing it to the bottom, and means for curling the lower edge of the body, said curling means including a plurality of discs and means for rotating the same circumferentially of the bottom edge of the body.

83. In a machine for making paper cups or the like, means for forming a bottom, means for forming a body and securing it to the bottom, and means for curling the lower edge of the body, said curling means comprising yieldable discs and means for rotating the discs circumferentially of the bottom edge of the body.

84. In a machine for making paper cups or the like, means for forming a bottom, means for forming a body and securing the same to the bottom, a pivoted arm, a rotatable shaft, curling discs carried by the rotatable shaft, means for swinging the arm to engage the curling discs with the bottom edge of the body, and means for rotating the shaft.

85. In a machine for making paper cups or the like, means for forming a bottom, means for forming a body and securing the same to the bottom, a pivoted arm, a rotatable shaft, freely rotatable curling discs carried by the rotatable shaft, means for swinging the arm to engage the curling discs with the bottom edge of the body, and means for rotating the shaft.

86. In a machine for making paper cups or the like, a mandrel, means for shaping a bottom on the mandrel, means for shaping a body on the mandrel and securing the same to the bottom, a pivoted arm, curling mechanism carried by the arm, and means for swinging the pivoted arm towards the end of the mandrel and engaging the curling mechanism with the bottom edge of the body.

87. In a machine for making paper cups or the like, a rotatable turret, mandrels secured to the rotatable turret, means for shaping a bottom over the ends of the mandrels, means for shaping a body over the mandrels and securing the same to the bottom, a pivoted arm, curling mechanism carried by the pivoted arm, and means for swinging the pivoted arm to bring the curling mechanism into engagement with the edge of the body.

88. In a machine for making paper cups or the like, a mandrel, means for shaping a bottom on the mandrel, means for shaping a body upon the mandrel and securing the same to the bottom, a pivoted arm, curling mechanism carried by the pivoted arm, and means for swinging the pivoted arm to engage the curling mechanism with the bottom edge of the body, the curling mechanism being so placed in relation to the mandrel that at the moment of contact of the curling mechanism with the edge of the body that the plane of the curling mechanism is not parallel with the plane of the bottom and does not become parallel until the curling operation is practically completed.

89. In a machine for making paper cups or the like, a mandrel, means for shaping a bottom on the mandrel, means for shaping a body on the mandrel around the shaped bottom and securing the same to the bottom, means for clamping the body on the mandrel, and means for curling the bottom edge of the body without effecting the previously shaped bottom.

90. In a machine for making paper cups or the like, a mandrel, means for shaping a bottom on the mandrel, means for shaping a body on the mandrel and securing the same to the bottom to form a cup, a clamp for holding the cup upon the mandrel, a pivoted arm, curling mechanism carried by the arm and engageable with the bottom edge of the body, and means carried by the arm for operating the clamp.

91. In a machine for making paper cups or the like, a mandrel, means for shaping a bottom on the mandrel, means for shaping a body on the mandrel and securing the same to the bottom to form a cup, a clamp for holding the cup upon the mandrel, a pivoted arm, curling mechanism carried by the pivoted arm, means for swinging the arm to engage the curling mechanism with the bottom edge of the body, and means operable by the swinging of the arm for operating the clamp.

92. In a machine for making paper cups or the like, a mandrel, means for shaping a bottom on the mandrel, means for shaping a body on the mandrel and securing the same to the bottom to form a cup, a slidable clamping member adapted to be engaged with the cup to hold the same upon the mandrel, a pivoted arm, curling mechanism carried by the pivoted arm, means for swinging the pivoted arm to engage the curling mechanism with the bottom edge of the body, and means carried by and operable with the pivoted arm for operating the slidable clamp.

93. In a machine for making paper cups or the like, a source of paper supply, means for cutting a body blank from the paper, a revolving turret, means for transferring the body blank from the cutters to the turret, a second revolving turret, a mandrel carried by the second mentioned turret, means for cutting a bottom blank from the paper, means for shaping the bottom blank over the end of the mandrel, means for rotating the turrets to position the mandrel containing the shaped bottom over the body blank, means for shaping the body blank around the mandrel and securing the same to the bottom, and means for curling the bottom edge of the body.

94. In a machine for making paper cups or the like, a source of paper supply, means for cutting a body blank from the paper, a revolving turret, means for transferring the body blank from the cutters to the revolving turret, a second revolving turret, a mandrel carried by the second mentioned turret, means for cutting a bottom blank from the paper, means for shaping the bottom blank over the end of the mandrel, means for holding the shaped bottom on the mandrel, means for rotating the turrets to position the mandrel with the shaped bottom over the body blank, means for shaping the body blank around the mandrel and securing the same to the bottom, and means for curling the bottom end of the body.

95. In a machine for making paper cups or the like, a source of paper supply, means for cutting a body blank from the paper, a revolving turret, means for transferring the body blank from the cutters to the turret, a second revolving turret, a mandrel carried by the second mentioned turret, means for cutting a bottom blank from the paper, means for shaping the bottom blank over the end of the mandrel, means for rotating the turrets to position the mandrel containing the bottom over the body blank, means for shaping the body blank around the mandrel and securing the same to the bottom to form a cup, curling mechanism, means for revolving the second turret to position the mandrel with the formed cup adjacent the curling mechanism, and means for engaging the curling mechanism with the bottom edge of the cup.

96. In a machine for making paper cups or the like, a source of paper supply, means for cutting a body blank from the paper, a revolving turret, clamping fingers carried by the revolving turret, means for transferring the cut blank from the cutters to the revolving turret, means for operating the clamping fingers to engage the blank, a second revolving turret, a mandrel carried by the second mentioned turret, means for cutting a bottom blank from the paper, means for shaping the bottom blank over the end of the mandrel, means for holding the bottom on the mandrel, means for rotating the turrets to position the mandrel with the shaped bottom over the body blank, means for releasing the clamping fingers carried by the first mentioned turret, means for clamping the body blank to the mandrel, means for shaping the body blank around the mandrel and securing the same to the bottom to form a cup, means for releasing the clamping means, curling mechanism, means for rotating the second mentioned turret to position the mandrel adjacent the curling mechanism, means adjacent the curling mechanism for clamping the cup to the mandrel, and means for engaging the curling mechanism with the bottom end of the cup.

97. In a machine for making paper cups or the like, a source of paper supply, means for cutting a body blank from the paper, a revolving turret, clamping fingers carried by the revolving turret, means for transferring the body blank from the cutters to the revolving turret, means for operating the clamping fingers to engage the same with the blank, a second revolving turret, a mandrel carried by the second mentioned turret, means for cutting a bottom blank from the paper, means for shaping the bottom blank over the end of the mandrel, means for revolving the turrets to position the mandrel containing the bottom over the body blank, means for releasing the clamping fingers to release the body blank, a clamp for engaging the body blank to hold the same against the mandrel, means for shaping the body blank around the mandrel and securing it to the bottom to form a cup, a pivoted arm, curling mechanism carried by the pivoted arm, means for rotating the second mentioned turret to bring the mandrel containing the cup in line with the curling mechanism, and means for swinging the pivoted arm to bring the curling mechanism in engagement with the bottom edge of the cup.

98. In a machine for making paper cups or the like, a source of paper supply, means for cutting a body blank from the paper, a revolving turret, clamping fingers carried by the revolving turret, means for transferring the body blank from the cutters to the revolving turret, means for operating the clamping fingers to engage the same with the blank, a second revolving turret, a mandrel carried by the second mentioned turret, means for cutting a bottom blank from the paper, means for shaping the bottom blank over the end of the mandrel, means for revolving the turrets to position the mandrel containing the bottom over the body blank, means for releasing the clamping fingers to release the body blank, a clamp or engaging the body blank to hold the same against the mandrel, means for shaping the body blank around the mandrel and securing it to the bottom to form a cup, a pivoted arm, curling mechanism carried by the pivoted arm, means for rotating the second mentioned turret to bring the mandrel containing the cup in line with the curling mechanism, clamping means for holding the cup upon the mandrel, and means for swinging the arm to engage the curling mechanism with the bottom edge of the cup.

99. In a machine for making paper cups or the like, a source of paper supply, means for cutting a body blank from the paper, a revolving turret, clamping fingers carried by the revolving turret, means for transferring the body blank from the cutters to the revolving turret, means for operating the clamping fingers to engage the same with the blank, a second revolving turret, a mandrel carried by the second mentioned turret, means for cutting a bottom blank from the paper, means for shaping the bottom blank over the end of the mandrel, means for revolving the turrets to position the mandrel containing the bottom over the body blank, means for releasing the clamping fingers to release the body blank, a clamp for engaging the body blank to hold the same against the mandrel, means for shaping the body blank around the mandrel and securing it to the bottom to form a cup, a pivoted arm, curling mechanism carried by the pivoted arm, means for rotating the second mentioned turret to bring the mandrel containing the cup in line with the curling mechanism, a clamp for engaging the cup and hold the same upon the mandrel, means for swinging the pivoted arm to bring the curling mechanism in engagement with the bottom end of the cup, and means carried by the pivoted arm for operating the last mentioned clamping means.

100. In a machine for making paper cups or the like, a rotatable turret, a mandrel carried by the turret, means for forming a bottom on the end of the mandrel, means for forming a body around the mandrel and securing it to the bottom to form a cup, means for discharging the cup from the mandrel, a container adapted to receive the cup from the mandrel, and means for flanging the upper end of the cup while in the container.

101. In a machine for making paper cups or the like, a rotatable turret, a mandrel carried by the turret, means for forming a bottom on the end of the mandrel, means for forming a body on the mandrel and securing it to the bottom to form a cup, means for discharging the cup from the mandrel, a contaner adapted to receive the cup from the mandrel, and a flanging device adapted to cooperate with the container for forming a flange on the upper end of the cup.

102. In a machine for making paper cups or the like, a mandrel, means for forming a bottom on the end of the mandrel, means for forming a body on the mandrel and securing it to the bottom to form a cup, means for discharging the cup from the mandrel, a container adapted to receive the cup from the mandrel, and means for discharging the cup from the container.

103. In a machine for making paper cups or the like, a mandrel, means for forming a bottom on the end of the mandrel, means for forming a body on the mandrel and securing it to the bottom to form a cup, means for discharging the cup from the mandrel, a container adapted to receive the cup from the turret, means for flanging the upper edge of the cup, and means for discharging the cup from the container.

104. In a machine for making paper cups or the like, a mandrel, means for forming a bottom on the end of the mandrel, means for forming a body on the end of the mandrel and securing it to the bottom to form a cup, means for discharging the cup from the mandrel, a container adapted to receive the cup from the mandrel, and an air blast for discharging the cup from the container.

105. In a machine for making paper cups or the like, a mandrel, means for forming a bottom on the end of the mandrel, means for forming a body on the mandrel and securing it to the bottom to form a cup, means for discharging the cup from the mandrel, a container adapted to receive the cup from the mandrel, means for raising the cup in the container, and means for discharging the cup from the container.

106. In a machine for making paper cups or the like, a mandrel, means for forming a bottom on the end of the mandrel, means for forming a body around the mandrel and securing it to the bottom to form a cup, means for discharging the cup from the mandrel, a container adapted to receive the cup from the mandrel, a slidable plunger in the container for raising the cup therein, and means for discharging the cup from the container.

107. In a machine for making paper cups or the like, a mandrel, means for forming a bottom on the end of the mandrel, means for forming a body around the mandrel and securing it to the bottom, means for discharging the cup from the mandrel, a container adapted to receive the cup from the mandrel, means for flanging the upper end of the cup, means for raising the cup in the container after the flanging operation, and means for discharging the cup from the container.

108. In a machine for making paper cups or the like, a mandrel, means for forming a bottom on the end of the mandrel, means for forming a body around the mandrel and securing it to the bottom to form a cup, means for discharging the cup from the mandrel, a container adapted to receive the cup from the mandrel, means for seating the cup in the container, and means for discharging the cup from the container.

109. In a machine for making paper cups or the like, a mandrel, means for forming a bottom on the end of the mandrel, means for forming a body around the mandrel and securing it to the bottom to form a cup, means for discharging the cup from the mandrel, a container adapted to receive the cup from the mandrel, an air blast directed into the cup for seating the same in the container, and means for discharging the cup from the container.

110. In a machine for making paper cups or the like, a mandrel, means for forming a bottom on the end of the mandrel, means for forming a body around the mandrel and securing it to the bottom to form a cup, means for discharging the cup from the mandrel, a container adapted to receive the cup from the mandrel, an air blast for forcing the cup into the container, means for forming a flange on the upper end of the cup, means for raising the cup in the container, and means for discharging the cup from the container.

111. In a machine for making paper cups or the like, a mandrel, means for forming a bottom on the end of the mandrel, means for forming a body around the mandrel and securing it to the bottom to form a cup, means for discharging the cup from the mandrel, a container adapted to receive the cup from the mandrel, an air blast directed into the cup for forcing it into the container, means for flanging the upper end of the cup, and an air blast for discharging the cup from the container.

112. In a machine for making paper cups or the like, a mandrel, means for forming a bottom on the end of the mandrel, means for forming a body around the mandrel and securing it to the bottom to form a cup, an air blast for discharging the cup from the mandrel, a container adapted to receive the cup from the mandrel, an air blast directed into the cup for forcing the same into the container, means for flanging the upper edge of the cup, and an air blast for discharging the cup from the container.

113. In a machine for making paper cups or the like, a mandrel, means for forming a bottom on the end of the mandrel, means for forming a body around the mandrel and secure it to the bottom to form a cup, a revolving turret, a container carried by the revolving turret, means for discharging the cup from the mandrel into the container, means for rotating the turret, and means for flanging the upper end of the cup.

114. In a machine for making paper cups or the like, a mandrel, means for forming a bottom on the end of the mandrel, means for forming a body around the mandrel and secure it to the bottom to form a cup, a revolving turret, a container carried by the revolving turret, means for discharging the cup from the mandrel into the container, a flanging mechanism, means for revolving the turret to position the container with the cup beneath the flanging mechanism, means for operating the flanging mechanism to flange the upper end of the cup, and means for discharging the flanged cup from the container.

115. In a machine for making paper cups or the like, a mandrel, means for forming a bottom on the end of the mandrel, means for forming a body around the mandrel and secure it to the bottom to form a cup, a rotatable turret, a container carried by the turret, means for discharging the cup from the mandrel into the container, a flanging mechanism, means for rotating the turret to position the container with the cup beneath the flanging mechanism, means for operating the flanging mechanism to flange the upper end of the cup, means for raising the flanged cup in the container, and means for discharging the cup from the container.

116. In a machine for making paper cups or the like, a source of paper supply, means for cutting a body blank from the paper, a revolving turret, means for transferring the body blank from the cutters to the turret, a second turret, a mandrel carried by the second turret, means for cutting a bottom blank from the paper, means for shaping the bottom blank over the end of the mandrel, means for rotating the turrets to position the mandrel with the bottom over the body blank, means for shaping the body blank around the mandrel and secure the same to the bottom to form a cup, means for curling the bottom edge of the cup, and means for flanging the upper end of the cup.

117. In a machine for making paper cups or the like, a source of paper supply, means for cutting a body blank from the paper, a revoluble turret, means for transferring the body blank from the cutters to the revolving turret, a second revolving turret, a mandrel carried by the second mentioned turret, means for cutting a bottom blank from the paper, means for shaping the bottom blank over the end of the mandrel, means for rotating the turrets for positioning the mandrel with the bottom over the body blank, means for shaping the body blank around the mandrel and securing it to the bottom to form a cup, a curling mechanism, means for revolving the second mentioned turret to bring the cup to position adjacent the curling mechanism, means for operating the curling mechanism to curl the bottom edge of the cup, a flanging mechanism, means for revolving the second mentioned turret to position the cup adjacent the flanging mechanism, means for discharging the cup from the mandrel, and means for operating the flanging mechanism to flange the upper edge of the cup.

118. In a machine for making paper cups or the like, a source of paper supply, means for cutting a body blank from the paper, a revolving turret, means for transferring the body blank from the cutters to the turret, a second turret, a mandrel carried by the second turret, means for cutting a bottom blank from the paper, means for shaping the bottom blank over the end of the mandrel, means for rotating the turrets to position the mandrel containing the bottom over the body blank, means for shaping the body blank around the mandrel and secure the same to the bottom to form a cup, a curling mechanism, means for rotating the second turret to position the mandrel with the cup thereon adjacent the curling mechanism, means for operating the curling mechanism to curl the bottom edge of the cup, a third rotatable turret, a container carried by the third mentioned turret, means for discharging the cup from the mandrel into the container, and means for flanging the upper edge of the cup.

119. In a machine for making paper cups or the like, a source of paper supply, means for cutting a body blank from the paper, a rotatable turret, means for transferring the body blank from the cutters to the revolving turret, a second revolving turret, a mandrel carried by the second mentioned turret, means for cutting a bottom blank from the paper, means for shaping the bottom blank over the end of the mandrel, means for rotating the turrets to position the mandrel with the bottom thereon over the body blank, means for shaping the body blank around the mandrel and secure it to the bottom to form a cup, curling mechanism, means for rotating the second mentioned turret to position the mandrel containing the cup adjacent the curling mechanism, means for operating the curling mechanism to curl the bottom edge of the cup, a third rotatable turret, a container carried by the third mentioned turret, means for discharging the cup from the mandrel of the second mentioned turret to the container of the third mentioned turret, means for flanging the upper edge of the cup in the container, and means for discharging the cup from the container.

120. In a machine for making paper cups or the like, a source of paper supply, means for cutting a body blank from the paper, a revolving turret, means for transferring the body blank from the cutters to the revolving turret, a second rotatable turret, a mandrel carried by the second mentioned turret, means for cutting a bottom blank from the paper, means for shaping the bottom blank over the end of the mandrel, means for rotating the turrets to position the mandrel containing the bottom over the body blank, means for shaping the body blank around the mandrel and securing the bottom blank thereto for forming a cup, a curling mechanism, means for rotating the second mentioned turret to position the mandrel containing the cup adjacent the curling machanism, a third rotatable turret, a container carried by the third rotatable turret, means for discharging the cup from the mandrel of the second turret to the container of the third mentioned turret, an air blast directed into the cup for positioning the same within the container, means for flanging the upper end of the cup, and means for discharging the cup from the container.

121. In a machine for making paper cups or the like, a source of paper supply, means for cutting a body blank from the paper, a rotatable turret, clamping fingers carried by the rotatable turret, means for transferring the body blank from the cutters to the rotatable turret, means for operating the clamping fingers to engage the body blank, a second rotatable turret, a mandrel carried by the second mentioned turret, means for cutting a bottom blank, means for shaping the bottom blank over the end of the mandrel, means for holding the shaped bottom on the end of the mandrel, means for rotating the turrets to position the mandrel containing the shaped bottom over the body blank, means for operating the clamping fingers to release the body blank from the first mentioned turret, means for shaping the body blank around the mandrel and secure it to the bottom to form a cup, a curling mechanism, means for rotating the second mentioned turret to position the mandrel containing the cup adjacent the curling mechanism, means for operating the curling mechanism to curl the bottom edge of the cup, a third turret, a container carried by the third turret, means for discharging the cup from the mandrel of the second mentioned turret into the container of the third mentioned turret, an air blast directed into the cup for positioning the same within the container, means for flanging the upper edge of the cup, and means for discharging the cup from the container.

122. In a machine for making paper cups or the like, a source of paper supply, means for cutting a body blank from the paper, a rotatable turret, clamping fingers carried by the rotatable turret, means for transferring the body blank from the cutters to the rotatable turret, means for operating the clamping fingers to engage the body blank, means for rotating the turret and applying lines of adhesive to the body blank during said rotation, a second turret, a mandrel carried by the second mentioned turret, means for cutting a bottom blank from the paper, means for shaping the bottom blank over the end of the mandrel, means for rotating the second mentioned turret to position the mandrel containing the bottom over the body blank containing the lines of adhesive, means for operating the clamping fingers to release the body blank from the first mentioned turret, means for clamping the body blank against the mandrel, means for shaping the body blank around the mandrel and securing the same to the bottom by means of one line of adhesive, the other line of adhesive connecting the longitudinal edges of the body, an impact member adapted to engage the longitudinal edges of the body to embed the adhesive into the fibres of the paper, curling mechanism, means for rotating the second mentioned turret to position the mandrel containing the cup adjacent the curling mechanism, means for clamping the cup upon the mandrel, means for operating the curling mechanism to curl the bottom edge of the cup, a third rotatable turret, a container carried by the third rotatable turret, means for discharging the cup from the mandrel of the second mentioned turret into the container of the third mentioned turret, means for flanging the upper edge of the cup within the container, and means for discharging the cup from the container.

123. In a machine for making paper cups or the like, two sources of paper supply, a cutter for cutting a body blank, means for intermittently feeding the paper from one source of supply to the cutters, a rotatable turret, means for transferring the body blank from the cutters to the rotatable turret, a second rotatable turret, a mandrel carried by the second mentioned turret, cutters for cutting a bottom blank from the second source of paper supply, means for intermittently feeding the paper to said last mentioned cutters, means for shaping the bottom blank over the end of the mandrel, means for rotating the turrets for positioning the mandrel containing the bottom over the body blank, means for shaping the body blank around the mandrel and secure the same to the bottom to form a cup, a curling mechanism, means for rotating the second mentioned turret to position the mandrel containing the cup adjacent the curling mechanism, means for operating the curling mechanism to curl the bottom edge of the cup, a third turret, a container carried by the third mentioned turret, means for discharging the cup from the mandrel of the second mentioned turret into the container of the third mentioned turret, means for flanging the upper edge of the cup, and means for discharging the cups from the containers.

124. In a machine for making paper cups or the like, a source of paper supply, means for cutting a body blank from the paper, a rotatable turret, means for transferring the body blank from the cutters to the turret, pans receiving an adhesive, means for rotating the turret and applying lines of adhesive to the body blank during said rotation, a second rotatable turret, a mandrel carried by the second mentioned turret, means for cutting a bottom blank from the paper, means for shaping the bottom blank over the end of the mandrel, means for rotating the second mentioned turret for positioning the mandrel containing the bottom over the body blank, and means for shaping the body blank around the mandrel, one line of adhesive engaging the bottom and securing the same within the body, and the other line of adhesive connecting the longitudinal edges of the body blank.

125. In a machine for making paper cups or the like, a source of paper supply, means for cutting a body blank from the paper, a rotatable turret, means for transferring the body blank from the cutters to the turret, removable adhesive pans, means for transferring adhesive from the pans to apply lines of adhesive to the body blank during the rotation of the turret, a second rotatable turret, a mandrel carried by the second mentioned rotatable turret, means for cutting a bottom blank from the paper, means for shaping the bottom blank over the end of the mandrel, means for rotating the second mentioned turret for positioning the mandrel containing the bottom over the body blank, and means for shaping the body blank around the mandrel, one line of the adhesive engaging the bottom to secure the same within the body, and the other line of adhesive connecting the longitudinal edges of the body.

126. In a machine for making paper cups or the like, a source of paper supply, means for cutting a body blank from the paper, a rotatable turret, means for transferring the body blank from the cutters to the rotatable turret, adhesive pans, wheels rotatable in the adhesive pans, transfer wheels adapted to receive adhesive from the first mentioned wheels, means for operating the second mentioned transfer wheels to apply lines of adhesive to the body blank, a second rotatable turret, a mandrel carried by the second mentioned turret, means for cutting a bottom blank from the paper, means for shaping the bottom blank over the end of the mandrel, means for rotating the turrets to position the mandrel containing the shaped bottom over the body blank, and means for shaping the body blank around the mandrel, one line of adhesive engaging the bottom for securing the same within the body and the other line of adhesive connecting the longitudinal edges of the body.

127. In a machine for making paper cups or the like, a source of paper supply, means for cutting a body blank from the paper, a rotatable turret, means for transferring the body blank from the cutters to the rotatable turret, adhesive pans, means for transferring adhesive from the pans to apply two lines thereof to the body blank, one line extending longitudinally of the blank and the other transversely thereof, a second rotatable turret, a mandrel carried by the second mentioned rotatable turret, means for cutting a bottom blank from the paper, means for shaping the bottom blank around the end of the mandrel, means for rotating the turrets to position the mandrel containing the shaped bottom over the body blank, and means for shaping the body blank around the mandrel, the line of adhesive extending longitudinally of the blank engaging the bottom and securing the same within the body and the line of adhesive extending transversely of the blank connecting the longitudinal edges of the shaped blank.

128. In a machine for making paper cups or the like, a source of paper supply, means for cutting a body blank from the paper, a rotatable turret, means for transferring the body blank from the cutters to the rotatable turret, means for applying a line of adhesive longitudinally of the body blank, by the rotation of the turret, means for applying a line of adhesive transversely of the blank and at right angles to the first mentioned line of adhesive, a second rotatable turret, a mandrel carried by the second mentioned turret, means for cutting a bottom blank from the paper, means for shaping the bottom blank over the end of the mandrel, means for rotating the turrets to position the mandrel containing the bottom over the body blank containing the lines of adhesive, and means for shaping the body blank around the mandrel, that line of adhesive extending longitudinally of the blank engaging and securing the bottom within the shaped body and that line of adhesive extending transversely of the blank connecting the longitudinal edges of the shaped body.

129. In combination with a machine for making paper cups or the like, a source of paper supply, and a conveyor, said machine comprising means for cutting a body blank from the paper, a rotatable turret, means for transferring the body blank from the cutters to the turret, a second rotatable turret, a mandrel carried by the second mentioned rotatable turret, means for cutting a bottom blank from the paper, means for shaping the bottom blank over the end of the mandrel, means for rotating the turrets to position the mandrel containing the bottom over the body blank, means for shaping the body blank around the mandrel and securing the same to the bottom to form a cup, a third rotatable turret, a container carried by the third mentioned turret, means for discharging the cup from the mandrel of the second mentioned turret to the container of the third mentioned turret, and means for discharging the cup from the container to the conveyor.

130. In combination with a machine for making paper cups or the like, a source of paper supply, and a conveyor, said machine comprising means for cutting a body blank from the paper, a rotatable turret, means for transferring the body blank from the cutters to the turret, a second rotatable turret, a mandrel carried by the second mentioned rotatable turret, means for cutting a bottom blank from the paper, means for shaping the bottom blank over the end of the mandrel, means for rotating the turrets to position the mandrel containing the bottom over the body blank, means for shaping the body blank around the mandrel and securing the same to the bottom to form a cup, a third rotatable turret, a container carried by the third mentioned turret, means for discharging the cup from the mandrel of the second mentioned turret to the container of the third mentioned turret, and means for discharging the cup from the container to the conveyor with the open end of the cup forwardmost to position the cup upon the conveyor with the bottom end uppermost.

131. In combination with a machine for making paper cups or the like, a source of paper supply, and a conveyor, said machine comprising means for cutting a body blank from the paper, a rotatable turret, means for transferring the body blank from the cutters to the turret, a second rotatable turret, a mandrel carried by the second mentioned turret, means for cutting a bottom blank from the paper, means for shaping the bottom blank over the end of the mandrel, means for rotating the turrets to position the mandrel containing the bottom over the body blank, means for shaping the body blank around the mandrel and secure the same to the bottom to form a cup, a curling mechanism, means for rotating the second mentioned turret to position the mandrel containing the cup adjacent the curling mechanism, means for operating the curling mechanism to curl the bottom end of the cup, a third rotatable turret, a container carried by the third mentioned turret, means for discharging the cup from the mandrel of the second mentioned turret to the container of the third mentioned turret, and means for discharging the cup from the container of the third mentioned turret on to the conveyor.

132. In combination with a machine for making paper cups or the like, a source of paper supply, and a conveyor, said machine comprising means for cutting a body blank from the paper, a rotatable turret, means for transferring the body blank from the cutters to the turret, a second rotatable turret, a mandrel carried by the second mentioned turret, means for cutting a bottom blank from the paper, means for shaping the bottom blank over the end of the mandrel, suction means for retaining the shaped bottom on the end of the mandrel, means for rotating the turrets to position the mandrel containing the shaped bottom over the body blank, means for shaping the body blank around the mandrel and secure the same to the bottom to form a cup, a curling mechanism, means for rotating the second mentioned turret to position the mandrel containing the cup adjacent the curling mechanism, means for operating the curling mechanism to curl the bottom edge of the cup, a third rotatable turret, a container carried by the third mentioned turret, an air blast for discharging the cup from the mandrel of the second mentioned turret into the container of the third mentioned turret, an air blast directed into the cup for positioning the same within the container, means for flanging the upper edge of the cup, and an air blast for discharging the cup from the container, open end forwardmost, and delivering the same upon the conveyor.

133. The combination with a machine for making paper cups or the like, a source of paper supply, means for cutting a body blank from the paper, a rotatable turret, means for transferring the body blank from the cutters to the turret, a second rotatable turret, a mandrel carried by said second rotatable turret, means for cutting a bottom blank from paper, means for shaping the bottom blank over the end of the mandrel, means for rotating the turrets to position the mandrel containing the bottom over the body blank, means for shaping the body blank around the mandrel and secure the same to the bottom to form a cup, and means for discharging the cup from the mandrel directly into a package.

134. In a machine for making paper cups or the like, a source of paper supply, means for cutting a body blank from the paper, a rotatable turret, means for transferring the body blank from the cutters to the turret, a second rotatable turret, a mandrel carried by the second mentioned turret, means for cutting a bottom blank from the paper, means for shaping the bottom blank over the end of the mandrel, means for rotating the turrets to position the mandrel containing the bottom over the body blank, means for shaping the body blank around the mandrel and secure the same to the bottom to form a cup, a third rotatable turret, a container carried by the third mentioned turret, means for discharging the cup from the mandrel of the second mentioned turret into the container of the third mentioned turret, and means for discharging the cup from the container of the third mentioned turret directly into a package.

135. In a machine of the character described, means for feeding material from which a blank is to be formed, means for cutting a blank therefrom, and means for supporting and guiding the waste material to a point of discharge and to prevent disarrangement of said waste to avoid the clogging of the machine, said supporting and guiding means being on a movable part of the blank cutting means to move the waste substantially away from the cooperating part of the cutting means.

136. In a machine of the character described, means for supporting a sheet from which a blank is to be formed, means for cutting a blank from the sheet, means carried by the blank cutting means for cutting up the waste of said sheet, and means for conducting the waste away from the said machine.

137. In a machine of the character described, means for supporting a sheet from which a blank is to be formed, means for cutting a blank from the sheet, means cooperatively related with the blank cutting means for cutting up the waste of said sheet, and means for conducting the waste away from the said machine, said means comprising a guideway and an air supply facilitating the travel of the cut pieces by substantially eliminating friction or obstruction of said pieces in the guideway.

138. In a machine of the character described, means for supplying a sheet from which a blank is to be formed, means for cutting the blank from the sheet, means for withdrawing the cut blank from the cutters and into a clamping zone, in combination with clamping means operable in said zone and a carrier for the clamping means adapted to move the same with a clamped blank to a new position in the machine.

139. In a machine of the character described, means for supplying a sheet from which a blank is to be formed, means for cutting the blank from the sheet, means for withdrawing the cut blank away from the cutters and into a clamping zone, in combination with clamping means operable in said zone, a carrier for the clamping means adapted to move the same with a clamped blank to a new position in the machine, and means adjacent said new position for forming said blank into the article desired.

140. In a machine of the character described, a carrier adapted to move into and out of a given zone, means for successively positioning blanks in said zone, clamping means on said carrier adapted to engage a blank in said zone, and in the movement of the carrier to correspondingly carry the blank into a forming zone, and blank forming means in said forming zone.

141. The combination with a horizontally rotatable carrier having a series of blank forming devices thereon, of a horizontally rotatable means for supplying blanks to said blank forming elements in uniform succession, said rotary blank supply means being adapted to carry several blanks but in number less than the forming elements, and means co-relating the parts so that there will be a continuing supply of blanks, one for each forming element in the stated uniform intervals.

142. In a machine of the character described, a mandrel and means associated therewith for forming a blank into a cup body, and means associated with the mandrel to form a bottom for said cup body, and means whereby the body and bottom are secured together while associated with the mandrel.

143. In a machine of the character described, a mandrel and means associated therewith for forming a blank into a cup body, means associated with the mandrel to form a bottom for said cup body, means whereby the body and bottom are secured together while associated with the mandrel, and other means for spinning over the lower edge of the body below the bottom.

144. In a machine of the character described, a mandrel and means associated therewith for forming a blank into a cup body, instrumentalities associated with the end portion of the mandrel for cutting and forming a bottom blank on the end of the mandrel and means for securing the body and bottom together while on the mandrel.

145. The combination with the mandrel and means associated therewith for forming a cup body on the mandrel, instrumentalities for drawing a bottom over the end of the mandrel exteriorly thereof to flange the bottom and whereby the body and bottom blanks are secured together on the mandrel.

146. The combination with a mandrel, means associated with the end thereof for drawing a bottom blank over the end of the mandrel to flange the bottom exteriorly of the mandrel, means associated with the mandrel to form a body blank, the latter forming means being so arranged that upon the forming of the body the same and the bottom in their formed positions are also in proper relative position to constitute the ultimate formed cup, and means whereby the bottom and body are secured together while on the mandrel.

147. In combination with a mandrel on which a blank may be formed as for a cup body, of means associated with the mandrel to turn the edge of said formed body, a clamp adapted to engage the formed body exteriorly thereof to hold the same against play on the mandrel during the turning operation and connecting means for relatively effecting the actuation of the clamping and turning mechanism.

148. In combination with a mandrel adapted to support a tubular body of means for turning the edge of said body by progressive action executed in a plane at an angle to the plane of the edge to be turned and terminating in a plane parallel to the completely turned edge.

149. The combination of a cup supporting mandrel having an apertured portion, means for creating a jet of air through said apertured portion to assist in releasing a cup from the mandrel and blowing the same from the mandrel and other means for delivering a jet of air into the open end of the cup between the same and the mandrel to overcome any back or holding current of air working rearwardly between the mandrel and cup from said first mentioned jet.

150. The combination of a cup supporting mandrel having an apertured portion, means for creating a jet of air through said apertured portion to assist in releasing a cup from the mandrel and blowing the same from the mandrel, and means to overcome any back or holding current of air working rearwardly between the mandrel and the cup.

151. In a machine of the character described, a mandrel, means associated therewith for forming a blank into a cup body, means associated therewith for forming and positioning a cup bottom directly on the end of the mandrel, and means associated therewith whereby the bottom and body are secured together and the body is secured in its formed condition all on the same mandrel.

152. The combination with a mandrel useful in the formation of a cup, of means provided with a seat adapted to receive the cup as formed on said mandrel, and air means for freeing the cup from the mandrel and for delivering the same into said seat under pressure to assist in centering and fully inserting the cup in said seat.

153. The combination with a mandrel useful in the formation of a cup, of means provided with a seat adapted to receive the cup as formed on said mandrel, and air means for freeing the cup from the mandrel and for delivering the same to said seat, and guiding means for the cup in its travel under the action of the air.

154. In a machine of the character described, cup forming means, and means for delivering the completed cup from the machine comprising instrumentalities for creating a propelling current of air or the like, and means for guiding the discharged cups, open end forward, so that the action of the cup in the completion of its travel will effect a relatively gentle ultimate deposit thereof.

155. In a machine of the character described, cup forming means, and means for delivering the completed cup from the machine comprising instrumentalities for creating a propelling current of air or the like, and means for guiding the discharged cups, open end forward, so that the action of the cup in the completion of its travel will effect a relatively gentle ultimate deposit thereof, the guiding means being formed to permit release of the propelling air pressure in the guideway to the atmosphere.

156. In a machine of the character described, cup forming means and means for delivering the cup from the machine comprising discharging instrumentalities adapted to cause the cups to travel to the pre-determined point of deposit, guiding means in said path of travel, and means near the exit from said guiding means adapted to present a yieldable obstruction in the path of movement of the cup to insure a steady slow delivery of the cup, said last mentioned means after momentarily tending to retard the cup automatically giving way to permit the discharge of the cup.

157. In a machine of the character described, cup forming means and means for delivering the cup from the machine comprising discharging instrumentalities adapted to cause the cups to travel to the predetermined point of deposit, guiding means in said path of travel, means near the exit from said guiding means adapted to present a yieldable obstruction in the path of movement of the cup to insure a steady slow delivery of the cup, said last mentioned means after momentarily tending to retard the cup automatically giving way to permit the discharge of the cup, and a conveyor to which the cups are thereby gently deposited in upright position.

158. In a machine of the character described, cup forming means and means for delivering the cup from the machine comprising discharging instrumentalities adapted to cause the cups to travel to the predetermined point of deposit, guiding means in said path of travel, means near the exit from said guiding means adapted to present a yieldable obstruction in the path of movement of the cup to insure a steady slow delivery of the cup, said last mentioned means after momentarily tending to retard the cup automatically giving way to permit the discharge of the cup, and a conveyor to which the cups are thereby gently deposited in upright position, with the open end downward.

159. In a machine of the character described, cup forming means and means for delivering the cup from the machine comprising discharging instrumentalities adapted to cause the cups to travel to the predetermined point of deposit, guiding means in said path of travel, means near the exit from said guiding means adapted to present a yieldable obstruction in the path of movement of the cup to insure a steady slow delivery of the cup, said last mentioned means after momentarily tending to retard the cup automatically giving way to permit the discharge of the cup, and means for receiving the cups and to which the cups are thereby gently deposited in upright position.

160. In a machine of the character described, cup forming means and means for delivering the cup from the machine comprising discharging instrumentalities adapted to cause the cups to travel to the predetermined point of deposit, guiding means in said path of travel, means near the exit from said guiding means adapted to present a yieldable obstruction in the path of movement of the cup to insure a steady slow delivery of the cup, said last mentioned means after momentarily tending to retard the cup automatically giving way to permit the discharge of the cup, and means for receiving the cups and to which the cups are thereby gently deposited in upright position, with the open end downward.

161. The combination with a plurality of associated machines for forming cups, means for delivering cups from the respective machines, a carrier common to all of said machines onto which the cups are automatically placed in upright position as they leave said machines, and means preventing interference by the cups delivered from one machine with the cups delivered from the other machine.

162. The combination with a plurality of associated machines for forming cups, means for delivering cups from the respective machines, a carrier common to all of said machines onto which the cups are automatically placed, in upright position as they leave said machines, means preventing interference by the cups delivered from one machine with the cups delivered from the other machine, and containers into which the cups are finally delivered from said conveyor.

163. In a machine of the character described, means for forming the cups, means for delivering the cups from the machine, a conveyor adapted to receive the cups in upright position from the machine, means cooperatively related with the conveyor for directing the cups to a particular point of final deposit from the conveyor, and means for placing a receiver at one point of deposit while another is moved away from the said point of deposit.

164. In a machine for making paper cups, blank cutting means, blank forming means, and means for securing the body and bottom blanks together including mechanisms for applying divergent lines of paste on the body blank to secure the edges thereof together and the bottom thereto, said mechanism comprising a pair of adjacent paste applicators and means for actuating the same without interference one with the other.

165. In a machine for forming paper cups comprising a tapered mandrel and means associated therewith for forming a curved edge blank therearound into similarly tapered cup body formation, means for furnishing a bottom for said body to complete the cup, and means for treating the body blank, so that the bottom and body will be secured together, comprising a paste applicator adapted to engage the blank prior to its presentation to the mandrel and means whereby the paste applicator will apply a line of paste on the blank in an arc concentric to the arc of the lower edge of the blank which is to encompass the bottom.

166. In a machine for forming a multi-piece cup, means for feeding paper stock into the machine, means for cutting from such stock the various pieces adapted to be assembled within the machine to complete the cup formation, cup body forming instrumentalities associated with means for placing a line of paste on the body blank to insure maintenance of the cup body when formed, bottom forming means associated with means for positioning the bottom in appropriate relation to the body means for applying a divergent line of paste on the body blank for securing the bottom and body together, and means for delivering the completed cup from the machine.

167. In a machine for forming a multi-piece cup, means for feeding paper stock into the machine, means for cutting from such stock the various pieces adapted to be assembled within the machine to complete the cup formation, cup body forming instrumentalities associated with means for placing a line of paste on the body blank to insure maintenance of the cup body when formed, bottom forming means associated with means for positioning the bottom in appropriate relation to the body means for applying a divergent line of paste on the body blank to insure maintenance of the cup body when formed, bottom forming means associated with means for positioning the bottom in appropriate relation to the body means for applying a divergent line of paste on the body blank for securing the bottom and body together, means for turning the top and bottom edges of the cup after the bottom and body have been secured together, and means for delivering the completed cup from the machine.

168. In a machine for forming a multi-piece cup, means for feeding paper stock into the machine, means for cutting from such stock the various pieces adapted to be assembled within the machine to complete the cup formation, cup body forming instrumentalities associated with means for placing a line of paste on the body blank to insure maintenance of the cup body when formed, bottom forming means associated with means for positioning the bottom in appropriate relation to the body means for applying a divergent line of paste on the body blank for securing the bottom and body together, means for turning an edge of the cup, and means for delivering the completed cup from the machine.

169. In a machine for making paper cups or the like, a source of paper supply, a stationary cutter, a movable cutter, means for feeding the paper to the cutters, means for operating the movable cutter to cut a blank from the paper, means carried by and operable with the cutters for cutting the waste paper from which the blank has been cut, means for shaping the cut blank to form a cup body, and means for securing a bottom within the body.

170. In a machine for making paper cups or the like, a source of paper supply, a stationary cutter, a cutter movable relative to the stationary cutter, a yieldable member carried by and surrounding the movable cutter, means for feeding the paper between the cutters, means for operating the movable cutter for engaging the yieldable member with the paper and cutting a blank from the paper, means for shaping the cut blank into a cup body, and means for securing a bottom within the body.

171. A machine of the character described including a horizontally rotatable member having circumferentially spaced blank receiving stations thereon, means for feeding blanks to said stations to be carried in flat condition by said member, a second horizontally rotatable member having a plurality of circumferentially spaced forming stations thereon, there being a greater number of forming stations than there are blank receiving stations on the first mentioned rotatable member, means for transferring the blanks from the blank receiving stations to the forming stations, and means for rotating the rotatable members in timed relation to properly position the blanks carried by the stations of the first mentioned rotatable member with the forming stations of the second mentioned rotatable member.

In testimony whereof we hereunto affix our signatures.

EDWIN G. WESSMAN.
HENRY A. STONE.

DISCLAIMER 1,766,420.—*Edwin G. Wessman*, Easton, Pa., and *Henry A. Stone*, Bogota, N. J. PAPER-CUP-MAKING MACHINE. Patent dated June 24, 1930. Disclaimer filed April 7, 1938, by the assignee, *Dixie-Vortex Company*.

Hereby enters this disclaimer of claims 76, 77, 101, 102, 104, 107, 108, 109, 110, 111, 114, 149, 150, 152, 153, 156, 164, and 165.

[*Official Gazette May 10, 1938.*]